United States Patent
Koyano et al.

(10) Patent No.: US 7,033,013 B2
(45) Date of Patent: Apr. 25, 2006

(54) PRETREATMENT LIQUID FOR RECORDING MATERIAL AND IMAGE RECORDING METHOD USING THE PRETREATMENT LIQUID

(75) Inventors: Masayuki Koyano, Zama (JP); Hitoshi Arita, Yokohama (JP); Tetsuya Kaneko, Yokohama (JP); Nobutaka Osada, Mishima (JP); Kakuji Murakami, Atsugi (JP); Akihiko Gotoh, Atsugi (JP); Akiko Bannai, Tokyo (JP); Tomoko Maeda, Saitama (JP); Kiyofumi Nagai, Machida (JP)

(73) Assignee: Ricoh Company Limited, Tokyo (JP)

( * ) Notice: Subject to any disclaimer, the term of this patent is extended or adjusted under 35 U.S.C. 154(b) by 80 days.

(21) Appl. No.: 10/889,140

(22) Filed: Jul. 13, 2004

(65) Prior Publication Data

US 2005/0007431 A1 Jan. 13, 2005

Related U.S. Application Data

(62) Division of application No. 10/098,547, filed on Mar. 18, 2002, now Pat. No. 6,786,588.

(30) Foreign Application Priority Data

Mar. 23, 2001 (JP) ............................. 2001-084048

(51) Int. Cl.
*B41J 2/01* (2006.01)
(52) U.S. Cl. ..................... 347/100; 347/95; 347/96; 524/510; 523/160
(58) Field of Classification Search ............... 347/100, 347/95, 96, 101, 102, 105; 106/31.27, 31.13, 106/31.6; 523/160; 428/195, 32.1; 524/510
See application file for complete search history.

(56) References Cited

U.S. PATENT DOCUMENTS

| | | |
|---|---|---|
| 4,554,555 A | 11/1985 | Aruga et al. |
| 4,581,071 A | 4/1986 | Akutsu et al. |
| 4,620,876 A | 11/1986 | Fujii et al. |
| 4,631,085 A | 12/1986 | Kawanishi et al. |
| 4,647,310 A | 3/1987 | Shimada et al. |
| 4,711,668 A | 12/1987 | Shimada et al. |

(Continued)

FOREIGN PATENT DOCUMENTS

EP  1 034 940  9/2000

(Continued)

OTHER PUBLICATIONS

Patent Abstracts of Japan, JP 63 299971, Dec. 7, 1988.

(Continued)

*Primary Examiner*—Manish S. Shah
(74) *Attorney, Agent, or Firm*—Oblon, Spivak, McClelland, Maier & Neustadt, P.C.

(57) ABSTRACT

An image recording method including: applying a pretreatment liquid on a surface of a recording material; and discharging a recording ink according to image signals to form an ink image on the pretreatment liquid on the surface of the recording material before the pretreatment liquid applied to the recording material has dried, wherein the recording ink includes a solvent and a component dispersed or dissolved in the solvent, wherein the pretreatment liquid includes a compound depressing at least one of the dispersibility and solubility of the component in the recording ink in an amount of 10 to 80% by weight based on total weight, and wherein the pretreatment liquid has a viscosity of from 100 to 10,000 mPa·s at 25° C.

17 Claims, 4 Drawing Sheets

U.S. PATENT DOCUMENTS

| | | | |
|---|---|---|---|
| 4,713,113 A | 12/1987 | Shimada et al. | |
| 4,737,190 A | 4/1988 | Shimada et al. | |
| 4,793,860 A | 12/1988 | Murakami et al. | |
| 4,846,946 A * | 7/1989 | Mauer et al. | 204/484 |
| 5,431,720 A | 7/1995 | Nagai et al. | |
| 5,514,208 A | 5/1996 | Nagai et al. | |
| 5,589,259 A | 12/1996 | Hosoi et al. | |
| 5,618,338 A * | 4/1997 | Kurabayashi et al. | 347/100 |
| 5,619,765 A | 4/1997 | Tokita et al. | |
| 5,622,550 A | 4/1997 | Konishi et al. | |
| 5,782,254 A | 7/1998 | Tanikawa et al. | |
| 5,810,915 A | 9/1998 | Nagai et al. | |
| 5,851,717 A | 12/1998 | Tsubuko et al. | |
| 5,879,439 A | 3/1999 | Nagai et al. | |
| 5,882,390 A | 3/1999 | Nagai et al. | |
| 5,968,301 A | 10/1999 | Murakami et al. | |
| 5,972,082 A | 10/1999 | Koyano et al. | |
| 5,993,524 A | 11/1999 | Nagai et al. | |
| 6,020,103 A | 2/2000 | Tsubuko et al. | |
| 6,120,589 A | 9/2000 | Bannai et al. | |
| 6,126,281 A | 10/2000 | Shimoda et al. | |
| 6,156,384 A | 12/2000 | Hutter et al. | |
| 6,231,652 B1 | 5/2001 | Koyano et al. | |
| 6,261,349 B1 | 7/2001 | Nagai et al. | |
| 6,286,953 B1 | 9/2001 | Takemoto et al. | |
| 6,439,713 B1 | 8/2002 | Noguchi et al. | |
| 6,818,685 B1 * | 11/2004 | Chapman | 523/440 |

FOREIGN PATENT DOCUMENTS

| | | |
|---|---|---|
| EP | 1034940 A1 * | 9/2000 |
| JP | 52-53012 | 4/1977 |
| JP | 55-065269 | 5/1980 |
| JP | 55-144172 | 11/1980 |
| JP | 56-086789 | 7/1981 |
| JP | 56-089594 | 7/1981 |
| JP | 56-089595 | 7/1981 |
| JP | 64-063185 | 3/1989 |
| JP | 08-020159 | 1/1996 |
| JP | 08-020161 | 1/1996 |
| JP | 08-142500 | 6/1996 |
| JP | 10-250216 | 9/1998 |
| JP | 11-010856 | 1/1999 |
| JP | 2000-037942 | 2/2000 |
| JP | 2000-044855 | 2/2000 |
| JP | 2000-063719 | 2/2000 |
| WO | WO 99/64249 | 12/1999 |

OTHER PUBLICATIONS

Patent Abstracts of Japan, JP 05 148775, Jun. 15, 1993.

* cited by examiner

PRETREATMENT LIQUID FOR RECORDING MATERIAL AND IMAGE RECORDING METHOD USING THE PRETREATMENT LIQUID

This application is a divisional of U.S. Ser. No. 10/098,547, filed Mar. 18, 2002, issued as U.S. Pat. No. 6,786,588, the discloser of which is herein incorporated by reference.

BACKGROUND OF THE INVENTION

1. Field of the Invention

The present invention relates to a pretreatment liquid for a recording material and an image recording method using the pretreatment liquid.

2. Discussion of the Background

Recently, inkjet printers have been used very popularly because of being quiet and having low costs. In addition, color inkjet printers which can print color images on a plain paper have also been practically used in the market.

As colorants for inks for office-use inkjet printers, dyes which have high solubility, have been typically used to prevent occurrence of a nozzle-choking problem in that a nozzle of an inkjet printer is choked with a material such as colorants included in an ink. However, dyes typically have poor resistance to water and light. Therefore inks including a pigment as a colorant have been increasingly used for posters whose images are needed to have good resistance to water and light.

In addition, when color images are printed on a plain paper, an additive such as surfactants is typically used for inks to improve the penetration property of the inks, i.e., to improve blurring of the boundary portion between two or more overlaid color images (hereinafter this blurring is referred to as the image blurring problem). This technique is disclosed, for example, in Japanese Laid-Open Patent Publication No. (hereinafter referred to as JOP) 55-65269. However, even when such inks are used, a feathering problem in that character images and fine line images are blurred cannot be fully solved. Therefore a technique in which an ink having a low penetration property is used for only the black ink in a color ink cartridge is disclosed. However, by using such a technique, the feathering problem cannot be fully solved, and particularly the image blurring problem cannot be fully solved.

In attempting to solve such a problem, JOPs 56-86789, 55-144172, 55-81992, 52-53012 and 56-89594 have disclosed techniques in which a material capable of fixing a dye included in recording inks is previously coated on a recording material or a white pigment or a water-soluble polymer is coated on the surface of a recording material, to fix a dye ink image formed on the recording material. In these techniques, it is needed to use papers which have been subjected to a special treatment.

JOP 56-89595 discloses an inkjet printing method in which a solution of a polymer such as carboxymethyl cellulose, polyvinyl alcohol and polyvinyl acetate is sprayed on a surface of a plain paper and then an ink is sprayed to form an ink image on the polymer-coated area of the plain paper. However, the feathering problem cannot be prevented by such an image forming method, and in addition, the water resistance of the recorded images cannot be improved at all.

JOPs 64-63185, 8-20159 and 8-20161 have disclosed inkjet printing methods in which a pretreatment liquid including a compound capable of insolubilizing a dye included in an ink to be used for printing images is sprayed by an inkjet printing method on a surface of a recording material and then the ink is sprayed on the surface of the recording material. However, these methods have a drawback in that the pretreatment liquid is needed to have a low viscosity to be stable sprayed on the surface of a recording material, namely the content of the dye-insolubilizing compound in the pretreatment liquid has to be decreased, and thereby the image quality improving effect is hardly exerted.

In order to fully exert the image quality improving effect by using such a pretreatment liquid, it is needed to apply a large amount of a pretreatment liquid on a recording material, resulting in occurrence of problems such as curling or cockling of the recording material. In particular, image areas in which two or more color ink images are overlaid include a large amount of water, and therefore an ink-penetrating problem in that the ink images penetrate into a recording material and reach the backside of the recording material occurs as well as the cockling problem of the recording material.

JOP 8-142500 discloses an inkjet printing method in which a colorless liquid including a silicone compound such as silicone oils and a cationic compound is previously coated on a recording material and then a recording ink including an anionic compound is sprayed on the recording material to form an image thereon. However, the silicone-coated surface of the recording material has poor ink permeability and therefore it takes a long time to dry the recorded ink images. In addition, when an image is recorded on such a recording material at a high speed, various problems tend to occur. For example, problems occur such that a dot image tends to be mixed with the neighboring dots because the silicone-coated surface has poor wettability and an undesired white line image is formed in a solid image because a roller contacts the solid image which have not yet dried. Thus image qualities seriously deteriorate. In addition, when such a pretreatment liquid is preserved for a long period of time, the silicone oil included therein decomposes or is separated from the other components, and thereby images having good image qualities cannot be stably produced.

JOP 10-250216 discloses an image recording method in which a colorless or pale-colored record-accelerating liquid including a dye-insolubilizing compound capable of insolubilizing the dye included in a recording ink is applied on a surface of a recording material and then the recording ink is sprayed on the surface of the recording material, wherein the record-accelerating liquid further includes a specific surfactant. According to this image recording method, the surfactant in the record-accelerating liquid improves the permeability and wettability of recording materials, and thereby the recorded images can be rapidly dried, resulting in performance of high speed printing. However, there is a possibility that the colorant in the ink penetrates into the recording paper, resulting in decrease of image density and occurrence of the feathering problem. Therefore, the image recording method is needed to be further improved.

JOP 2000-37942 discloses an image recording method in which a pretreatment liquid including a water-soluble polyvalent metal salt or a polyallylamine in an amount of from 20 to 25% by weight is applied on a surface of a recording material by an inkjet printing method, and then an ink including a pigment as a colorant is sprayed after the recording material applied with the pretreatment liquid is pressed or heated, to form an image on the surface of the recording material. It is described therein that images having good image qualities can be formed on a recording material even when the pretreatment liquid is applied in an amount of $1/10$ to $1/2$ of the application amount of a pretreatment liquid in conventional methods including no pressure applying process. In addition, it is also described therein that by pressing a recording material, occurrence of the cockling problem can be prevented. However, in this method an additional process such as pressing processes or heating processes has to be performed, and therefore the printing devices become complex and large in size.

JOPs 11-10856, 2000-44855 and 2000-63719 have disclosed pretreatment liquids including a water-soluble polyvalent metal salt in such a large amount as 35% by weight. These pretreatment liquids are applied on a surface of a recording material by an on-demand inkjet printing method, and therefore the pretreatment liquids have to have a low viscosity. As mentioned above, when pretreatment liquids having a low viscosity are applied on a surface of a recording material, the pretreatment liquid produces little image-quality enhancing effect. In addition, these pretreatment liquids is needed to include a special material such as particulate polymers which typically have high manufacturing costs.

Thus, an inkjet printing method by which images having high image qualities can be recorded at a high recording speed has not yet been realized although various proposals have been made.

SUMMARY OF THE INVENTION

Accordingly, an object of the present invention is to provide an image recording method by which images having fine line reproducibility, color reproducibility, and high water resistance can be formed without causing the image blurring problem.

Another objects of the present invention is to provide an image recording method by which images having high image density can be formed on both sides of a plain paper without causing the curling problem, cockling problem and ink-penetrating problem.

Yet another method of the present invention is to provide a pretreatment liquid to be applied on a surface of a recording material to form high quality image on the recording material using an inkjet printing method.

Briefly these objects and other objects of the present invention as hereinafter will become more readily apparent can be attained by an image recording method including the steps of applying a pretreatment liquid on a surface of a recording material; and discharging a recording ink, which includes a solvent and a component dispersed or dissolved in the solvent, on the pretreatment liquid on the surface of the recording material according to image signals before the pretreatment liquid has dried, to form an ink image on the recording material, wherein the pretreatment liquid includes a compound in an amount of 10 to 80% by weight, which depresses at least one of the dispersibility and solubility of the component in the recording ink and wherein the pretreatment liquid has a viscosity of from 10 to 10,000 mPa·s at 25° C.

At this point, the passage "the pretreatment liquid has dried" means the pretreatment liquid applied is solidified after the liquid components therein have evaporated, and does not mean that the pretreatment liquid applied on a recording material appears to be dried at glance because of being absorbed in the recording material.

It is preferable that the material is a colorant of the recording ink, and the viscosity is from 20 to 10,000 mPas·s at 25° C.

In addition, it is preferable that the coating weight of the pretreatment liquid applied on the recording material is from 0.5 to 10 g/m². The contact angle of the recording ink against the recording material which has been applied with the pretreatment liquid is preferably not greater than 90°. Further it is preferable that the surface tensions of the pretreatment liquid and the recording ink are from 40 to 60 mN/m and from 20 to 40 mN/m, respectively.

The pretreatment liquid may be coated on an area of the surface of the recording material other than the areas on which an image is to be formed by the recording ink.

When the pretreatment liquid applying step is performed, an applicator, which applies the pretreatment liquid on the recording material while touching the surface of the recording material, is preferably used. The applicator is preferably a roller.

It is preferable that the image recording method further includes a step of heating the applied pretreatment liquid before the pretreatment liquid is dried.

The recording material preferably includes pulp fibers and has a sizing degree not less than 10 s and an air permeability of from 5 to 50 s.

It is preferable that the recording ink includes an anionic compound or the material in the recording ink is anionic. The anionic compound or the anionic material is preferably selected from the group consisting of anionic dyes, pigments or dyes dispersed by an anionic dispersant, pigments modified by an anionic group and anionic color particulate materials.

As another aspect of the present invention, a pretreatment liquid is provided for an inkjet recording method in which an ink image including at least a solvent and a component, such as colorants, dispersed or dissolved in the solvent is formed on a recording material. The pretreatment liquid includes a compound in an amount of 10 to 80% by weight, which depresses at least one of dispersibility and solubility of the component in the recording ink, wherein the pretreatment liquid has a viscosity of from 10 to 10,000 mPa·s at 25° C.

The pretreatment liquid is preferably colorless or pale-colored, and the viscosity thereof is preferably from 20 to 10,000 mPas·s.

The solvent preferably includes a water-soluble organic solvent in an amount of from 5 to 70% by weight based on total weight of the pretreatment liquid. The solvent preferably includes water in an amount of from 5 to 80% by weight. It is preferable that the pretreatment liquid further includes a water-soluble liquid compound and the solvent includes water, wherein the water-soluble liquid compound and water are included in the pretreatment liquid in an amount of from 20 to 80% by weight based on total weight of the pretreatment liquid. Preferably the content of water is not greater than 40% by weight, and the content of the water-soluble liquid compound is from 20 to 80% by weight. It is preferable that the content of water in the pretreatment liquid is not greater than the equilibrium water content of the water-soluble liquid compound at 60%RH.

The compound depressing at least one of dispersibility and solubility of the component in the recording ink is an ionic compound. The ionic compound preferably has an alkyl group having not less than six carbon atoms. The ionic compound is preferably an ionic polymer compound.

The ionic compound is preferably a cationic compound, and more preferably a cationic polymer. The cationic polymer preferably has one of the following formulae (1) to (18):

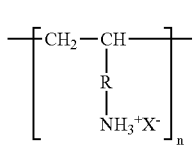
(1)

wherein X⁻ represents a halogen ion, a nitrate ion, a nitrite ion or an acetate ion; R represents an alkylene group having from 1 to 3 carbon atoms; and n is an integer (i.e., polymerization degree);

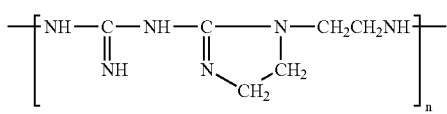
(2)

wherein n is an integer (i.e., polymerization degree);

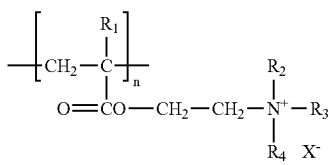
(3)

wherein X⁻ represents a halogen ion, a nitrate ion, a nitrite ion or an acetate ion; $R_1$ represents a hydrogen atom or a methyl group; $R_2$, $R_3$ and $R_4$ independently represent a hydrogen atom or an alkyl group; and n is an integer (i.e., polymerization degree);

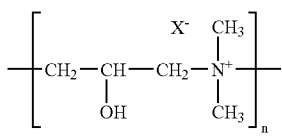
(4)

wherein X⁻ represents a halogen ion, a nitrate ion, a nitrite ion or an acetate ion; and n is an integer (i.e., polymerization degree);

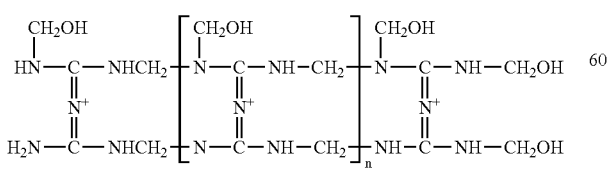
(5)

wherein n is an integer of from 5 to 30;

(6)

wherein n is an integer (i.e., polymerization degree);

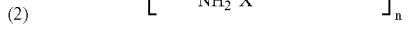
(7)

wherein X⁻ represents a halogen ion, a nitrate ion, a nitrite ion or an acetate ion; and n is an integer (i.e., polymerization degree);

(8)

wherein n is an integer (i.e., polymerization degree);

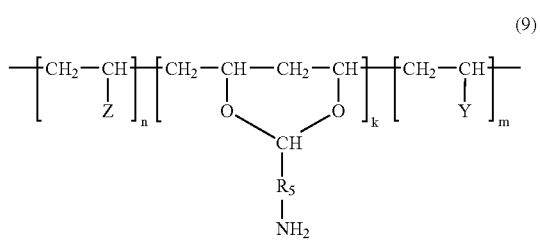
(9)

wherein Z and Y independently represent —OCOCH₃ or —OH; $R_5$ represents an alkylene group having from 1 to 4 carbon atoms; and n, k and m independently an integer;

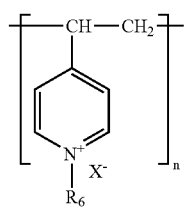
(10)

wherein $R_6$ represents an alkyl group; X⁻ represents a halogen ion, a nitrate ion, a nitrite ion or an acetate ion; and n is an integer (i.e., polymerization degree);

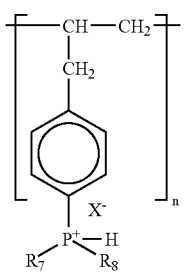
(11)

wherein $R_7$ and $R_8$ independently represent a hydrogen atom or an alkyl group; $X^-$ represents a halogen ion, a nitrate ion, a nitrite ion or an acetate ion; and n is an integer (i.e., polymerization degree);

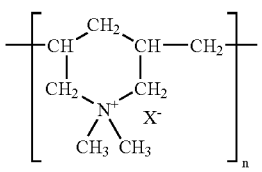
(12)

wherein $X^-$ represents a halogen ion, a nitrate ion, a nitrite ion or an acetate ion; and n is an integer (i.e., polymerization degree);

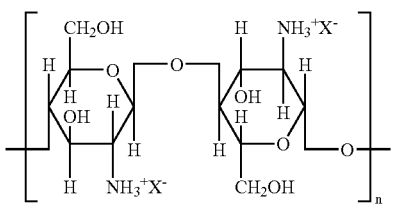
(13)

wherein $X^-$ represents a halogen ion, a nitrate ion, a nitrite ion or an acetate ion; and n is an integer (i.e., polymerization degree);

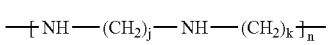
(14)

wherein j and k are independently an integer of from 2 to 6; and n is an integer (i.e., polymerization degree);

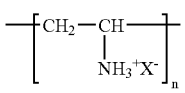
(15)

wherein $X^-$ represents a halogen ion, a nitrate ion, a nitrite ion or an acetate ion; and n is an integer (i.e., polymerization degree);

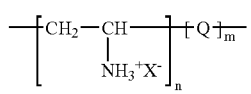
(16)

wherein $X^-$ represents a halogen ion, a nitrate ion, a nitrite ion or an acetate ion; Q represents another repeating unit of the copolymer; and n and m are independently an integer (i.e., polymerization degree);

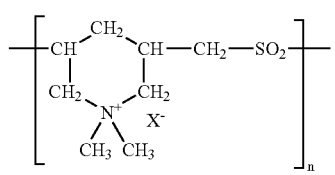
(17)

wherein $X^-$ represents a halogen ion, a nitrate ion, a nitrite ion or an acetate ion; and n is an integer (i.e., polymerization degree); and The cationic compound is preferably a polymer having the following formula (18):

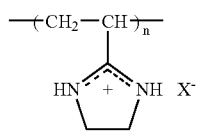
(18)

wherein $X^-$ represents a halogen ion, a nitrate ion, a nitrite ion or an acetate ion; and n is an integer (i.e., polymerization degree).

The cationic polymer is preferably a cationic polymer including at least one of a repeating unit having the following formula (19) and a repeating unit having the following formula (20):

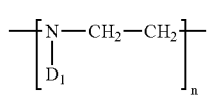
(19)

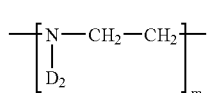
(20)

wherein $D_1$ represents a substituent having one of the following formulae (21) and (22); $D_2$ represents a hydrogen atom or a substituent having one of the following formulae (21) and (22); n and m are independently an integer.

(21)

(22)

wherein $R_9$ and $R_{10}$ independently represent a hydrogen atom, an alkyl group having from 1 to 12 carbon atoms or an allyl group; $R_{11}$ and $R_{12}$ independently represent a hydrogen atom, an alkali metal or a substituent having the following formula (23).

$$-NR_{13}R_{14}R_{15}R_{16} \tag{23}$$

wherein $R_{13}$ to $R_{16}$ independently represent a hydrogen atom, an alkyl group, an allyl group, a hydroxyalkyl group or a benzyl group.

The above-mentioned cationic compound may be particles dispersed in the pretreatment liquid. The particles are preferably a cationic silica or a cationic emulsion.

The material in the pretreatment liquid which depresses at least one of dispersibility and solubility of the component in the recording ink is preferably a water-soluble polyvalent metal salt.

The pretreatment liquid preferably includes at least one of a surfactant and a wetting accelerator so as to have a surface tension not greater than 40 mN/m.

The surfactant preferably has one of the following formulae (24) to (29).

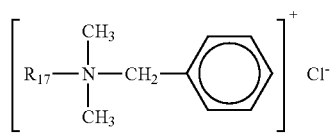
(24)

wherein $R_{17}$ represents a lauryl group, a stearyl group or a myristyl group;

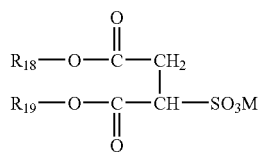
(25)

wherein $R_{18}$ and $R_{19}$ independently represent an alkyl group having not less than 3 carbon atoms which may be branched; M represents an alkali metal, an ammonium group, an alkanol amine group, a quaternary ammonium group or a quaternary phosphonium group;

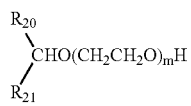
(26)

wherein $R_{20}$ and $R_{21}$ independently represent an alkyl group having from 5 to 7 carbon atoms; and m is an integer of from 5 to 20;

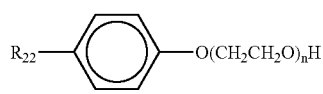
(27)

wherein $R_{22}$ represents a carbon chain having from 6 to 14 carbon atoms which may be branched; and n is an integer of from 5 to 20;

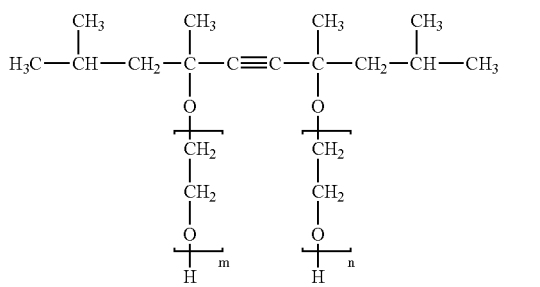
(28)

wherein m and n are independently 0 or an integer of from 1 to 20; and

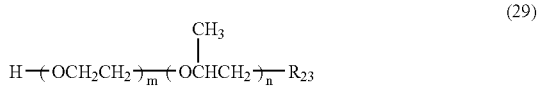
(29)

wherein $R_{23}$ represents a carbon chain having from 6 to 14 carbon atoms which may be branched; and m and n are independently 0 or an integer of from 1 to 20.

The surfactant is preferably included in the pretreatment liquid in an amount of from 0.1 to 10% by weight based on total weight of the pretreatment liquid.

The pretreatment liquid preferably includes an antiseptic agent or antimildew agent in an amount of from 0.1 to 5% by weight.

In yet another aspect of the present invention, an image forming method is provided which includes discharging a recording ink according to image signals to form an ink image on a surface of the recording material on which a pretreatment liquid is applied and has dried, wherein the recording ink includes a solvent and a component dispersed or dissolved in the solvent, wherein the pretreatment liquid includes a compound depressing at least one of the dispersibility and solubility of the component in the recording ink in an amount of 10 to 80% by weight based on total weight, and wherein the pretreatment liquid has a viscosity of from 10 to 10,000 mPa·s at 25° C.

In a further aspect of the present invention, a recording material is provided which has on a surface thereof a dried pretreatment liquid, wherein the pretreatment liquid comprises a compound depressing at least one of the dispersibility and solubility of the component in the recording ink in an amount of 10 to 80% by weight based on total weight, and wherein the pretreatment liquid has a viscosity of from 10 to 10,000 mPa·s at 25° C.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawing(s) in which like reference characters designate like corresponding parts throughout and wherein.

DETAILED DESCRIPTION OF THE INVENTION

Figure 1:
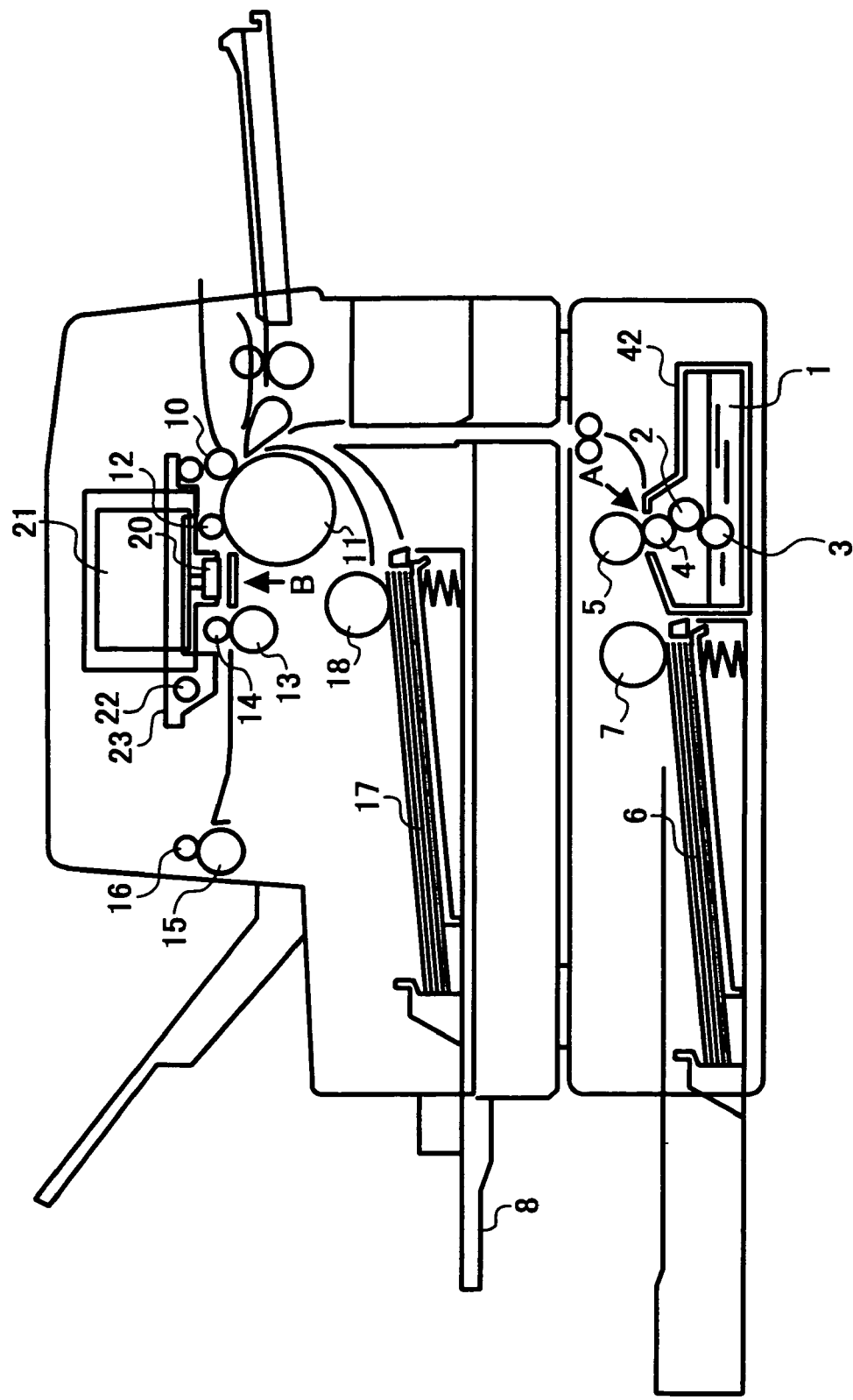
FIG. 1 is a schematic view illustrating an embodiment of the image recording apparatus for use in the image recording method of the present invention.

As a result of the investigation of the present inventors, it is found that the objects of the present invention can be attained by applying a pretreatment liquid on a surface of a recording material, which liquid includes at a high concentration a material capable of depressing the dispersibility or solubility of a component (for example, insolubilizing the component) in the recording ink to be used for recording an image on the surface and which has a relatively high viscosity, before recording the image.

As mentioned above, image recording methods in which a colorless or pale-colored pretreatment liquid including a compound capable of insolubilizing a dye in the recording ink is previously applied on a surface of a recording material by an inkjet printing method or by a roller and then an image is recorded on the surface of the recording material by an inkjet printing method is known. However, liquids having a relatively low viscosity, i.e., less than 10 mPa·s, are used as the pretreatment liquid in the conventional methods. This is because a liquid having a viscosity higher than the viscosity (10mPa·s) cannot be discharged from nozzles of on-demand inkjet printers. In addition, when a roller is used for applying a pretreatment liquid, the idea such that pretreatment liquids which include at a high concentration a material capable of depressing dispersibility or solubility of a component included in the recording ink and which has a relatively high viscosity have not been proposed. Therefore, in the conventional image recording methods in which a pretreatment liquid is applied by a roller, a relatively large amount of the pretreatment liquid is applied on a recording material. Therefore the image recording method using a roller has no advantages over the image recording method in which a pretreatment liquid is previously applied by an inkjet printing method on an area of a recording material on which an image is to be formed.

According to the present invention, the above-mentioned problems can be solved by applying a pretreatment liquid on a surface of a recording material, which liquid includes a compound in an amount of 10 to 80% by weight, which can depress at least one of dispersibility and solubility of a component included in the recording ink, wherein the pretreatment liquid has a viscosity of from 10 to 10,000 mPa·s at 25° C. Namely, by applying such a pretreatment liquid on a surface of a recording material, high quality images can be recorded without causing the image blurring problem in that a boundary area between overlaid different color images blurs, the feathering problem and the ink-penetrating problem even when the quantity of the applied pretreatment liquid is as small as from 0.5 to 10 g/m$^2$.

The content of the compound capable of depressing the dispersibility or solubility of an ink component (hereinafter referred to as the solubility depression compound) in the pretreatment liquid is from 10 to 80% by weight. When the content is too low, a large amount of the pretreatment liquid (e.g., from 10 to 30 g/m$^2$) has to be applied on a recording material to record high quality images thereon, and thereby the cockling problem tends to occur. Even when such a large amount of the pretreatment liquid is applied, the effects of preventing the image blurring problem and feathering problem are not satisfactory. To the contrary, when the content is too high, the pretreatment liquid tends to have precipitation due to evaporation of the liquid components therein such as solvents, for example, if the liquid is repeatedly heated and cooled. Thereby reliability of the pretreatment liquid deteriorates. In addition, it is hard to evenly apply such a pretreatment liquid on a surface of a recording material.

The preferable content of the solubility depression compound is from 20 to 60% by weight, which changes depending on factors such as the material used as the solubility depression compound, and the formulation and application quantity of the recording ink used.

The viscosity of the pretreatment liquid is from 10 to 10,000 mPa·s at 25° C., preferably from 20 to 10,000 mPa·s, more preferably from 100 to 3,000 mPa·s and even more preferably from 300 to 2,000 mPa·s when measured by a B-type viscometer at a rotating speed of 30 rpm using a No. 4 rotor, to record high quality images while the pretreatment liquid is dried at a relatively high speed.

The reason why the image quality can be improved by using such a high viscosity pretreatment liquid is considered as follows.

When a conventional pretreatment liquid which has a low viscosity and a high penetrating property is used, the pretreatment liquid tends to penetrate into the inner part of a recording material (in particular a recording material such as plain papers), and thereby the effects of preventing the ink-penetrating problem, the feathering problem and the image blurring problem are not fully exerted because the reaction of the solubility depression compound in the pretreatment liquid with the ink material does not occur at the surface of the recording material.

To the contrary, when a conventional pretreatment liquid which has a low viscosity and a relatively low penetrating property is used, the reaction of the solubility depression compound in the pretreatment liquid with the ink material occurs at the surface of the recording material, but the effect of preventing the image blurring problem is not fully exerted because the pretreatment liquid remains on the surface of the recording material for a long period of time. In addition, when image recording is performed at a high speed, a problem in that the drying speed of recorded images decreases occurs. In this case, if a large amount of the pretreatment liquid is applied to improve image quality, the pretreatment liquid tends to penetrate into the inner part of the recording material and in addition, the recording ink also penetrates into the inner part of the recording material, resulting in deterioration of image density of the recorded images. In addition, the problems such as curling and cockling of the recording material tend to occur. When a pretreatment liquid has a viscosity greater than 10,000 mPa·s, it becomes hard to evenly apply such a pretreatment liquid, and in addition since the liquid hardly penetrates into the recording material used, a problem which occurs is that the recording material is tacky even after images are recorded thereon.

According to the present invention, after the pretreatment liquid is applied on a surface of a recording material, a recording ink is discharged to form an image thereon before the applied pretreatment liquid dries. In this case, if the pretreatment liquid is dried, for example, by heating the recording material, or by leaving the liquid-coated recording material for a long time without recording ink images, the image blurring problem and the feathering problem occur. If the coating weight of the pretreatment liquid is greater than 30 g/m$^2$ and images are recorded after the pretreatment liquid is dried, the resultant images have good image quality, however, this technique is not preferable because of being non-economic.

In the present invention, it is more preferable to apply the pretreatment liquid using a contact applicator such as rollers than to apply using a non-contact applicator such as inkjet printing nozzles.

Specific examples of such a contact applicator include rollers, wire bars, coating blades and applicators in which a foamed material including the pretreatment liquid is contacted with recording materials. When such a contact applicator is used, various additives, which cannot be used for conventional pretreatment liquids, can be included in the pretreatment liquid. Therefore, the designing flexibility of the pretreatment liquid can be enhanced. Among these contact applicators, rollers are preferably used because the pretreatment liquid can be uniformly applied on a recording material such that high quality images can be recorded thereon and the resultant image recording apparatus has a simple structure and low costs.

Thus, by applying a pretreatment liquid, which includes an image fixing agent (i.e., the solubility depression compound) at a high concentration and which has a high viscosity, using a contact applicator such that the coating weight of the applied pretreatment liquid is much less than that when conventional pretreatment liquids are used, the problem of cockling of recording materials can be avoided and in addition the image qualities can be further improved than ever.

When plain papers which mainly include pulp fibers and which have a sizing degree not less than 10 seconds and an air permeability of from 5 to 50 seconds are used as the recording material, the feathering, blurring, and ink-penetrating problems tend to occur and in addition image density decreases if the pretreatment is not performed. The image forming method of the present invention can be preferably used for such plain paper recording materials.

Then the pretreatment liquid will be explained in detail.

Aqueous recording inks currently used for inkjet printing typically include an anionic compound, such as anionic dyes, anionic pigments, anionic polymers and anionic emulsions, or a negatively-charged particulate material. Therefore a cationic compound is preferably included in the pretreatment liquid of the present invention to depress the dispersibility or solubility of such an anionic compound in recorded ink images. Among cationic compounds, cationic polymers are preferably used because of having a good ability of reacting with the above-mentioned anionic compounds or negatively-charged particles included in recording inks.

When the pretreatment liquid including a cationic compound is applied on a surface of a recording material, an anionic component in the recording ink discharged for recording images has ionic interaction with the cationic compound in the applied pretreatment liquid, and thereby reproducibility of fine line images and water resistance of the resultant images can be improved and the image blurring problem can be avoided. As mentioned above, pretreatment liquids having a high viscosity which cannot be used for conventional methods of applying a pretreatment liquid using inkjet printing nozzles can be used in the present invention. Namely, a cationic polymer can be included at a high concentration in the pretreatment liquid of the present invention. By forming a thin layer of the pretreatment liquid including a cationic polymer at a high concentration on a recording material, image qualities can be dramatically improved and in addition the problems of curling and cockling of the recording materials can be prevented.

In the present invention, since the viscosity of the pretreatment liquid can be relatively high, various materials can be used for the pretreatment liquid. When a polymer is used for conventional pretreatment liquids, the polymerization degree, molecular weight and structure of the polymer (e.g., two-dimensional structure or three-dimensional structure) is considerably limited because the resultant pretreatment liquids have to have a low viscosity. In the pretreatment liquid of the present invention, cationic polymers having one of formulae (1) to (20) are preferably used.

When cationic polymers having at least a repeating unit having formula (19) and (20) are used as the solubility depression compound, the weight average molecular weight thereof is preferably from 1,000 to 100,000, more preferably from 2,000 to 50,000, and even more preferably from 2,000 to 30,000. When the weight average molecular weight is too high, the polymers tend not to be dissolved in a solvent, and thereby the pretreatment liquid is unevenly coated, resulting in formation of uneven images. To the contrary, when the weight average molecular weight is too low, the effects of preventing the image blurring problem and improving the water resistance of the recorded images cannot be fully exerted.

In order that the cationic polymers have high reactivity with an-anionic component included in recording inks the cationic polymers, the cationic polymers preferably have a cationic degree not less than 3 meq/g, and more preferably not less than 3.5 meq/g. The cationic degree can be determined by a colloidal titration method using potassium polyvinylsulfate.

The detailed procedure is as follows:

(1) ninety (90) ml of deionized water is contained in a conical beaker;

(2) ten (10) ml of an aqueous solution including a sample at a concentration of 500 ppm on a dry basis of the sample is added to the deionized water;

(3) the pH of the mixture is controlled so as to be 4.0 by adding a hydrochloric acid aqueous solution while agitating the mixture for about 1 minute;

(4) few drops of a toluidine blue indicator are added to the mixture and then a titration is performed using a reagent including potassium polyvinylsulfate at a concentration of N/400 (i.e., N/400PVSK) at a titration speed of 2 ml/min; and (5) the end point of the titration can be determined when the color of the mixture changes from blue to reddish violet and the reddish violet color is kept for ten seconds or more.

The cationic degree of the sample is defined as follows:

Cationic degree (meq/g)=(quantity of N/400PVSK needed for titration)×(titer of N/400PVSK)/2

It can be said that the greater cationic degree a material has, the higher cationic property the material has. Materials having a high cationic degree can effectively react with anionic components included in the recording ink to be used for recording images, and therefore the application quantity of the pretreatment liquid can be decreased. Therefore high quality images can be recorded without causing the curling and cockling problems. The cationic polymers mentioned above can be used alone or in combination.

When inkjet recording inks including an anionic dispersant to uniformly disperse dyes or pigments used as colorants of the inks are used, it is most preferable to use a cationic polymer such as those mentioned above because the cationic polymer in the pretreatment liquid reacts with the anionic dispersant, resulting in prevention of the image blurring problem and ink-penetrating problem, and thereby high quality images can be recorded.

In addition, it is also effective to add a low molecular weight compound (i.e., a compound which has a low molecular weight and which is not a polymer) which depresses dispersibility and/or solubility of the dye or pigment by reacting with the anionic dispersant. It is particularly preferable to use such a compound in combination with the cationic polymer because the reaction of the cationic polymer in the pretreatment liquid with the anionic compound in the recording ink can be accelerated. Low molecular weight compounds having the following formula (24') are preferably used:

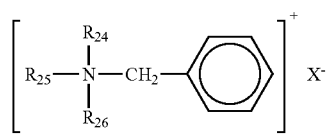

(24')

wherein $X^-$ represents an anionic ion such as a halogen ion, a nitrate ion, a nitrite ion or an acetate ion; and $R_{24}$, $R_{25}$ and $R_{26}$ independently represent an alkyl group, wherein the total carbon number thereof is from 5 to 32.

Among the cationic low molecular weight compounds having formula (24'), compounds having a formula in which $R_{24}$ and $R_{26}$ represent a methyl group and $R_{25}$ represents an alkyl group having from 10 to 20 carbon atoms are preferably used because the compounds have a high solubility, a reaction ability with anionic compounds and a good ability of depressing dispersibility or solubility of an ink component. When $R_{24}$ and $R_{26}$ are an alkyl group having two or more carbon atoms or $R_{25}$ is an alkyl group having greater than 20 carbon atoms, the solubility of the compounds in the pretreatment liquid decreases and in addition problems such that the pretreatment liquid tends to have precipitation particularly when the pretreatment liquid is preserved for a long period of time or environmental conditions are changed tend to occur.

Compounds having a formula in which the total carbon number of $R_{24}$, $R_{25}$ and $R_{26}$ is too small have poor ability of depressing dispersibility or solubility of a component included in a recording ink although the compounds have high solution stability. Therefore, Pretreatment liquids including such compounds cannot fully exert the image quality improving effect.

Specific examples of such low molecular weight compounds having formula (24') include compounds having one of the following formulae 30 to 36.

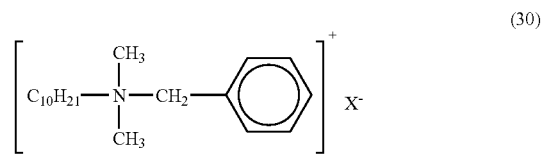

(30)

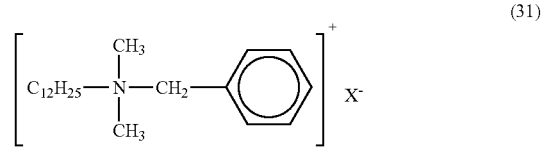

(31)

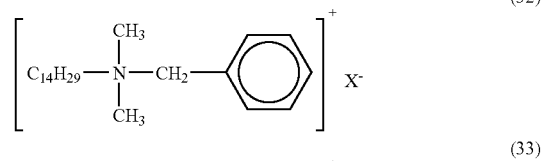

(32)

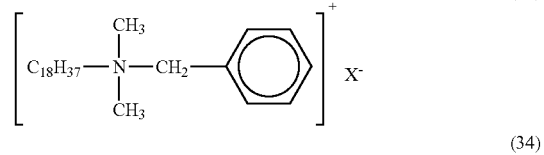

(33)

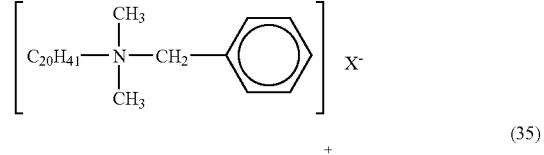

(34)

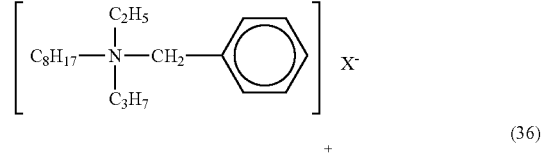

(35)

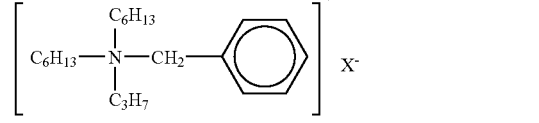

(36)

Specific examples of marketed products of these cationic compounds include CATION S, CATION SK, CATION M and CATION G-50 all of which are manufactured by Sanyo Chemical Industries Ltd.; CATION F2-35R, CATION F2-40E, CATION M2-100 and CATION S2-100 all of which are manufactured by NOF Corporation; and SANIZAL C and SANIZOL B-50 all of which are manufactured by Kao Corp.

It is preferable to include a cationic polymer in combination with a compound having formula (24') in the pretreatment liquid because the compound has a proper surface activating ability and thereby the wettability of the surface of a recording material against the pretreatment liquid can be uniformed. For example, when a plain paper is used as the recording material, the paper typically has an area which is easily wetted and an area which is not easily wetted depending on the quantity of sizing agents included in the plain paper and therefore image deteriorating problems such as the image blurring problem and the uneven image density problem tend to occur. By uniformly applying the pretreatment liquid on a surface of such a plain paper and then spraying a recording ink on the surface of the plain paper, images having good fine line reproducibility and high image density can be recorded without causing the feathering problem and the image blurring problem because the recording ink can be uniformly wetted on the surface of the plain paper.

In addition, the above-mentioned cationic low molecular weight compounds are mixed well with the above-mentioned cationic polymers and therefore the low molecular weight compounds do not cause a precipitation problem or a separation problem when added to the pretreatment liquid. Namely, a pretreatment liquid in which constituents are uniformly mixed can be prepared, resulting in formation of a pretreatment liquid having good preservability and reliability, and thereby the coating weight of the pretreatment liquid can be stabilized.

Cationic particles can also be used as the solubility depression compound while being dispersed or suspended in the pretreatment liquid. When cationic resin emulsions are used as cationic particles, the cation concentration in the resultant pretreatment liquid tends to become relatively low compared to that of the pretreatment liquids including cationic polymers or cationic low molecular weight compounds mentioned above. Therefore when cationic emulsions are used, it is preferable to use a cationic emulsion in combination with another cationic compound such as the water-soluble cationic polymers and cationic surfactants having a higher alkyl group mentioned above.

Suitable dispersions and suspensions of cationic particles include cationic resin emulsions and dispersions of white or pale-colored cationic pigments. Specific examples of the cationic resin emulsions include styrene-acrylic resin emulsions such as ACRYT UW319-SX, ACRYT RKW-460, ACRYT RKW-400SX, ACRYT RKW-450SX and ACRYT RKW-450 which are manufactured by Taisei Kako Co., Ltd. and which are marketed.

By adding a cationic emulsion to a pretreatment liquid, ink images having relatively high gloss compared to the ink images prepared by using a pretreatment liquid including only a cationic polymer can be recorded. In addition, the resultant ink images also have good water-resistance and abrasion resistance. In addition, by including an additive such as ultraviolet absorbents, antioxidants and quenchers in the pretreatment liquid, the light resistance of the resultant ink images can be enhanced.

As another example of the cationic particle dispersion or suspension, dispersions of cationic silica are exemplified. Suitable cationic silica dispersions include silica sols in which a spherical silica having a particle diameter of about 0.1 μm is dispersed in water. Specific examples of such cationic silica dispersions include SNOWTEX AK (from Nissan Chemical Industries, Ltd.), SMR8-17-109SMSG 3CS (from Grace Japan KK), CEP10AK97002 (from CABOT Co.), etc., all of which are marketed. When only a cationic silica is used, the cation concentration of the resultant pretreatment liquid tends to be low similarly to the case using cationic resin emulsions. Therefore in order to produce high quality ink images, it is preferable to use a cationic silica in combination with another cationic compound such as water-soluble cationic polymers and cationic surfactants having a higher alkyl group. By adding a cationic silica into a pretreatment liquid, the tackiness of ink images just after being printed can be improved compared to a case in which a pretreatment liquid which includes only a water-soluble cationic polymer is used.

Polyvalent metal salts can also be used in the pretreatment liquid as the solubility depression compound. However, polyvalent metal salts generally have a relatively low solubility depression ability compared to the cationic polymers and cationic surfactants. Therefore it is preferable to use a polyvalent metal salt while taking consideration of the anionic compound included in the recording ink used. Namely, when a polyvalent metal salt is used for the pretreatment liquid, it is preferable to use dyes, which include two or more, preferably three or more, carboxyl groups or sulfonate groups in their molecule, as the colorant of the recording ink. When a pigment is used as the colorant of the recording ink, it is preferable to use a polymer having carboxyl groups as a dispersant or to use a pigment with which carboxyl groups are connected by covalent bonding as a colorant. When a polyvalent metal salt is used in the pretreatment liquid and a dye is used in the recording ink, a complex is formed by the dye and the metal salt, resulting in improvement of the light resistance of the resultant ink image.

Specific examples of the polyvalent metal salts include aluminum chloride, calcium chloride, aluminum nitrate, magnesium nitrate, magnesium chloride, calcium nitrate, magnesium hydroxide, aluminum sulfate, ammonium alum, etc. More specific examples thereof include magnesium nitrate hexahydrate, magnesium acetate tetrahydrate, calcium nitrate tetrahydrate, calcium acetate monohydrate, calcium chloride anhydride, calcium nitrate lactate pentahydrate, calcium formate anhydride, magnesium benzoate trihydrate, magnesium sulfate heptahydrate, etc.

Specific examples of other cationic compounds which insolubilize the dye included in recording inks include dicyandiamide-formalin polycondensation products, dicyandiamide-diethylenetriamine polycondensation products, epichlorohydrin-dimethylamine addition polymerization products, dimethylallylammonium chloride-sulfur dioxide copolymerization products, dimethylallylammonium chloride polymerization products, an allyamine salt of dialylamine salt-sulfur dioxide copolymers, polymers of an allylamine salt, dialkylaminoethyl(meth)acrylate quaternary ammonium salt, polyallylamine, cationic epoxy resins, polyethylene imine, polyacrylamide, poly(meth)acrylate, polyvinylformamide, cationic emulsions, polyvalence metal salts, etc.

Specific examples of marketed products of such cationic compounds include SUNSTAT E-818, SUNFIX 70, SUNFIX 555C, SUNFIX LC-55, SUNFIX PAC-700 CONC, SANYOERION A-3, SUNFIX 414, SUNFIX 555, SUNFIX PRO-100, SUNFIX 555US, and CELLOPOL YM-500 (all of which are manufactured by Sanyo Chemical Industries, Ltd.); #675, #FR-2P and #1001 (all of which are manufactured by Sumitomo Chemical co., Ltd.); LUPASOL SC61B manufactured by BASF; etc.

In addition, the following marketed products can also be used:

ZP-700 (vinylformamide), MP-184 (polyacrylate), MP-173H (polymethacrylate), MP-180 (polymethacrylate), MX-0210 (polymethacrylate), MX-8130 (polyacrylate), E-395 (polyacrylate), E-305 (polyacrylate), Q-105H (dicyandiamide polymer), NEO-600 (polyacrylamide), Q-101 (polyamine), Q-311 (polyamine) and Q-501 (polyamine), which are manufactured by HYMO Co. Ltd.; SUPERFLOCK 2490 (polyacrylic acid salt), SUPERFLOCK 3180, 3380, 3580, 3880, 3390, 3590, 3500 and SD2081 (all of which are polyacrylamide), ACOFLOCKC498T and C498Y (all of which are polyacrylate), SUPERFLOCK 1500, 1600, ACOFLOCK C481, C483, C485, C488 and C480 (all of which are plymethacrylate), and ACOFLOCK C567, C573, C577 and C581 (all of which are polyamine), which are manufactured by MITSUI-CYTEC Ltd.); PAS-A-1, PAS-A-5, PAS-A-120L, PAS-A-120S, PSA-J-81, PAS-880 and PAS-92 (all of which are diallyldimethylammonium salt coplymerization products), PAS-H-5L, PAS-H-10L and PAS-M-1 (all of which are diallyldimethylammonium salt polymerization products), PAA-HCl-3L and PAA-HCl-10L (all of which are polyallylamine hydrochloride), and PAA-10C (polyallylamine), all of which are manufatured by Nitto Boseki Co., Ltd.; etc.

Cationic quaternary ammonium salts can also be used in the pretreatment liquid of the present invention. Specific examples of the marketed products include IONET $D_{46}$, IONET LEC, SECRYL VN, SUNSTAT 1200, SUNSTAT KT-305C, CATION G-50 and IONET RK-15, all of which are manufactured by Sanyo Chemical Industries, Ltd.

The reaction of a cationic polymer in the pretreatment liquid with an anionic component in the recording ink is most effectively performed in a liquid phase. Therefore it is preferable to record an ink image before the pretreatment liquid applied on a surface of a recording material by an applicator is dried. If the reaction is fully performed, the application weight of the pretreatment liquid can be reduced, and thereby the image qualities of the ink images can be improved without causing the curling problem and cockling problem.

The coating weight of the pretreatment liquid is preferably from 0.5 to 10 $g/m^2$ to prevent the curling problem. When the coating weight is too little, the image quality improving effect is not fully exerted. To the contrary, when the coating weight is too much, the curling problem and the feathering problem tend to occur. In addition, when the coating weight is too much, the density of an ink image which is measured from the backside increases (i.e., the ink-penetration problem tends to occur).

In order to adjust the viscosity of the pretreatment liquid of the present invention, the pretreatment liquid can include a solvent. A suitable solvent is water because water can well dissolve cationic polymers and is safe and low-cost. The content of water in the pretreatment liquid is preferably from 5 to 80% by weight. When the content is too low, the cationic polymer used cannot be stably dissolved. To the contrary, when the content is too high, the image blurring problem, curling problem and cockling problem tend to occur.

In the pretreatment liquid of the present invention, the total content of water and water-soluble liquid compounds is preferably from 20 to 80% by weight. When the content is too low, the viscosity of the pretreatment liquid tends to widely change, resulting in variation of the coating weight of the pretreatment liquid because evaporation of water from the pretreatment liquid cannot be effectively prevented. In addition, the stability of the cationic polymer in the pretreatment liquid deteriorates, and thereby problems such that the pretreatment liquid is gelled or insoluble materials are formed in the pretreatment liquid occur. As the water-soluble liquid compound, water-soluble solvents having a higher boiling point than that of water are preferably used, and the water-soluble organic solvents mentioned below can be preferably used.

When the pretreatment liquid of the present invention is used for an open type applicator, the content of water in the pretreatment liquid is preferably not greater than 40% by weight, and more preferably from 10 to 30% by weight. When the water content is too high, problems such that the viscosity of the pretreatment liquid increases, the pretreatment liquid is gelled and insoluble materials are formed therein due to evaporation of water when the pretreatment liquid is applied and the pretreatment liquid is allowed to settle in an applicator without being used. In addition, water in the coated pretreatment liquid tends to evaporate at a time between the application of the pretreatment liquid and image printing, and thereby the fluidity of the pretreatment liquid deteriorates and reactivity thereof with ink images also deteriorates, resulting in insufficient improvement of image qualities. In addition, a problem such that the image qualities at the upper part of an image in a sheet are different from those at the lower part occurs. This is because the time from the application to image printing is different at the upper and lower parts.

To the contrary, when the water content is too low, the cationic compound is insufficiently dissolved and thereby problems such that the pretreatment liquid is gelled and insoluble materials are formed therein tend to occur.

As mentioned above, water is preferably used as the solvent of the pretreatment liquid of the present invention. When the pretreatment liquid is used in an open type applicator, it is preferable that the water content therein is relatively low compared to conventional pretreatment liquids to impart stability to the pretreatment liquid. It is preferable that the content of water in the pretreatment liquid of the present invention is less than or about equal to the content of equilibrium moisture that the constituents of the pretreatment liquid other than water absorb in the environment surrounding the open applicator. When the pretreatment liquid includes water in such an amount, evaporation of water from the pretreatment liquid during the application operation of the pretreatment liquid and the non-operating time can be prevented. In addition, if the printing is performed, for example, even at a time as long as 5 minutes passed after the application of the pretreatment liquid, the image quality improving effect can be fully exerted by using such a pretreatment liquid.

In particular, it is preferable that the content of water in the pretreatment liquid is less than the content of the equilibrium moisture of the water-soluble liquid compounds other than water at 60%RH. By controlling the water content of the pretreatment liquid as mentioned above, problems such that the application quantity of the pretreatment liquid changes and thereby the coating weight changes can be prevented.

The pretreatment liquid may include a water-soluble organic solvent. To add such an organic solvent has the following advantages:

(1) the problem in that the viscosity of the pretreatment liquid changes due to evaporation of the solvents therein such as water and thereby the image qualities vary can be prevented;
(2) the physical properties of the pretreatment liquid such as viscosity and surface tension can be controlled;
(3) the solubility depression compound or other additives can be stably dissolved; and
(4) the coating qualities of the pretreatment liquid coated on various recording materials can be improved.

The content of such an organic solvent in the pretreatment liquid is preferably from 5 to 70% by weight. When the content is too low, the viscosity stabilizing effect (item (1)) and dissolving effect (item (3)) are not satisfactory. To the contrary, when the content is too high, the ink-penetration problem and the image blurring problem tend to occur.

Specific examples of such water-soluble organic solvents include polyhydric alcohols such as ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol, 1,2,3-butanetriol, and petriol; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers of polyhydric alcohols such as ethylene glycol monophenyl ether, and ethylene glycol monobenzyl ether; nitrogen-containing alicyclic compounds such as N-methyl-2-pyrrolidone, N-hydroxyethyl-2-pyrrolidone, 2-pyrrolidone, 1,3-dimethylimidazolidinone, and ε-caprolactam; amines such as monoethanol amine, diethanol amine, and triethanol amine; sulfur-containing compounds such as sulforane, and thiodiethanol; propylene carbonate, ethylene carbonate, γ-butyrolactone, etc.

These solvent can be used alone or in combination, together with water.

The species of the water-soluble organic solvents used and the formulation of the pretreatment liquid are determined depending on the species of the other constituents of the pretreatment liquid. In particular, since the pretreatment liquid of the present invention includes at a high concentration a solubility depression compound such as cationic polymers, it is preferable to select a water-soluble organic solvent such that the solubility of the solubility depression compound in the pretreatment liquid can be maintain.

Among these compounds, diethylene glycol, thiodiethanol, polyethylene glycol 200 to 600, triethylene glycol, glycerin, 1,2,6-hexanetriol, 1,2,4-butanetriol, petriol, 1,5-pentanediol, N-mehyl-2-pyrrolidone, N-hydroxydiethyl pyrrolidone, 2-pyrrolidone, and 1,3-dimethylimidazolidinone are preferably used. By using such compounds, the solubility of the solubility depression compound in the pretreatment liquid can be maintained, and thereby the pretreatment liquid can be stably applied to a recording material.

In addition, it is preferable to include a monohydric alcohol in the pretreatment liquid to prevent uneven coating due to foaming of the pretreatment liquid. Namely after the pretreatment liquid including such a monohydric alcohol is coated on a recording material and then an ink image is recorded thereon, the resultant ink image has uniform image density.

Since the pretreatment liquid includes water and a water-soluble solvent as main solvents, the wettability and permeability of the ink used for recording images against the recording materials are not adversely affected even after the recording material is applied with the pretreatment liquid. Therefore, high quality images can be formed even when the images are recorded at a high speed.

In addition, the constituents of the pretreatment liquid are stable and therefore the properties of the pretreatment liquid hardly change even after long preservation.

In addition, the pretreatment liquid of the present invention may include a surfactant. When a pretreatment liquid including a cationic resin and a surfactant is applied on a recording material and then an ink image is recorded thereon, uneven wetting of the ink on the recording material due to uneven distribution of surface sizing agents included in the recording material can be prevented. Therefore high quality images having high fine line reproducibility and high image density can be produced without causing the feathering problem and image blurring problem. This is because the recording ink uniformly penetrates into the recording material and in addition the colorant in the ink is mainly present in the surface portion of the recording material by being insolubilized by the pretreatment liquid.

Specific examples of such surfactants include anionic surfactants such as sodium dodecylbenzenesulfonate, sodium laurate, and ammonium salts of polyoxyethylene alkylether sulfate; cationic surfactants such as distearyldimethylammonium chloride, stearyldimethylbenzylammonium chloride, stearyltrimethylammonium chloride, cetyltrimethylammonium chloride, myristyldimethylbenzylammonium chloride, benzalkonium chloride, aminopropylethyldimethylammonium salts of ethyl sulfate lanolin fatty acid, and didecyldimethylammonium chloride; amphoteric surfactants such as imidazoline derivatives; nonion surfactants such as polyoxyethylene alkyl ethers, polyoxyethylene alkylphenyl ethers, polyoxyethylene alkyl esters, polyoxyethylene alkyl amines, polyoxyethylene alkyl amides, polyoxyethylene propylene block polymers, sorbitan fatty acid esters, polyoxyethylene sorbitan fatty acid esters, and adducts of acetylene alcohol with ethylene oxide; and fluorine-containing surfactants, etc.

The content of the surfactant in the pretreatment liquid is preferably from 0.1 to 50% by weight. In order to maintain the uniformity of the pretreatment liquid, cationic surfactants are preferably used. By applying the pretreatment liquid including a cationic surfactant to a recording material, the wettability of the recording material to a recording ink can be improved, and thereby high quality images having high image density and good water resistance can be recorded thereon. Specific examples of the cationic surfactants include IONET $D_{46}$, IONETLEC, SECRYLVN, SUNSTAT 1200, SUNSTATKT-305C, CATIONG-50, and IONET RK-15, all of which are manufactured by Sanyo Chemical Industries, Ltd.

As a result of the present inventors' investigation, it is found that by using a pretreatment liquid including a specific surfactant having one of formulae (24) to (29) and a solubility depression compound, the penetration property of a recording ink into a recording material can be improved, and in addition the colorant in the recording ink remains in the surface portion of the recording material. Therefore, high quality images having good fine-line reproducibility, high image density and good water resistance can be recorded without causing the feathering problem and the image blurring problem.

At this point, the contact angle of the ink against the recording material on which the pretreatment liquid has been applied is preferably not greater than 90°. In addition, the surface tension of the pretreatment liquid is preferably from 40 to 60 mN/m and the surface tension of the recording ink is preferably from 20 to 40 mN/m.

According to the present invention, when the penetration property of the recording ink into the recording material used is improved, the fixing speed and the drying speed of the recording ink can be increased, and thereby high speed recording can be performed. When a pretreatment liquid including the specific surfactant and a cationic polymer, which can depress the dispersibility or solubility of the colorant included in the ink used, is applied on a recording material such as plain paper and then an image is recorded thereon by the ink, uneven wetting of the ink on the recording material due to uneven distribution of surface sizing agents included in the recording material can be prevented. This is because the recording ink uniformly penetrates into the recording material and in addition the colorant in the ink remains in the surface portion of the recording material by being insolubilized by the pretreatment liquid.

The content of the surfactants having one of formulae (24) to (29) in the pretreatment liquid is preferably from 0.1 to 50% by weight, and more preferably from 0.1 to 10% by weight. Among the surfactants, the surfactants having formula (24) (i.e., benzalkonium chloride) are preferably used.

By using such surfactants, the wettability of the recording material used to the recording ink can be improved, and thereby the speed of penetration of the ink into the recording material can be further improved. Therefore high quality images having high image density and good water resistance can be produced at a high recording speed.

In addition, a wet accelerating agent can be added in the pretreatment liquid of the present invention. In this case, the surface tension of the pretreatment liquid is preferably controlled so as to be not greater than 40 mN/m to improve the wettability of the pretreatment liquid against the applicator applying the pretreatment liquid to the recording material. By improving the wettability of the pretreatment liquid, the liquid is uniformly applied to the recording material and in addition, image qualities can be improved even in a small coating amount. In addition, by improving the wettability of the pretreatment liquid to the applicator such as rubber rollers and metal rollers, the pretreatment liquid can be easily and uniformly coated on various recording materials.

As mentioned above, wet accelerating agents other than surfactants can be added to the pretreatment liquid to adjust the surface tension thereof. Specific examples of such wet accelerating agents include alkyl or aryl ethers of a polyhydric alcohol such as diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether; polyhydric alcohols such as 1,6-hexanediol, 1,5-pentanediol, 2-ethyl-1,3-hexanediol, 2,2,4-trimethyl-1,3-pentanediol and 2-ethyl-1,3-hexanediol; polyoxyethylene-polyoxypropylene block copolymers; lower alcohols such as ethanol and 2-propanol; etc. However, the wet accelerating agents are not limited thereto and any compounds which can dissolve in the pretreatment liquid and adjust the property (i.e., surface tension) to be controlled can be used.

The pretreatment liquid of the present invention preferably includes a binder resin to improve the fixability of recorded ink images. Specific examples of the binder resins include acrylic resins, vinyl acetate resins, styrene-butadiene resins, vinyl chloride resins, acrylic-styrene resins, butadiene resins, styrene resins, etc.

In addition the pretreatment liquid of the present invention preferably includes an antiseptic agent or antimildew agent in an amount of from 0.1 to 5% by weight. Since the pretreatment liquid is typically applied on a recording material while the applicator contacts the recording material, pollutants such as paper dusts tend to be mixed with the pretreatment liquid, resulting in changes of the properties of the pretreatment liquid, and thereby problems such that the coating weight changes and satisfactory image quality improving effect cannot be exerted occur. By including an antiseptic agent or antimildew agent in the pretreatment liquid in an amount of from 0.1 to 5% by weight, the resultant pretreatment liquid can be used for a long period of time without causing such problems.

Specific examples of the antiseptic agents include sodium benzoate, sodium pentachlorophenol, sodium 2-pyridinethiol-1-oxide, sodium sorbate, sodium dehydroacetate, 1,2-dibenzylthiazoline-3-one (PROXEL CRL, PROXEL BDN and PROXEL GXL manufactured by Avecia), etc. When the content is too low, the antiseptic or antimildew effect is not satisfactory. When the content is too high, the image qualities of ink images deteriorate.

The pH of the pretreatment liquid is preferably controlled so as to be near neutral (i.e., 7). When stainless steel or nickel is used as the applicator, the pH of the pretreatment liquid is preferably controlled so as to be from 8 to 11, in order to prevent the applicator from being corroded. However, cationic resins can be easily dissolved at relatively low pH. Therefore the pH of the pretreatment liquid is preferably controlled so as to be near neutral in view of corrosion of the applicator used and dissolution of the cationic resins used.

In order to control the pH of the pretreatment liquid, a pH controlling agent can be used. Specific examples of such a pH controlling agent include amines such as diethanol amine and triethanol amine; hydroxides of an alkali metal such as lithium hydroxide, sodium hydroxide and potassium hydroxide; hydroxides such as ammonium hydroxide, quaternary ammonium hydroxide, and quaternary phosphonium hydroxide; carbonates such as lithium carbonate, sodium carbonate, and potassium carbonate; etc.

In order to improve the light resistance of the recorded ink images, the pretreatment liquid may include additives such as ultraviolet absorbents and antioxidants. Specific examples of the ultraviolet absorbents include known ultraviolet absorbents such as benzotriazole compounds, salicylates, benzophenone compounds, cyanoacrylate compounds, benzofuran derivatives, substituted acrylonitrile, substituted N-phenylaminoethylene compounds, pyron compounds, methylenemaloate, cinnamate, phenyl salicylate, and hindered amine compounds.

Specific examples of antioxidants include known antioxidants such as phenol compounds, sulfur-containing compounds, phosphoric acid compounds, naphthol compounds, hindered phenol compounds, paraphenylenediamine compounds, hydroquinone compounds, organic sulfur compounds, organic phosphoric acid compounds, hindered amine compounds, cumaron compounds, spiroindane compounds, and hydrazine compounds. These ultraviolet absorbents and antioxidants may be added to the pretreatment liquid as a form of an emulsion to improve the dispersion property thereof.

Then the recording ink will be explained in detail.

The recording ink for use in the image recording method of the present invention is not limited to aqueous inks. The feature of the present invention is to apply the pretreatment liquid, which includes at a high concentration a compound capable of depressing the dispersibility or solubility of a component included in the recording ink used, on a recording material, and therefore, the recording ink does not necessarily include an ionic compound. However, as mentioned above, current inkjet inks typically include anionic dyes or pigments. In the present invention, the formulation of the recording ink is not particularly limited, but it is most effective to use a combination of a recording ink including an anionic colorant and a pretreatment liquid including a cationic compound.

As the anionic component preferably included in the recording ink for use in the present invention, anionic colorants such as anionic dyes, pigments and dyes dispersed by an anionic dispersant, pigments having an anionic group, and anionic color particles are typically used. Namely, since colorants having an anionic functional group or colorants on which anionic component is adsorbed are used, the reaction of the anionic component in the recording ink reacts with the cationic compound in the pretreatment liquid, and therefore the colorant in the recording ink effectively remains on the surface portion of the recording material. Thereby high density image can be recorded, backside density can be decreased (i.e., ink-penetration problem can be prevented), and the feathering problem and the image blurring problem can be prevented.

Suitable dyes for use in the recording ink for use in the image recording method of the present invention include water-soluble dyes classified into acid dyes, direct dyes, basic dyes, reactive dyes, and food dyes by their color indexes.

Specific examples of acid dyes and food dyes include C.I. Acid Yellow 17, 23, 42, 44, 79 and 142; C.I. Acid Red 1, 8, 13, 14, 18, 26, 27, 35, 37, 42, 52, 82, 87, 89, 92, 97, 106, 111, 114, 115, 134, 186, 249, 254 and 289; C.I. Acid Blue 9, 29, 45, 92 and 249; C.I. Acid Black 1, 2, 7, 24, 26 and 94; C.I. Food Yellow 3 and 4; C.I. Food Red 7, 9 and 14; and C.I. Food Black 1 and 2.

Specific examples of the direct dyes include C.I. Direct Yellow 1, 12, 24, 26, 33, 44, 50, 86, 120, 132, 142 and 144; C.I. Direct Red 1, 4, 9, 13, 17, 20, 28., 31, 39, 80, 81, 83, 89, 225 and 227; C.I. Direct Orange 26, 29, 62 and 102; C.I. Direct Blue 1, 2, 6, 15, 22, 25, 71, 76, 79, 86, 87, 90, 98, 163, 165, 199 and 202; and C.I. Direct Black 19, 22, 32, 38, 51, 56, 71, 74, 75, 77, 154, 168 and 171.

Specific examples of the basic dyes include C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155; and C.I. Basic Black 2 and 8.

Specific examples of the reactive dyes include C.I. Reactive Black 3, 4, 7, 11, 12 and 17; Reactive Yellow 1, 5, 11, 13, 14, 20, 21, 22, 25, 40, 47, 51, 55, 65 and 67; C.I. Reactive red 1, 14, 17, 25, 26, 32, 37, 44, 46, 55, 60, 66, 74, 79, 96 and 97; and C.I. Reactive Blue 1, 2, 7, 14, 15, 23, 32, 35, 38, 41, 63, 80 and 95.

In the recording ink for use in the present invention, anionic acid dyes and direct dyes are preferably used. In addition, dyes developed for inkjet inks can be preferably used. Specific examples of such dyes include PROJECT FAST BLACK 2, PROJECT FAST CYAN 2, PROJECT FAST MAGENTA 2, and PROJECT FAST YELLOW 2, which are manufactured by Avecia.

It is confirmed that the pretreatment liquid and image recording method of the present invention are useful for recording high quality images when a recording ink including a pigment as a colorant is used as well as a recording ink including a dye. Suitable pigments for use in the recording ink include known inorganic pigments and organic pigments.

Specific examples of the inorganic pigments include titanium oxide, iron oxide, carbon blacks manufactured by a known method such as contact methods, furnace methods and thermal methods. Specific examples of the organic pigments include azo pigments (which include azo lakes, insoluble azo pigments, condensation azo pigments, chelate azo pigments, etc.), polycyclic pigments (for example, phthalocyanine pigments, perylene pigments, perynone pigments, anthraquinone pigments, quinacridone pigments, dioxadine pigments, thioindigo pigments, isoindolinone pigments, quinophthalone pigments, etc.), dye chelates (for example, basic dye chelates, acidic dye chelates, etc.), nitro pigments, nitroso pigments, aniline black, etc.

Specific examples of the black pigments include carbon black (C.I. Pigment Black 7) such as furnace black, acetylene black and channel black; metal and metal compounds such as copper, iron (C.I. Pigment Black 11), and titanium oxide; and organic pigments such as Aniline Black.

Specific examples of the color pigments include C.I. Pigment Yellow 1 (i.e., Fast Yellow G), 3, 12 (i.e., Disazo Yellow AAA), 13, 14, 17, 24, 34, 35, 37, 42 (i.e., yellow iron oxide), 53, 55, 81, 83 (i.e., Disazo Yellow HR), 95, 97, 98, 100, 101, 104, 408, 109, 110, 117, 120, 138 and 153; C.I. Pigment Orange 5, 13, 16, 17, 36, 43 and 51; C.I. Pigment Red 1, 2, 3, 5, 17, 22 (Brilliant Fast Scarlet), 23, 31, 38, 48:1 (Permanent Red 2B(Ba)), 48:2 (Permanent Red 2B(Ca)), 48:3 (Permanent Red 2B(Sr)), 48:4 (Permanent Red 2B(Mn)), 49:1, 52:2, 53:1, 57:1 (Brilliant Carmine 6B), 60:1, 63:1, 63:2, 64:1, 81 (Rhodamine 6G Lake), 83, 88, 101 (red iron oxide), 104, 105, 106, 108 (Cadmium Red), 112, 114, 122 (Quinacridone Magenta), 123, 146, 149, 166, 168, 170, 172, 177, 178, 179, 185, 190, 193, 209 and 219; C.I. Pigment Violet 1 (Rhodamine Lake), 3, 5:1, 16, 19, 23 and 38; C.I. Pigment Blue 1, 2, 15 (Phthalocyanine Blue R), 15:1, 15:2, 15:3 (Phthalocyanine Blue E), 16, 17:1, 56, 60 and 63; C.I. Pigment Green 1, 4, 7, 8, 10, 17, 18 and 36; etc.

Among these pigments, pigments having a good affinity to water can be preferably used. The particle diameter of pigments is preferably from 0.05 μm to 10 μm, more preferably from 0.05 μm to 1 μm, and even more preferably from 0.05 μm to 0.16 μm. The content of the pigment serving as a colorant in a recording ink is preferably from 0.5 to 25% by weight and more preferably from 2 to 15% by weight.

These pigments are preferably dispersed with an anionic dispersant. Suitable anionic dispersants include polyacrylic acid, polymethacrylic acid, acrylic acid-acrylonitrile copolymers, vinyl acetate-acrylate copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methylstyrene-acrylic acid copolymers, styrene-α-methylstyrene-acrylic acid alkyl ester copolymers, styrene-maleic acid copolymers, vinyl naphthalene-maleic acid copolymers, vinyl acetate-ethylene copolymers, vinyl acetate-fatty acid vinyl ester-ethylene copolymers, vinyl acetate-maleate copolymers, vinyl acetate-crotonic acid copolymers, vinyl acetate-acrylic acid copolymers, and other known anionic dispersants which can be used for preparing a pigment dispersion.

According to the present invention, these copolymers preferably have a weight average molecular weight of from 3,000 to 50,000, more preferably from 5,000 to 30,000, and even more preferably from 7,000 to 15,000. The dispersant is included in a recording ink in such an amount that the pigment used can be stably dispersed without deteriorating other properties of the ink. Specifically, the ratio of the dispersant to the pigment included in an ink is preferably from 0.06/1 to 3/1 by weight, and more preferably from 0.125/1 to 3/1 by weight. When a recording ink is prepared, it is preferable that at first a pigment is dispersed in water using a dispersant to prepare a pigment dispersion, and then the pigment dispersion is mixed with other ink constituents to prepare the recording ink.

In addition, graft pigments in which a surface of a pigment (for example, carbon black) is treated with a resin such that the pigment can be easily dispersed in water; process pigments in which a surface of a pigment (for example, carbon black) is treated with a functional group such as a sulfonate group and a carboxyl group; etc. can also be used. Further, microencapsulated pigments which can be dispersed in water can also be used for the ink for use in the image forming method of the present invention.

In addition, an ink including a pigment dispersed in the ink using an anionic surfactant can also be used as the recording ink for use in the image forming method of the present invention. Specific examples of such anionic surfactants include fatty acids and their salts such as oleic acid and its salts, lauric acid and its salts, behenic acid and its salts, and stearic acid and its salts; alkylsulfonic acids and their salts such as dodecylsulfonic acid and its salts, and decylsulfonic acid and its salts; alkylsulfuric acids and their salts such as laurylsulfuric acid and its salts, and oleilsulfuric acid and its salts; alkylbenzene sulfonic acids and their salts such as dodecylbenzene sulfonic acid and its salts, and laurylbenzene sulfonic acid and its salts; dialkylsulfosuccinic acid and their salts such as dioctylsulfosuccinic acid and its salts, and dihexylsulfosuccinnic acid and its salts; aromatic anionic surfactants such as naphthylsulfonic acids and their salts, and naphthylcarboxylic acids and their salts; fluorine-containing anionic surfactants such as fluorinated alkylcarboxylic acids and their salts, and fluorinated alkylsulfonic acids and their salts; etc.

In addition, the following pigments whose surface is modified are preferably used for the ink useful for the image recording method of the present invention:

(1) pigments (e.g., carbon black) which are radically reacted with a diazonium compound having a hydrophilic group to be directly connected with the hydrophilic group through a covalent bonding;
(2) pigments (e.g., carbon black) whose surface is subjected to an oxidization reaction so as to have a carboxyl group; and
(3) pigments which is reacted with fuming sulfuric acid so as to have a sulfonate group.

These ionic pigments can be dispersed in a recording ink without using a dispersant. Therefore such a recording ink can be preferably used in the image forming method of the present invention.

When a recording ink in which a pigment is dispersed is used, the particle diameter of the dispersed pigment is not particularly limited. However, an ink including a pigment having a particle diameter distribution such that the mode (i.e., the most popular particle diameter) of particle diameter of the dispersed pigment particles on a number basis is within a range of from 20 to 150 nm is preferably used. When the particle diameter of the dispersed pigment is too large, the stability of the dispersed pigment deteriorates and in addition the stability of discharging of the recording ink also deteriorates, resulting in decrease of the image density. When the particle diameter of the dispersed pigment is too small, the preservation property and discharge property of the ink are good, and in addition image qualities are also good when the pretreatment liquid of the present invention is used. However, in order to prepare such an ink, the dispersion process and classification process are complicated, and thereby it is hard to economically manufacture the ink.

As another embodiment of the recording ink for use in the image forming method of the present invention, a recording ink in which a colored particulate resin is suspended is exemplified. Specific examples of such colored particulate resins include particulate resins in which styrene-acrylic resins, polyester resins, polyurethane resins, etc. are colored using an oil-soluble dye, a dispersion dye or a pigment. In order to stably suspend such a colored particulate resin, it is preferable that the shell of the particulate resin is made of a hydrophilic resin such as polyacrylic acid and polymethacrylic acid, or the particulate resin is suspended using an ionic surfactant. The thus prepared recording ink in which an anionic color particulate material is suspended in a liquid medium can be preferably used in the recording ink.

In addition, the recording ink for use in the image recording method of the present invention may include a negatively-charged resin emulsion. By including a negatively-charged resin emulsion in the recording ink, the negatively-charged resin emulsion is coagulated as well as agglomeration of the colorant in the recording ink, or the viscosity of the resin emulsion significantly increases, and thereby the penetration of the coloring materials such as the colorant into the recording material can be prevented, and in addition, fixation of the recorded image on the recording material can be accelerated. Further, since resin emulsions tend to form a film on the recording material, the abrasion resistance, light resistance and water resistance of the recorded image can be improved.

The resin emulsions are defined as an emulsion in which a resin (i.e., a dispersion phase) is dispersed in water (i.e., a continuous phase). Specific examples of the resin for use as the dispersion phase include acrylic resins, vinyl acetate resins, styrene-butadiene resins, vinyl chloride resins, acrylic-styrene resins, butadiene resins, styrene resins, etc.

The resins for use in the resin emulsion are preferably polymers having both a hydrophilic portion and a hydrophobic portion. The particle diameter of the resin emulsions is not particularly limited, but is preferably not greater than 150 nm and more preferably from 5 nm to 100 nm.

These resin emulsions can be prepared by mixing a particulate resin with water optionally using a surfactant.

Specific examples of marketed resin emulsions for use in the recording ink include MICROGEL E-1002 and E-5002 which are styrene-acrylic resin emulsions and which are manufactured by Nippon Paint Co., Ltd.; BONCOAT 4001 which is an acrylic resin emulsion and which is manufactured by Dainippon Ink & Chemicals, Inc.; BONCOAT 5454 which is a styrene-acrylic resin emulsion and which is manufactured by Dainippon Ink & Chemicals, Inc.; SAE-1014 which is a styrene-acrylic emulsion and which is manufactured by Nippon Zeon Co., Ltd.; CYBINOL SK-200 which is an acrylic resin emulsion and which is manufactured by Saiden Chemical Co., Ltd.; etc.

The resin emulsion is preferably added in a recording ink such that the content of the resin component is from 0.1 to 40% by weight, and more preferably from 1 to 25% by weight. When the recording ink is an aqueous liquid, hydrophilic polymers can be added to the recording ink. In particular, when an anionic water-soluble polymer is added to the recording ink, the depression of dispersibility or solubility of a component in the ink caused by the pretreatment liquid including a cationic compound can be accelerated Specific examples of the hydrophilic polymer compounds include natural polymers such as vegitable polymers (e.g., acasia, trangacanth gum, goor gum, karaya gum, locust bean gum, arabinogalactone, pectin and quince seed starch), seaweed polymers (e.g., alginic acid, carageenan and agar), animal polymers (e.g., gelatin, casein, albumin, collagen and cellac), and microbe polymers (e.g., xanthene gum and dextran); semi-synthesis polymers such as cellulose polymers (e.g., methyl cellulose, ethyl cellulose, hydroxyethyl cellulose, hydroxypropyl cellulose, and carboxymethyl cellolose), starch polymers (e.g., starch glycolic acid sodium salt, and starch phosphoric acid ester sodium salt), seaweed polymers (e.g., sodium alginate, and propylene glycol esters of alginic acid); synthetic polymers such as vinyl polymers (e.g., polyvinyl alcohol, polyvinyl pyrrolidone, and polyvinyl methyl ether), acrylic resins (e.g., non-crosslinked polyacrylamide, polyacrylic acid and its alkali metal salts, and water-soluble styrene-acrylic resins), water-soluble styrene-maleic acid resins, water-soluble vinylnaphthalene-acrylic resins, water-soluble vinylnaphthalene-maleic acid resins, alkali metal salts of condensation products of formalin with β-naphthalenesulfonic acid, etc.

The recording ink may include saccharides such as monosaccharides, disaccharides, oligosaccharides (including tri- or tetrasaccharides) and polysaccharides. Specific examples of the sacharides include glucose, mannose, fructose, ribose, xylose, arabinose, galactose, maltose, cellobiose, lactose, sucrose, trehalose, malttriose, etc. At this point, polysaccharides mean saccharides in extensive interpretation, and are interpreted so as to include natural substances such as α-cyclodextrin and cellulose.

In addition, the recording ink may include derivatives of saccharides such as reducing saccharides (for example, sugar alcohols having a formula $HOCH_2(CHOH)_nCH_2OH$, wherein n is an integer of from 2 to 5), and oxidizing saccharides (for example, aldonic acid and uronic acid), amino acids, thioachids, etc. In particular, sugar alcohols are preferably used. Specific examples of the sugar alcohols include maltitol, sorbit, etc. The content of the saccharides in the recording ink is preferably from 0.1 to 40% by weight and more preferably from 0.5 to 30% by weight based on total weight of the recording ink.

The recording ink for use in the image recording method of the present invention may include a penetration accelerator such as surfatants to improve the penetration of the recording ink into recording materials or to improve the wettability of the recording ink to the head (for example, nozzles, etc.), resulting in improvement of the stability of discharging of the recording ink from nozzles, by adjusting the surface tension of the recording ink.

Recording inks having a high penetrating property into recording materials can be preferably used for high speed recording. In conventional inkjet recording methods (i.e., In inkjet recording methods not using a pretreatment liquid), problems such as the ink-penetrating problem and the feathering problem tend to occur if the recording ink has a high penetrating property. However, by using the image recording method of the present invention, the ink-penetrating problem and the feathering problem can be avoided even when images are recorded on a plain paper using a recording ink whose penetrating property is drastically improved.

In the present invention, the surfactants for use in the recording ink are not particularly limited and known surfactants can be used. Specific examples of anionic surfactants include dodecylbenzene sulfonate, laurylsulfate, polyoxyethylene alkyl ether acetate, polyoxyethylene alkyl ether sulfate, dialkylsulfosuccinate, etc.

Specific examples of nonion surfactants include polyoxyethylene alkyl ethers, polyoxyethylene alkyl esters, polyoxyethylene sorbitane fatty acid esters, polyoxyethylene alkylphenyl ethers, polyoxyethylene alkyl amines, polyoxyethylene alkyl amides, acetylene derivatives modified by an ethyleneoxide group, polyoxyethylene-polypropylene block polymers, and fluorine-containing surfactants, etc.

The recording ink may include a penetrant other than surfactants to adjust the surface tension of the recording ink. Specific examples of such penetrant include polyhydric alcohols such as 2-ethyl-1,3-hexanediol, and 2,2,4-trimethyl-1,3-pentanediol; alkyl or aryl ethers of a polyhydric alcohol, such as diethylene glycol monophenyl ether, diethyleneglycol monophenyl ether, ethylene glycol monoallyl ether, diethylene glycol monobutyl ether, propylene glycol monobutyl ether, and tetraethylene glycol chlorophenyl ether; polyoxyethylene polyoxypropylene block copolymers; fluorine-containing surfactants; lower alcohols such as ethanol and 2-propanol; etc.

As the solvent of the recording ink, water is used as a main component. In order to adjust the physical properties of the recording ink, to prevent the recording ink from being dried in nozzles, and/or to improve the stability of the dissolved colorant, one or more of the water-soluble organic solvents mentioned above for use in the pretreatment liquid of the present invention can be included in the recording ink. Among the water-soluble organic solvents, diethylene glycol, thiodiethanol, polyethylene glycol 200 to 600, triethylene glycol, glycerol, 1,2,6-hexanetriol, 1,2,4-butanetriol, petriol, 1,5-pentanediol, N-methyl-2-pyrrolidone, N-hydroxyethyl-2-pyrrolidone, 2-pyrrolidone, 1,3-dimethylimidazolidinone, etc. By using such solvents, inks in which a colorant is stably dissolved at a high concentration and which do not cause a poor-discharging problem in which the recording ink is not discharged or poorly discharged from inkjet nozzles due to evaporation of the solvent (i.e., water) can be prepared.

In addition, the recording ink for use in the image recording method of the present invention may include additives which have been used for conventional recording inks, such as antiseptic agents and antimildew agents. Specific examples of the antiseptic agents and antimildew agents include sodium benzoate, sodium pentachlorophenol, sodium 2-pyridinethiol-1-oxide, sodium sorbate, sodium dehydroacetate, 1,2-dibenzylthiazoline-3-one (PROXEL CRL, PROXEL BDN and PROXEL GXL manufactured by Avecia), etc.

In addition, not only the recording ink but also the pretreatment liquid can include additives such as pH controlling agents, and antirust agents.

Suitable pH controlling agents for use in the recording ink and pretreatment liquid include any known materials which can control the pH of the recording ink so as to be not less than 7 and which do not adversely affect the properties of the recording ink. Specific examples of such pH controlling agents include amines such as diethanol amine and triethanol amine; hydroxide of alkali metals, such as lithium hydroxide, sodium hydroxide and potassium hydroxide; hydroxides such as ammonium hdyroxides, quaternary ammonium hydroxides and quaternary phosphonium hydroxides; carbonates such as lithium carbonate, sodium carbonate and potassium carbonate; chelating agents such as ethylene diamine tetraacetic acid sodium salt, nitrilotriacetic acid sodium salt, hydroxyethylethylenediamine triacetic acid sodium salt, diethylene triamine pentaacetic acid sodium salt, and uramil diacetic acid sodium salt; etc.

Specific examples of the antirust agents include acidic sulfites, sodium thiosulfate, antimony thiodiglycollate, diisopropylammonium nitrite, pentaerythritol tetranitrate, dicyclohexylammonium nitrite, etc.

In addition, additives such as ultraviolet absorbents, infrared absorbents and antioxidants can be added to the recording ink.

Specific examples of the ultraviolet absorbents include known ultraviolet absorbents such as benzotriazole compounds, salicylate compounds, benzophenone compounds, cyanoacrylate compounds, benzofuran derivatives, substituted acrylonitrile compounds, substituted N-phenylaminoethylene compounds, pyrone compounds, methylenemaloate compounds cinnamate compounds, phenyl salicylate compounds, hindered amine compounds, etc.

Specific examples of the antioxidants include phenolic compounds, sulfur compounds, phosphoric acid compounds, naphthol compounds, hindered phenol compounds, parapheylene diamine compounds, hydroquinone compounds, organic sulfur compounds, organic phosphoric acid compounds, hindered amine compounds, coumarone compounds, spiroindane compounds, hydrozine compounds, etc.

These ultraviolet absorbents and antioxidants may be added after being emulsified, so as to be easily dispersed in the recording ink.

Then the image recording method of the present invention in which the pretreatment liquid of the present invention is applied on a recording material and an image is recorded on the recording material before the pretreatment liquid dries will be explained referring to an embodiment of the image recording apparatus for use in the image recording method of the present invention, which is illustrated in FIG. 1.

The image recording apparatus as shown in FIG. 1 is a recording apparatus in which an image is recorded by scanning an inkjet recording head.

In the inkjet recording apparatus having a function of performing a pretreatment, a recording material 6 is fed by a roller 7 and a pretreatment liquid 1 contained in a container 42 is uniformly and thinly applied on the surface of the recording material 6 by an applicator roller 4 and a counter roller 5. The pretreatment liquid 1 is drawn by a drawing roller 3 and then uniformly applied to the applicator roller 3 while the thickness is controlled by a thickness controlling roller 2. The recording material 6 is fed to the recording section having an inkjet recording head 20 while being applied with the pretreatment liquid 1. The distance between a pretreatment end point (i.e., a point A in FIG. 1) and a record starting point (i.e., a point B in FIG. 1) is longer than the length of the recording material 6 in the feeding direction. Therefore when the tip edge of the recording material 6 reaches the record starting point B, the pretreatment operation has been completed.

In this case, the pretreatment operation has been completed before the recording material 6 is intermittently fed such that images are recorded thereon by scanning the inkjet recording head 20. Namely, the pretreatment liquid 1 can be applied on the recording material 6 at a constant speed. Therefore, the pretreatment liquid 1 can be uniformly applied on the recording material 6.

In the recording apparatus as shown in FIG. 1, the recording material 6 on which the pretreatment liquid 1 is to be applied is set in the lower cassette because the distance between the cassette and the recording portion is long enough to apply the pretreatment liquid 1. A recording material 17 on which the pretreatment liquid 1 need not to be applied is set in the upper cassette.

Numerals 10, 11, 12, 13, 14, 15, 16 and 18 denote feeding rollers. Numerals 21, 22 and 23 denote an ink cartridge, a carriage axis and a carriage. Numeral 8 denotes a feeding tray.

Figure 2:
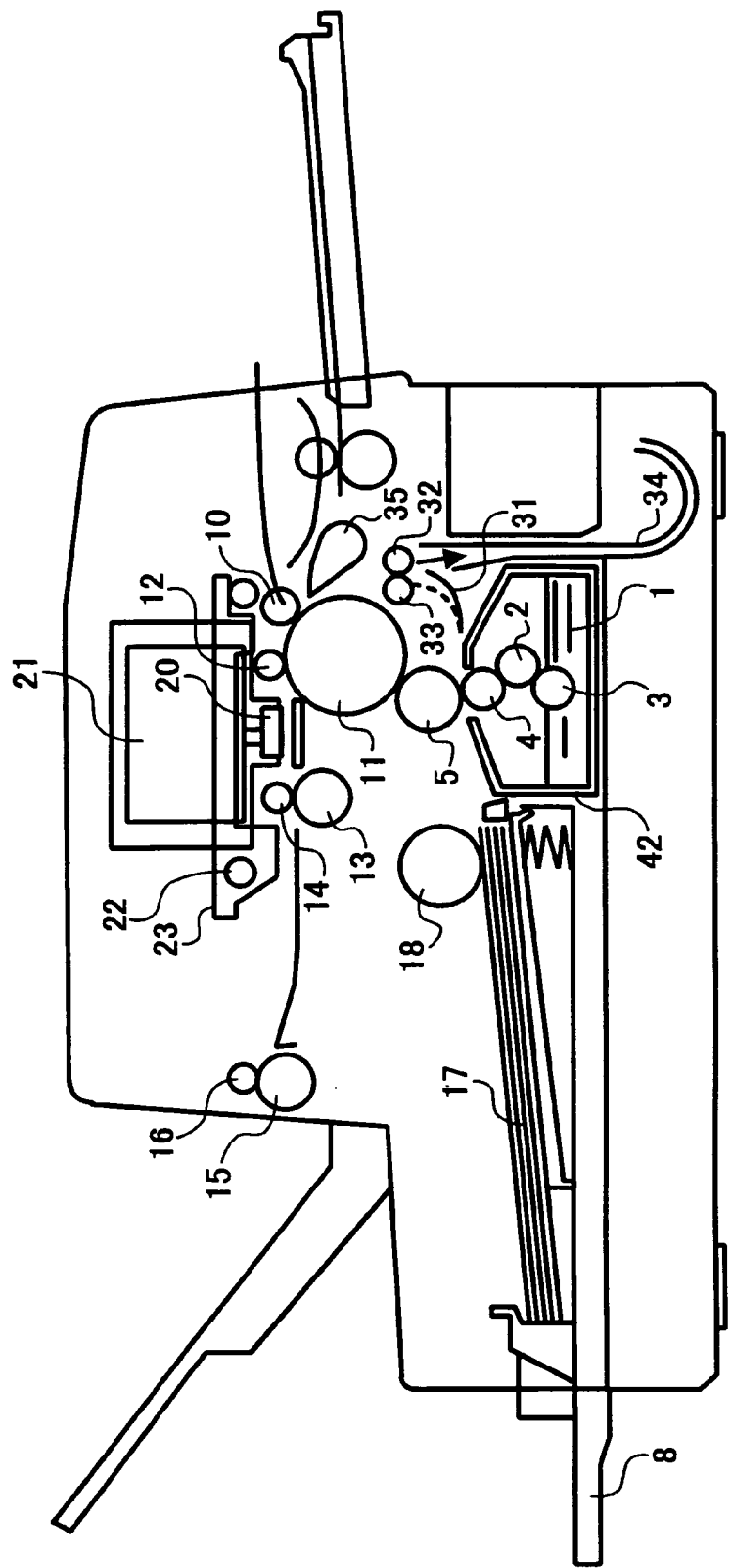
FIG. 2 is a schematic view illustrating another embodiment of the image recording apparatus for use in the image recording method of the present invention.

FIG. 2 is a schematic view illustrating another embodiment of the image recording apparatus for use in the image forming method of the present invention. The recording apparatus as shown in FIG. 2 is also an apparatus in which an image is recorded while an inkjet recording head is scanned. This recording apparatus is more compact than the recording apparatus as shown in FIG. 1. A recording material 17 is fed by a feeding roller 18, and a pretreatment liquid 1 in a container 42 is uniformly and thinly applied on the recording material 17 by an applicator roller 4 and a counter roller 5. The pretreatment liquid 1 is drawn by a drawing roller 3 and is uniformly applied to the application roller 4 by a thickness controlling roller 2.

The recording material 17 is fed while being applied with the pretreatment liquid 1 and passes through an image recording portion having an inkjet recording head 20. The recording material 17 is fed until the recording material 17 is completely subjected to the pretreatment operation. When the pretreatment operation is completed, the recording material 17 is returned such that the leading edge of the recording material 17 is located at the image record starting position. Whether the pretreatment operation is completed can be determined by detecting the recording material 17 at the exit of the pretreatment device using a known detector (not shown in FIG. 2). Alternatively, a method can be used in which the paper feeding length is controlled by preliminarily inputting information about the length of the recording material 17 to a controller and controlling the rotation number of the motor driving the feeding rollers such that the feeding distance becomes greater than the length of the recording material 17.

If the recording material 17 is returned through the same passage through which the recording material 17 has been fed, the rear edge of the recording material 17 is fed into the pretreatment applicator (i.e., toward the nip between the feeding rollers 4 and 5) and thereby problems such that the recording material 17 is contaminated by the pretreatment liquid, unevenly applied with the pretreatment liquid 1 or jammed at the applicator occur. Therefore, when the recording material 17 is returned, the passage of the recording material 17 is changed by a guide 31. Namely, the position of the guide 31 is changed to the position illustrated by a dotted line using a solenoid or a motor such that the recording material 17 is returned through a guide 34. Thus the problems mentioned above can be avoided.

Numerals 32 and 33 denote feeding rollers.

Thus the recording material 17 on which the pretreatment liquid 1 has been applied is set on the record stating position before the pretreatment liquid dries. Then images are formed on the recording material 17 while the recording material 17 is intermittently fed timely to the scanning operation of the inkjet recording head 20.

It is preferable to perform the pretreatment operation at a constant speed of from 20 to 200 mm/s. In the recording apparatus as shown in FIG. 2, after the pretreatment operation is performed on a sheet of the recording material 17, the image recording operation is started for the sheet. In this case, since the speed of the pretreatment operation is generally different from that of the image recording operation, the time between the tip edge of the sheet is applied with the pretreatment liquid and an image is recorded on the tip edge is different from the time for the rear edge of the sheet. Even in a case such that this time difference is fairly large, since the pretreatment liquid of the present invention includes a large amount of a hydrophilic solvent having a higher boiling point than water and a low evaporating speed and in addition the water content is controlled so as to be almost equal to the equilibrium water content of the pretreatment liquid at the environment, the evaporation of water in the pretreatment liquid can be fairly prevented. Therefore, the difference in image qualities between the tip edge of a recording sheet and the rear edge thereof is so little as not to be visually detected.

As can be understood from the above description, the recording material is often fed while contacting feeding elements such as a roller, a guide, etc. after the pretreatment liquid is applied thereon. In this case, when the pretreatment liquid is transferred onto the feeding elements, a feeding problem occurs and/or a problem occurs in that the image qualities deteriorate due to contamination of the feeding elements. In order to avoid such problems, it is preferable to use a waved guide plate and a guide roller with a spur. In addition, it is also preferable that the surface of a roller and a guide is formed of a water repellant material.

In the image recording apparatus as shown in FIG. 2, when a recording material need not to be subjected to the pretreatment, a sheet of the recording material may be fed from a tray 36. The sheet is fed on a guide 35 and then fed by the feed rollers 10, 11 and 12. Thus the sheet is fed to the image recording section, and images are recorded thereon.

It is important that the pretreatment liquid applied on the recording material is rapidly absorbed such that the surface of the recording material is dried in appearance. In order that the recording material applied with a pretreatment liquid achieves such a state, the pretreatment liquid preferably has a surface tension not greater than 40 mN/m such that the pretreatment liquid immediately penetrates into the recording material. The passage in claim 1 "the pretreatment liquid is dried" means that the pretreatment liquid applied is solidified after the liquid components therein have evaporated and does not mean that the pretreatment liquid applied on a recording material appears to be dried at a glance because of being absorbed in the recording material.

By using such recording apparatus as mentioned above which include a combination of a pretreatment liquid applicator and an image recording device, the image recording operation can be performed on a recording material in which the pretreatment liquid is penetrated and the surface of the recording material is dried in appearance. Therefore, even when the application quantity of the pretreatment liquid is relatively small, image qualities can be dramatically improved.

Figure 3:
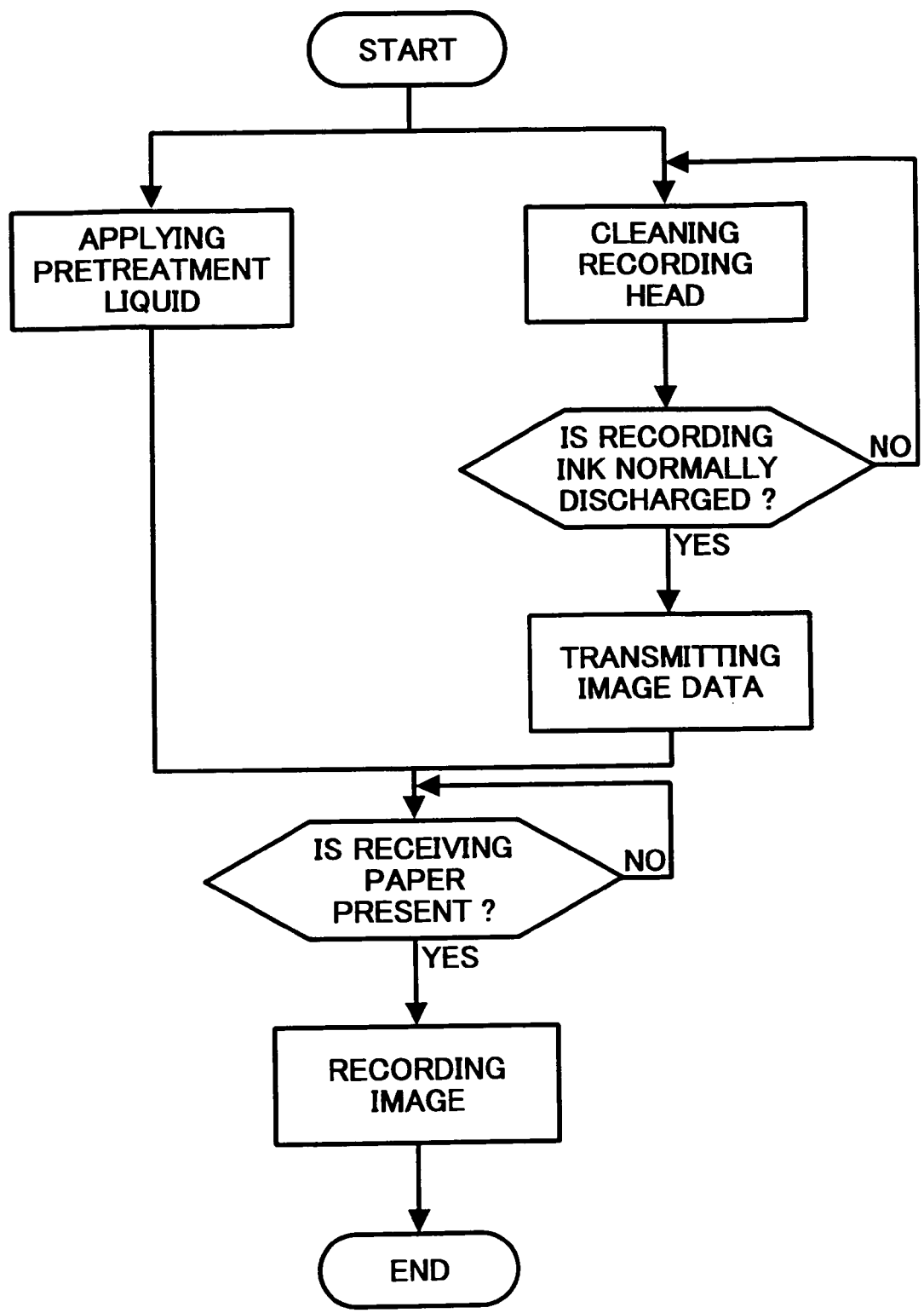
FIG. 3 is a flowchart illustrating an embodiment of the image recording method of the present invention.

FIG. 3 is a flowchart illustrating an embodiment of the sequence of controlling the operation of the image recording apparatus as shown in FIGS. 1 and 2.

When a print order is received by, for example, a personal computer, the image recording apparatus (including the pretreatment applicator) starts to perform preliminary operations (i.e., the step of applying the pretreatment liquid (S1) and the step of cleaning the recording head (S2) at the same time. After completion of the preliminary operations (i.e., when it is confirmed that the ink can be discharged without a problem at the step S3), the image recording apparatus starts to perform an image recording operation. Namely, after the data transmitting operation (S4) and the check as to whether the recording paper is present (S5), ink images are recorded (S6). At the data transmitting operation, the image data transmitted per one time may be the data corresponding to one scanning line images, plural scanning line images, or one page images. The head cleaning operation and ink-discharging check operation are not necessarily performed. In addition, it is not necessary to sequentially perform the head cleaning and ink-discharging check operations, and the image data processing and image data transmission operations. Namely, it is possible to perform in parallel the pretreatment, head cleaning, ink-discharging check, image data processing and image data transmission operations. By performing these operations in parallel, images can be recorded without deteriorating throughput of the image recording apparatus even when the pretreatment operation is performed.

Figure 4:
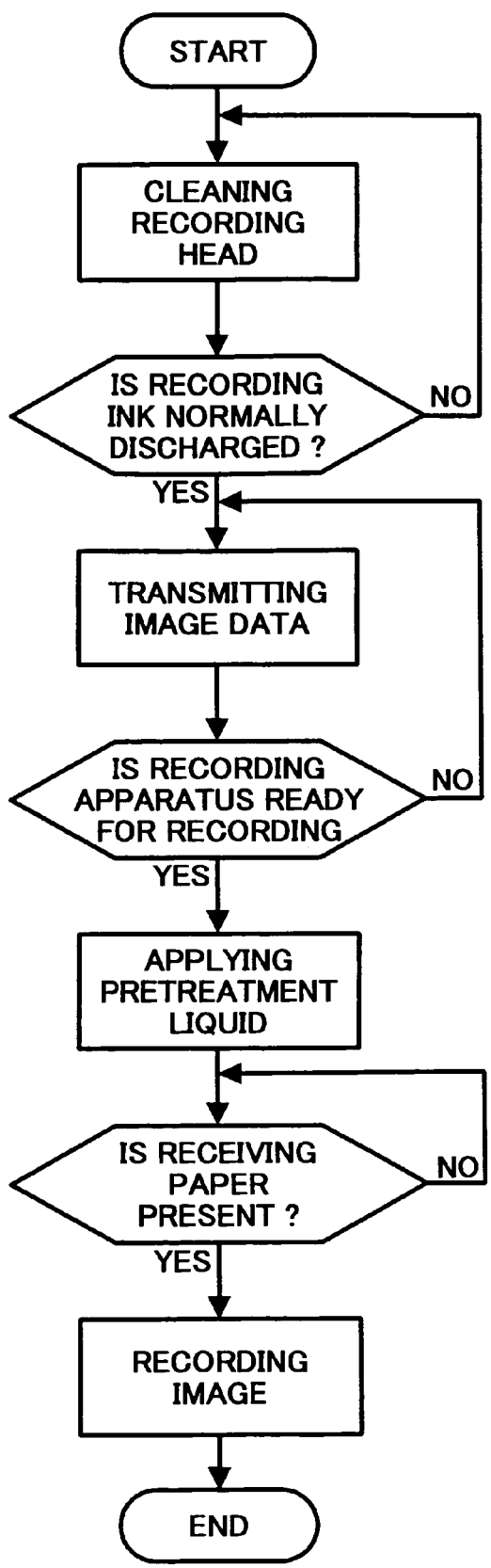
FIG. 4 is a flowchart illustrating another embodiment of the image recording method of the present invention.

FIG. 4 is a flowchart illustrating another embodiment of the image forming method of the present invention. In this embodiment, the head cleaning operation (S1), ink discharing check (S2), image data transmission operation (S3), the check as to whether the recording apparatus is ready for recording (S4), the pretreatment operation (S5), the check as to whether the recording paper is present (S6) and recording operation (S7) are performed serially.

As the inkjet device for use in the image recording method of the present invention, by which images are recorded on a recording material which has been subjected to the pretreatment, any known inkjet devices can be used. In the image recording apparatus as shown in FIGS. 1 and 2, a scanning type inkjet device is illustrated. By using a lined inkjet device, the pretreatment operation and the image recording operation can be performed at the same time at a constant feeding speed.

Suitable inkjet recording methods for use in the image recording method of the present invention include methods using an on-demand head using a piezoelectric actuator such as PZT; methods in which thermal energy is applied to an on-demand head; methods using an on-demand head using an actuator utilizing electrostatic force; methods using a charge controlling type continuous injection head, etc. When using the methods in which thermal energy is applied to a head, it is hard to freely control discharging of ink drops and therefore a problem such that the image qualities change tends to occur when the recording material is changed. However, by applying the pretreatment liquid of the present invention, such a problem can be avoided, and high quality images can be recorded on various recording materials.

Having generally described this invention, a further understanding can be obtained by reference to certain specific examples which are provided herein for purposes of illustration only and are not intended to be limiting. In the descriptions in the following examples, numbers represent weight ratios in parts, unless otherwise specified.

EXAMPLES

Example 1

Preparation of Recording Ink

The following components were mixed while being agitated. Then sodium hydroxide was added to the mixture to control the pH thereof so as to be 10.5. Then the mixture was filtered using a Membrane filter having openings of 0.1 μm in an average diameter. Thus yellow ink 1, magenta ink 1, cyan ink 1 and black ink 1 were prepared.

Formulation of Yellow Recording Ink 1

| | |
|---|---|
| C.I. Acid Yellow 23 | 2% |
| N-methyl-2-pyrrolidone | 10% |
| Polyethylene glycol 200 | 15% |
| Diethyleneglycol monobutyl ether | 12% |
| 1,5-pentanediol | 3% |
| Sodium benzoate | 0.4% |
| Deionized water | 57.6% |

Formulation of Magenta Recording Ink 1

| | |
|---|---|
| C.I. Acid Red 52 | 1.5% |
| C.I. Acid Red 254 | 1.5% |
| N-methyl-2-pyrrolidone | 10% |
| Polyethylene glycol 200 | 15% |
| Diethyleneglycol monobutyl ether | 12% |
| 1,5-pentanediol | 3% |
| Sodium benzoate | 0.4% |
| Deionized water | 56.6% |

Formulation of Cyan Recording Ink 1

| | |
|---|---|
| C.I. Acid Blue 9 | 1.5% |
| Project Fast Cyan 2 (from Avecia) | 1.5% |
| N-methyl-2-pyrrolidone | 10% |
| Polyethylene glycol 200 | 15% |
| Diethyleneglycol monobutyl ether | 12% |
| 1,5-pentanediol | 3% |
| Sodium benzoate | 0.4% |
| Deionized water | 56.6% |

Formulation of Black Recording Ink 1

| | |
|---|---|
| C.I. Food Black 2 | 5% |
| N-methyl-2-pyrrolidone | 10% |
| Polyethylene glycol 200 | 15% |
| Diethyleneglycol monobutyl ether | 12% |
| 1,5-pentanediol | 3% |
| Sodium benzoate | 0.4% |
| Deionized water | 54.6% |

Preparation of Pretreatment Liquid 1

The following components were mixed while agitating. Then triethanol amine was added to the mixture to control the pH of the mixture so as to be 7. Thus a pretreatment liquid 1 was prepared. The viscosity thereof is shown in Table 1.

Formulation of Pretreatment Liquid 1

| | |
|---|---|
| Cationic polymer having formula (5) (dicyandiamide resin, weight average molecular weight of about 7,000) | 25% |
| Cationic compound having formula (30) (having a counter ion of Cl$^-$) | 2% |
| Glycerin | 25% |
| Ethylene glycol | 30% |
| Sodium benzoate | 1% |
| Deionized water | 17% |

The viscosity of the pretreatment liquid 1, which was measured with a type-B viscometer manufactured by Tokyo Keiki Co. Ltd., was 1270 mPa·s at 25° C.

Application of the Pretreatment Liquid and Image Formation

The container 42 of the image recording apparatus as illustrated in FIG. 1 was filled with thus prepared pretreatment liquid 1. When the pretreatment liquid 1 was applied on a copy paper, MY PAPER from NBS Ricoh, having a sizing degree of 39 s and an air permeability of 46 s and a bond paper, 4024 from Xerox Corp., having a sizing degree of 32 s and an air permeability of 21 s, while the recording papers were fed at a speed of 85 mm/s, the coating weight of the pretreatment liquid 1 applied on the recording papers were from 2.8 to 3.2 g/m$^2$. After the pretreatment liquid was applied on the recording papers, color images were recorded on the papers using a layered PZT recording head having four color recording heads each of which has 128 nozzles each having a diameter of 28 μm and discharges yellow recording ink 1, magenta recording ink 1, cyan recording ink 1 or black recording ink 1. Images were recorded under the following conditions:
Frequency: 20 kHz
Weight of ink drop: 19 ng
Dot density: 600 dpi (dots per inch)

The recorded images were evaluated with respect the following image qualities and in addition whether cockling occurred was observed.

1) Black Image Density

A black solid image was formed using the black recording ink 1. After the image dried, the image density thereof was measured with a reflection type spectrophotometric densitometer manufactured by X-Rite. The quality of the images with respect to black image density was graded as follows:
⊚: Image density is not less than 1.45 (good)
○: Image density is from 1.20 to 1.44
X: Image density is less than 1.20 (poor)

2) Blurring at Image Boundary Portions (Image Blurring)

Color line images of magenta, cyan and black each having a width of 10 dots formed on a yellow solid image formed on the recording papers were observed to determine whether feathering occurred. The quality of the images with respect to blurring was graded as follows:
⊚: Blurring is hardly observed by naked eye at the image boundary portions. (good)
Δ: Slight blurring is observed by naked eye at the image boundary portions.
X: Blurring is clearly observed by naked eye at the image boundary portions. (poor)

3) Feathering

Color line images of magenta, cyan, yellow and black each having a width of 10 dots recorded on the recording materials were observed to determine whether feathering occurred. The quality of the images with respect to feathering was graded as follows:
⊚: Feathering is hardly observed even when the image is observed using a magnifying glass of 10 power magnification. (good)
○: Feathering is hardly observed by naked eye but is observed when the image is observed using a magnifying glass of 10 power magnification. The image is still acceptable.
Δ: Slight feathering is observed by naked eye.
X: Feathering is clearly observed by naked eye.

4) Ink Penetration

A solid image was formed on the recording papers. The solid images were visually observed from the backside of the recording papers. The quality of the images with respect to ink penetration was graded as follows:
⊚: The boundary between the solid image and the background is unclear and images recorded both sides of the recording papers can be read without problems. (good)
○: The boundary between the solid image and the background is almost unclear and images recorded both sides of the recording papers can be read almost without problems.
Δ: The boundary between the solid image and the background is clear but images recorded both sides of the recording papers can be read without worrying about the backside image.
X: The colorant in the image penetrates the recording paper and reaches the back side thereof. Therefore the image recorded on one side of the recording paper is influenced by the backside image. (poor)

5) Cockling

A solid image was formed on the recording papers, and the image was observed to determine whether cockling occurred. The quality of the images with respect to cockling was graded as follows:

⊚: Cockling is hardly observed in a secondary color image. (good)
○: Slight cockling is observed in a secondary color image but cockling is hardly observed in a monocolor image.
Δ: Slight cockling is observed in a monocolor image.
X: Cockling is clearly observed in a monocolor image. (poor)

Comparative Example 1

The procedures for the image formation and evaluation of image qualities in Example 1 were repeated except that the receiving papers were not subjected to the pretreatment.
The results are also shown in Table 1

Comparative Example 2

Preparation of Comparative Pretreatment Liquid 1
The following components were mixed to prepare a comparative pretreatment liquid 1. The comparative pretreatment liquid 1 includes the same components as those included in the pretreatment liquid 1, however the concentration of the cationic polymer in the comparative pretreatment liquid, which depresses the solubility or dispersibility of the colorants in the recording inks, was relatively low compared to the pretreatment liquid 1. In addition, the ratio of the water-soluble organic solvent to water is relatively low compared to that in the pretreatment liquid 1, and therefore the viscosity of the comparative pretreatment liquid 1 was lower than that of the pretreatment liquid 1.

Formulation of Comparative Pretreatment liquid 1

| | |
|---|---|
| Cationic polymer having formula (5) (dicyandiamide resin, weight average molecular weight of about 7,000) | 1.5% |
| Cationic compound having formula (30) (having a counter ion of Cl$^-$) | 5% |
| Glycerin | 25% |
| Ethylene glycol | 30% |
| Sodium benzoate | 1% |
| Deionized water | 37.5% |

The viscosity of the pretreatment liquid, which was measured with a Type B viscometer, was 5.6 mPa·s at 25° C.

Application of the Pretreatment Liquid and Image Formation

The container 42 of the image recording apparatus as illustrated in FIG. 1 was filled with thus prepared comparative pretreatment liquid 1. When the comparative pretreatment liquid 1 was applied on the copy paper and the bond paper, which are marketed, while the recording papers were fed at a speed of 85 mm/s, the coating weight of the comparative pretreatment liquid 1 applied on the recording papers were from 2.6 to 3.0 g/m². After the comparative pretreatment liquid 1 was applied on the papers, color images were recorded on the papers in the same way as performed in Example 1. The results are shown in Table 1.

Comparative Example 3

In order to compare with the image forming method of the present invention, the image recording apparatus as shown in FIG. 1 was modified such that another combination of a recording head (20') and a driver, which is the same as the recording head 20, was provided and which discharges a pretreatment liquid. In addition, the signal processing devices and driving devices were also modified to apply a pretreatment liquid only on an area of the recording papers on which an image is to be formed.

The cassette which supplies a liquid to the recording head 20' was filled with the comparative pretreatment liquid 1 to discharge the comparative pretreatment liquid 1 onto only the image forming portions of the recording papers. Color images were recorded using the same color inks used in Example 1. The coating weight of the comparative pretreatment liquid 1 applied on the image areas of the recording papers was 10.5 g/m². In this case, the application of a pretreatment liquid using the applicator roller 4 was not performed.

The results are shown in Table 1.

Reference Example 1

The procedures for the image formation and evaluation of image qualities in Example 1 were repeated except that the coating weight of the pretreatment liquid 1 applied to the recording papers was increased by changing the rotation speed of the thickness controlling roller 2 and the pressure applied between the thickness controlling roller 2 and the other rollers.

The coating weight of the pretreatment liquid 1 applied to the recording material was 10.3 g/m². The results are shown in Table 1. As can be understood from Table 1, when the application quantity of the pretreatment liquid is greater than 10 g/m², serious cockling occurs. In addition, when an image was formed on one side of a recording paper, the recording paper was seriously curled.

Example 2

Preparation of Pretreatment Liquid 2
The following components were mixed while agitating. Lithium hydroxide was added to the mixture to control the pH of the mixture so as to be 7. Thus a pretreatment liquid 2 was prepared.

Formulation of Pretreatment Liquid 2

| | |
|---|---|
| Cationic polymer having formula (7) (having a counter ion of Cl$^-$, and weight average molecular weight of 3,500) | 15% |
| Cationic compound having formula (32) (having a counter ion of Cl$^-$) | 3% |
| Glycerin | 20% |
| N-methyl-2-pyrrolidone | 20% |
| 1,6-hexanediol | 15% |
| Sodium dehydroacetate | 1% |
| Deionized water | 26% |

The viscosity of-the pretreatment liquid 2, which was measured with a type-B viscometer, was 850 mPa·s at 25° C.

Application of the Pretreatment Liquid and Image Formation

The container 42 of the image recording apparatus as illustrated in FIG. 1 was filled with thus prepared pretreatment liquid 2. When the pretreatment liquid 2 was applied on the copy paper and bond paper at a feeding speed 60 mm/s, the coating weight of the pretreatment liquid 2 applied on the papers were from 2.6 to 3.2 g/m². After the pretreatment liquid was applied on the recording papers, color images were recorded on the recording papers in the same way as performed in Example 1. The results are shown in Table 1.

Comparative Example 4

Preparation of Comparative Pretreatment Liquid 2

The following components were mixed to prepare a comparative pretreatment liquid 2. The comparative pretreatment liquid 2 includes the same components as those included in the pretreatment liquid 2, however the concentration of the cationic polymer in the comparative pretreatment liquid 2, which depresses the solubility or dispersibility of the colorants included in the recording inks, was relatively low compared to the pretreatment liquid 2. In addition, the ratio of the water-soluble organic solvent to water is relatively low compared to that in the pretreatment liquid 2, and therefore the viscosity of the comparative pretreatment liquid was low.

Formulation of Comparative Pretreatment Liquid 2

| | |
|---|---|
| Cationic polymer having formula (7) (having a counter ion of Cl−, and weight average molecular weight of 3,500) | 3% |
| Cationic compound having formula (32) (having a counter ion of Cl−) | 3% |
| Glycerin | 10% |
| N-methyl-2-pyrrolidone | 10% |
| 1,6-hexanediol | 5% |
| Sodium dehydroacetate | 1% |
| Deionized water | 68% |

The viscosity of the comparative pretreatment liquid 2, which was measured with a type-B viscometer, was 7.9 mPa·s at 25° C.

Application of the Pretreatment Liquid and Image Recording

The container 42 of the image recording apparatus illustrated in FIG. 1 was filled with thus prepared comparative pretreatment liquid 2. By adjusting the rotation speed of the thickness controlling roller 2 and the pressure applied between the thickness controlling roller 2 and the other rollers, the coating weight of the comparative pretreatment liquid 2 applied on the papers was controlled so as to be from 2.9 to 3.0 g/m². After the comparative pretreatment liquid 2 was applied on the papers, color images were recorded on the papers in the same way as performed in Example 2. The results are shown in Table 1.

Comparative Example 5

In order to compare with the image forming method of the present invention, the image recording apparatus as shown in FIG. 1 was modified such that another combination of a recording head (20') and a driver, which is the same as the recording head 20 was provided and which discharges a pretreatment liquid. In. addition, the signal processing devices and driving devices were also modified to apply a pretreatment liquid only on an area of the recording papers on which an image is to be formed.

The cassette which supplies a liquid to the recording head (20') was filled with the comparative pretreatment liquid 2 to discharge the comparative pretreatment liquid 2 onto only the image forming portions of the recording papers. Color images were recorded using the same color inks used in Example 2. The coating weight of the comparative pretreatment liquid 2 applied on the image areas of the recording material was 10.5 g/m². In this case, the application of a pretreatment liquid using the applicator roller 4 was not performed.

The results are shown in Table 1.

Example 3

Preparation of Pigment Dispersions for Recording Inks

The following components were mixed while agitating and then dispersed for 8 hours using a bead mill including zirconia beads having a particle diameter of 2 mm. Thus, four color dispersions were prepared.

Yellow Pigment Dispersion 1

| | |
|---|---|
| C.I. Pigment Yellow 74 | 15% |
| Condensation product of naphthalene sulfonate with formalin | 3% |
| Diethylene glycol | 15% |
| Deionized water | 67% |

The mode of the particle diameter of the dispersed yellow pigment was 120 nm.

Magenta Pigment Dispersion 1

| | |
|---|---|
| C.I. Pigment Red 122 | 15% |
| Salt of a styrene-hexylacrylate-methacrylic acid copolymer with diethanol amine | 5% |
| Ethylene glycol | 13% |
| Deionized water | 67% |

The mode of the particle diameter of the dispersed magenta pigment was 110 nm.

| | |
|---|---|
| C.I. Pigment Blue 15:3 | 15% |
| Salt of styrene-hexylacrylate-methacrylic acid copolymer with diethanol amine | 4% |
| Ethylene glycol | 15% |
| Deionized water | 66% |

The mode of the particle diameter of the dispersed magenta pigment was 85 nm.

Black Pigment Dispersion 1

| | |
|---|---|
| Carbon black | 15% |
| Condensation product of naphthalene sulfonate with formalin | 3% |
| Diethylene glycol | 15% |
| Deionized water | 67% |

The mode of the particle diameter of the dispersed yellow pigment was 115 nm.

Preparation of Recording Inks

The following components were mixed while agitating. Then a 10% aqueous solution of lithium hydroxide was added to the mixture to control the pH thereof so as to be 9. Then the mixture was filtered using a Membrane filter having openings of 1.0 μm in an average diameter. Thus yellow ink 2, magenta ink 2, cyan ink 2 and black ink 2 were prepared.

Formulation of Yellow Recording Ink 2

| Yellow pigment dispersion 1 | 26.7% |
|---|---|
| (yellow pigment | 4.0%) |
| Glycerin | 10% |
| 2-pyrrolidone | 10% |
| A dihexylsulfosuccinate | 1% |
| (anionic surfactant) | |
| 2-ethyl-1,3-hexanediol | 2% |
| (penetrant) | |
| Sodium 2-pyridinethiol-1-oxide | 0.2% |
| (antiseptic agent) | |
| Deionized water | 50.1% |

Formulation of Magenta Recording Ink 2

| Magenta pigment dispersion 1 | 26.7% |
|---|---|
| (magenta pigment | 4.0%) |
| Glycerin | 10% |
| 2-pyrrolidone | 10% |
| A dihexylsulfosuccinate | 1% |
| (anionic surfactant) | |
| 2-ethyl-1,3-hexanediol | 2% |
| (penetrant) | |
| Sodium 2-pyridinethiol-1-oxide | 0.2% |
| (antiseptic agent) | |
| Deionized water | 50.1% |

Formulation of Cyan Recording Ink 2

| Cyan pigment dispersion 1 | 20% |
|---|---|
| (cyan pigment | 3.0%) |
| Glycerin | 10% |
| 2-pyrrolidone | 10% |
| A dihexylsulfosuccinate | 1% |
| (anionic surfactant) | |
| 2-ethyl-1,3-hexanediol | 2% |
| (penetrant) | |
| Sodium 2-pyridinethiol-1-oxide | 0.2% |
| (antiseptic agent) | |
| Deionized water | 56.8% |

Formulation of Black Recording Ink 2

| Black pigment dispersion 1 | 33.3% |
|---|---|
| (black pigment | 5.0%) |
| Glycerin | 10% |
| 2-pyrrolidone | 10% |
| A dihexylsulfosuccinate | 1% |
| (anionic surfactant) | |
| 2-ethyl-1,3-hexanediol | 2% |
| (penetrant) | |
| Sodium 2-pyridinethiol-1-oxide | 0.2% |
| (antiseptic agent) | |
| Deionized water | 43.5% |

Preparation of Pretreatment Liquid 3

The following components were mixed while agitating. Then triethanol amine was added to the mixture to control the pH of the mixture so as to be 7. Thus a pretreatment liquid 3 was prepared.

Formulation of Pretreatment Liquid 3

| Cationic polymer having formula (1) | 20% |
|---|---|
| (carbon number of R is 1, counter ion is Cl$^-$ and weight average molecular weight is 8,000) | |
| Cationic compound having formula (34) | 8% |
| (having a counter ion of Cl$^-$) | |
| Diethylene glycol | 20% |
| 1,3-dimethylimidazolidinone | 20% |
| Pentachlorophenol | 0.5% |
| Deionized water | 31.5% |

The viscosity of the pretreatment liquid 3, which was measured with a type-B viscometer manufactured by Tokyo Keiki Co. Ltd., was 530 mPa·s at 25° C.

Application of the Pretreatment Liquid and Image Formation

The container 42 of the image recording apparatus illustrated in FIG. 1 was filled with thus prepared pretreatment liquid 3. When the pretreatment liquid 3 was applied on the copy paper and the bond paper at a feeding speed 30 mm/s, the coating weight of the pretreatment liquid 3 applied on the copy papers were from 1.8 to 2.0 g/m$^2$. After the pretreatment liquid 3 was applied on the copy paper and bond paper, color images were recorded on the papers using a layered PZT recording head having four color recording heads each of which has 128 nozzles each having a diameter of 22 μm and discharges yellow recording ink 2, magenta recording ink 2, cyan recording ink 2 or black recording ink 2. Images were recorded under the following conditions:
Frequency: 25 kHz
Weight of ink drop: 10 ng
Dot density: 1200 dpi The recorded images were evaluated with respect the image qualities mentioned above and cockling.

The results are shown in Table 1.

Comparative Example 6

The procedures for preparation of the image formation and evaluation of images qualities in Example 3 were repeated except that the pretreatment liquid 3 was not applied on the recording papers.

The results are shown in Table 1.

Comparative Example 7

Preparation of Comparative Pretreatment Liquid 3

The following components were mixed to prepare a comparative pretreatment liquid 3. The comparative pretreatment liquid 3 includes the same components as those included in the pretreatment liquid 3, however the concentration of the cationic polymer in the comparative pretreatment liquid 3, which depresses the solubility or dispersibility of the colorants included in the recording inks, was relatively low compared to that of the pretreatment liquid 3.

Formulation of Comparative Pretreatment Liquid 3

| Cationic polymer having formula (1) | 5% |
|---|---|
| (carbon number of R is 1, counter ion is Cl$^-$ and weight average molecular weight is 1,500) | |
| Cationic compound having formula (34) | 8% |
| (having a counter ion of Cl$^-$) | |

-continued

| | |
|---|---|
| Diethylene glycol | 10% |
| 1,3-dimethylimidazolidinone | 10% |
| Pentachlorophenol | 0.5% |
| Deionized water | 66.5% |

The viscosity of the comparative pretreatment liquid 3, which was measured with a type-B viscometer, was 4.8 mPa·s at 25° C.

Application of the Pretreatment Liquid and Image Formation

The image recording apparatus used in Comparative Example 3 was modified such that the recording head (20') discharges the comparative pretreatment liquid 3 in an amount of 10 ng per drop and at a dot density of 1200 dpi.

The procedure for image recording in Comparative Example 3 was repeated except that the modified recording apparatus mentioned above was used and the image had a dot density of 1200 dpi. The coating weight of the comparative pretreatment liquid 3 applied on the image forming areas of the recording papers was 5.2 g/m².

The results are shown in Table 1.

Comparative Example 8

The procedure for the image recording in Comparative Example 7 was repeated except that the driver software of the image recording apparatus was modified such that the pretreatment liquid was applied on entire the surface of the recording papers.

As can be understood from the results as shown in Table 1, the image qualities are almost the same as those of the images obtained by the method of Comparative Example 7 in which the pretreatment liquid was applied only to the image forming areas.

Comparative Example 9

The procedures for the image formation in Comparative Examples 3 and 7 were repeated except that the pretreatment liquid (i.e., comparative pretreatment liquid 2 or 3) was replaced with the pretreatment liquid 3. As a result, the pretreatment liquid 3 could not be discharged from the recording heads at all.

Example 4

Preparation of Pretreatment Liquid 4

The following components were mixed while agitating. Then triethanol amine was added to the mixture to control the pH of the mixture so as to be 7. Thus a pretreatment liquid 4 was prepared.

Formulation of Pretreatment Liquid 4

| | |
|---|---|
| Cationic polymer having formula (10) | 20% |
| ($R_6$ is a methyl group, counter ion is $NO_3^-$ and weight average molecular weight is 6,000) | |
| Cationic compound having formula (30) | 8% |
| (having a counter ion of $CH_3COO^-$) | |
| Diethylene glycol | 15% |
| Glycerin | 15% |

-continued

| | |
|---|---|
| N-methyl-2-pyrrolidone | 15% |
| Pentachlorophenol | 0.5% |
| Deionized water | 26.5% |

The viscosity of the pretreatment liquid 4 was 250 mPa·s at 25° C.

The procedures for the image formation and evaluation of image qualities in Example 3 were repeated except that the pretreatment liquid was changed to the pretreatment liquid 4.

Example 5

Preparation of Pretreatment Liquid 5

The following components were mixed while agitating. Then a 10% aqueous solution of sodium hydroxide was added to the mixture to control the pH of the mixture so as to be 6. Thus a pretreatment liquid 5 was prepared.

Formulation of Pretreatment Liquid 5

| | |
|---|---|
| Cationic polymer having formula (9) | 32% |
| ($R_5$ is a methylene group, X is $OH^-$, and Y is $-OCOCH_3$) | |
| Cationic compound having formula (30) | 3% |
| (having a counter ion of $CH_3COO^-$) | |
| Ethylene glycol | 15% |
| Glycerin | 15% |
| 1,5-pentanediol | 15% |
| Sorbic acid | 0.8% |
| Deionized water | 19.2% |

The viscosity of the pretreatment liquid 5 was 710 mPa·s at 25° C.

The procedures for the image formation and evaluation of image qualities in Example 3 were repeated except that the pretreatment liquid was changed to pretreatment liquid 5.

Example 6

Preparation of Pretreatment Liquid 6

The following components were mixed while agitating. Then a 10% aqueous solution of tetramethylammonium hydroxide was added to the mixture to control the pH of the mixture so as to be 7. Thus a pretreatment liquid 6 was prepared.

Formulation of Pretreatment Liquid 6

| | |
|---|---|
| Cationic polymer having formula (4) | 30% |
| (having a counter ion of $CH_3COO^-$ and weight average molecular weight of 9,000) | |
| Polyoxyethylene nonylphenyl ether | 3% |
| (nonionic surfactant) | |
| 1,6-hexanediol | 30% |
| Diethylene glycol | 15% |
| Sorbic acid | 0.8% |
| Deionized water | 21.2% |

The viscosity of the pretreatment liquid 6 was 1430 mPa·s at 25° C.

The procedures for the image formation and evaluation of image qualities in Example 3 were repeated except that the pretreatment liquid was changed to pretreatment liquid 6.

Example 7

Preparation of Recording Ink

The following components were mixed while being agitated. Then a 10% aqueous solution of lithium hydroxide was added to the mixture to control the pH thereof so as to be 9. Then the mixture was filtered using a Membrane filter having openings of 0.1 μm (0.8 μm for the black recording ink) in an average diameter. Thus yellow ink 3, magenta ink 3, cyan ink 3 and black ink 3 were prepared.

Formulation of Yellow Recording Ink 3

| | |
|---|---|
| C.I. Acid Yellow 23 | 1% |
| C.I. Direct Yellow 86 | 1% |
| Glycerin | 5% |
| 1,5-pentanediol | 15% |
| Sodium polyoxyethylene (3) tridecyl ether acetate (anionic surfactant) | 1% |
| Sodium dehydroacetate | 0.4% |
| Deionized water | 76.6% |

Formulation of Magenta Recording Ink 3

| | |
|---|---|
| C.I. Reactive Red 180 | 2% |
| C.I. Acid Red 52 | 1% |
| Glycerin | 5% |
| 1,5-pentanediol | 15% |
| Sodium polyoxyethylene (3) tridecyl ether acetate (anionic surfactant) | 1% |
| Sodium dehydroacetate | 0.4% |
| Deionized water | 75.6% |

Formulation of Cyan Recording Ink 3

| | |
|---|---|
| C.I. Acid Blue 249 | 2% |
| C.I. Reactive Blue 7 | 1% |
| Glycerin | 5% |
| 1,5-pentanediol | 15% |
| Sodium polyoxyethylene (3) tridecyl ether acetate (anionic surfactant) | 1% |
| Sodium dehydroacetate | 0.4% |
| Deionized water | 75.6% |

Formulation of Black Recording Ink 3

| | |
|---|---|
| Anionic microencapsulated carbon black (manufactured by Dainippon Ink and Chemicals, Inc., average particle diameter of 125 nm) | 5% |
| Glycerin | 5% |
| 1,5-pentanediol | 15% |
| Sodium polyoxyethylene (3) tridecyl ether acetate (anionic surfactant) | 1% |
| Sodium dehydroacetate | 0.4% |
| Deionized water | 73.6% |

Preparation of Pretreatment Liquid 7

The following components were mixed while agitating. Then triethanol amine was added to the mixture to control the pH of the mixture so as to be 7. Thus a pretreatment liquid 7 was prepared.

Formulation of Pretreatment Liquid 7

| | |
|---|---|
| Cationic polymer having formula (13) (having a counter ion of $CH_3COO^-$, and weight average molecular weight of 15,000) | 18% |
| Cationic compound having formula (30) (having a counter ion of $Cl^-$) | 4% |
| Glycerin | 15% |
| 1,5-pentanediol | 15% |
| 2-pyrrolidone | 10% |
| Sodium benzoate | 1% |
| Deionized water | 37% |

The viscosity of the pretreatment liquid 7, which was measured with a type-B viscometer manufactured by Tokyo Keiki Co. Ltd., was 640 mPa·s at 25° C.

Application of the Pretreatment Liquid and Image Formation

The container 42 of the image recording apparatus illustrated in FIG. 1 was filled with thus prepared pretreatment liquid 7. When the pretreatment liquid 7 was applied on a copy paper, MY PAPER from NBS Ricoh, and a bond paper, 4024 from Xerox Corp., while the recording papers were fed at a speed of 105 mm/s, the coating weight of the pretreatment liquid 7 applied on the recording papers were from 4.8 to 4.9 g/m². After the pretreatment liquid 7 was applied on the recording papers, color images were recorded on the papers using a layered PZT recording head having four color heads each of which has 128 nozzles each having a diameter of 28 μm and discharges the respective yellow ink 3, magenta ink 3, cyan ink 3 or black ink 3. Images were recorded under the following conditions:

Frequency: 20 kHz
Weight of ink drop: 19 ng
Dot density: 600 dpi (dots per inch)

The recorded images were evaluated with respect the image qualities mentioned above and cockling.

Comparative Example 11

The procedures for the image formation and evaluation of image qualities in Example 7 were repeated except that the pretreatment was not performed on the recording papers.

Example 8

Preparation of Recording Ink

The following components were mixed while being agitated. Then a 10% aqueous solution of sodium hydroxide was added to the mixture to control the pH thereof so as to be 9. Then the mixture was filtered using a Membrane filter having openings of 0.1 μm (0.8 μm for the black recording ink) in an average diameter. Thus yellow ink 4, magenta ink 4, cyan ink 4 and black ink 4 were prepared.

Formulation of Yellow Recording Ink 4

| | |
|---|---|
| C.I. Acid Yellow 23 | 1% |
| C.I. Direct Yellow 142 | 1% |
| Tetraethylene glycol | 8% |
| Diethylene glycol | 15% |
| Sodium polyoxyethylenetridecyl ether phosphate (anionic surfactant) | 1% |
| 2-ethyl-1,3-hexanediol | 2% |
| Sodium 2-pyridinethiol-1-oxide (antimildew agent) | 0.1% |
| Deionized water | 71.9% |

Formulation of Magenta Recording Ink 4

| C.I. Acid Red 254 | 2% |
|---|---|
| Tetraethylene glycol | 8% |
| Diethylene glycol | 15% |
| Sodium polyoxyethylenetridecyl ether phosphate (anionic surfactant) | 1% |
| 2-ethyl-1,3-hexanediol | 2% |
| Sodium 2-pyridinethiol-1-oxide (antimildew agent) | 0.1% |
| Deionized water | 71.9% |

Formulation of Cyan Recording Ink 4

| C.I. Acid Blue 249 | 2% |
|---|---|
| C.I. Direct Blue 199 | 1% |
| Tetraethylene glycol | 8% |
| Diethylene glycol | 15% |
| Sodium polyoxyethylenetridecyl ether phosphate (anionic surfactant) | 1% |
| 2-ethyl-1,3-hexanediol | 2% |
| Sodium 2-pyridinethiol-1-oxide (antimildew agent) | 0.1% |
| Deionized water | 70.9% |

Formulation of Black Recording Ink 4

| Dispersion of self-dispersion type sulfonated carbon black (manufactured by Cabot Corp.) | 15% |
|---|---|
| Tetraethylene glycol | 8% |
| Diethylene glycol | 15% |
| Sodium polyoxyethylenetridecyl ether phosphate (anionic surfactant) | 1% |
| 2-ethyl-1,3-hexanediol | 2% |
| Sodium 2-pyridinethiol-1-oxide (antimildew agent) | 0.1% |
| Deionized water | 58.9% |

Preparation of Pretreatment Liquid 8

The following components were mixed while agitating. Then triethanol amine was added to the mixture to control the pH of the mixture so as to be 7. Thus a pretreatment liquid 8 was prepared.

Formulation of Pretreatment Liquid 8

| Cationic polymer having formula (2) (having weight average molecular weight of 4,000) | 32% |
|---|---|
| Cationic compound having formula (33) (having a counter ion of Cl$^-$) | 2% |
| Diethyleneglycol | 26% |
| 2-pyrrolidone | 8% |
| Potassium benzoate | 1% |
| Deionized water | 31% |

The viscosity of the pretreatment liquid 8, which was measured with a type-B viscometer manufactured by Tokyo Keiki Co. Ltd., was 1850 mPa·s at 25° C.

Application of the Pretreatment Liquid and Image Formation

The container 42 of the image recording apparatus illustrated in FIG. 1 was filled with thus prepared pretreatment liquid 8. When the pretreatment liquid 8 was applied on a copy paper, MY PAPER from NBS Ricoh, and a bond paper, 4024 from Xerox Corp., while the recording papers were fed at a speed of 60 mm/s, the coating weight of the pretreatment liquid 8 applied on the recording papers were 1.8 g/m$^2$. After the pretreatment liquid was applied on the receiving papers, color images were recorded on the papers using a layered PZT recording head having four color recording heads each of which has 128 nozzles each having a diameter of 28 μm and discharges the respective yellow ink 4, magenta ink 4, cyan ink 4 or black ink 4. Images were recorded under the following conditions:

Frequency: 20 kHz
Weight of ink drop: 19 ng
Dot density: 600 dpi (dots per inch)

The recorded images were evaluated with respect the image qualities mentioned above and cockling.

Comparative Example 12

The procedures for the image formation and evaluation of image qualities in Example 8 were repeated except that the pretreatment was not performed on the recording papers.

Comparative Example 13

In Example 8, the recording papers on which the pretreatment liquid 8 had been applied in an amount of 1.8 g/m$^2$ were heated for 5 minutes in an oven at 110° C. to remove the water and water soluble organic solvent therefrom. The recording papers were allowed to settle under normal temperature/humidity conditions for 2 hours. Then the procedures for the image formation and evaluation of image qualities in Example 8 were repeated.

The results are shown in Table 1.

Comparative Example 14

The procedures for the image formation and evaluation of image qualities in Comparative Example 13 were repeated except that by adjusting the rotating speed of the thickness controlling roller 2 and the pressure applied between the thickness controlling roller 2 and the other rollers, the application weight of the pretreatment liquid 8 was controlled so as to be 5.3 g/m$^2$.

The results are shown in Table 1.

Example 9

Preparation of Pretreatment Liquid 9

The following components were mixed while agitating. Then a 10% aqueous solution of sodium hydroxide was added to the mixture to control the pH of the mixture so as to be 7.5. Thus a pretreatment liquid 9 was prepared.

Formulation of Pretreatment Liquid 9

| Cationic polymer having formula (3) ($R_1$, $R_2$ and $R_3$ are a methyl group, $R_4$ is an ethyl group, and X is $NO_3^-$) | 26% |
|---|---|
| Cationic compound having formula (32) (having a counter ion of $CH_3COO^-$) | 3% |
| 1,6-pentanediol | 23% |
| 2-ethyl-1,3-hexanediol | 3% |
| Triethyleneglycol | 13% |
| Sorbic acid | 0.8% |
| Deionized water | 31.2% |

The viscosity of the pretreatment liquid 9 was 1360 mPa·s at 25° C.

The procedure for the image formation in Example 9 was repeated except that the pretreatment liquid was changed to pretreatment liquid 9.

Example 10

Preparation of Pretreatment Liquid 10

The following components were mixed while agitating. Then a 10% aqueous solution of tetraethylammonium hydroxide was added to the mixture to control the pH of the mixture so as to be 7.5. Thus a pretreatment liquid 10 was prepared.

Formulation of Pretreatment Liquid 10

| | |
|---|---|
| Cationic polymer having formula (12) (having a counter ion of $NO_3^-$, and weight average molecular weight of 16,000) | 12% |
| Polyoxyethylene oleyl ether (nonionic surfactant) | 3% |
| 1,6-pentanediol | 27% |
| Ethylene glycol | 19% |
| Potassium benzoate | 0.8% |
| Deionized water | 38.2% |

The viscosity of the pretreatment liquid 10 was 86 mPa·s at 25° C.

The procedure for the image formation in Example 9 was repeated except that the pretreatment liquid was changed to pretreatment liquid 10.

Example 11

Preparation of Pigment Dispersions for Recording Inks

The following components were mixed while agitating and then dispersed for 8 hours using a bead mill including zirconia beads having a particle diameter of 2 mm. Thus, four color dispersions were prepared.

Yellow Pigment Dispersion 2

| | |
|---|---|
| C.I. Pigment Yellow 150 | 15% |
| Styrene-sodium acrylate copolymer | 5% |
| Ethylene glycol | 15% |
| Deionized water | 65% |

The mode of the particle diameter of the dispersed yellow pigment was 70 nm.

Magenta Pigment Dispersion 2

| | |
|---|---|
| C.I. Pigment Red 81 | 15% |
| Styrene-hexyl acrylate-sodium acrylate copolymer | 5% |
| Ethylene glycol | 15% |
| Deionized water | 65% |

The mode of the particle diameter of the dispersed magenta pigment was 96 nm.

Cyan Pigment Dispersion 2

| | |
|---|---|
| C.I. Pigment Blue 15:2 | 15% |
| Salt of a styrene-hexylacrylate-methacrylic acid copolymer with diethanol amine | 5.6% |
| Ethylene glycol | 15% |
| Deionized water | 64.4% |

The mode of the particle diameter of the dispersed magenta pigment was 83 nm.

Black Pigment Dispersion 2

| | |
|---|---|
| Carbon black | 15% |
| Salt of a styrene-hexylacrylate-methacrylic acid copolymer with diethanol amine | 4% |
| Ethylene glycol | 15% |
| Deionized water | 66% |

The mode of the particle diameter of the dispersed yellow pigment was 96 nm.

Preparation of Recording Inks

The following components were mixed while agitating. Then a 10% aqueous solution of lithium hydroxide was added to the mixture to control the pH thereof so as to be 9. Then the mixture was filtered using a Membrane filter having openings of 1.0 μm in an average diameter. Thus yellow ink 5, magenta ink 5, cyan ink 5 and black ink 5 were prepared.

Formulation of Yellow Recording Ink 5

| | |
|---|---|
| Yellow pigment dispersion 2 | 20% |
| (yellow pigment | 3.0%) |
| Diethylene glycol | 10% |
| N-methyl-2-pyrrolidone | 10% |
| Polyoxyethylene nonyl ether (noionic surfactant) | 3% |
| Sodium 2-pyridinethiol-1-oxide (antiseptic agent) | 0.2% |
| Deionized water | 56.8% |

Formulation of Magenta Recording Ink 5

| | |
|---|---|
| Magenta pigment dispersion 2 | 26.7% |
| (magenta pigment | 4.0%) |
| Diethylene glycol | 10% |
| N-methyl-2-pyrrolidone | 10% |
| Polyoxyethylene nonyl ether (noionic surfactant) | 3% |
| Sodium 2-pyridinethiol-1-oxide (antiseptic agent) | 0.2% |
| Deionized water | 50.1% |

Formulation of Cyan Recording Ink 5

| | |
|---|---|
| Cyan pigment dispersion 2 | 26.7% |
| (cyan pigment | 4.0%) |
| Diethylene glycol | 10% |
| N-methyl-2-pyrrolidone | 10% |
| Polyoxyethylene nonyl ether (noionic surfactant) | 3% |

-continued

|  |  |
| --- | --- |
| Sodium 2-pyridinethiol-1-oxide (antiseptic agent) | 0.2% |
| Deionized water | 50.1% |

Formulation of Black Recording Ink 5

|  |  |
| --- | --- |
| Black pigment dispersion 2 | 26.7% |
| (black pigment | 4.0%) |
| Diethylene glycol | 10% |
| N-methyl-2-pyrrolidone | 10% |
| Polyoxyethylene nonyl ether (noionic surfactant) | 3% |
| Sodium 2-pyridinethiol-1-oxide (antiseptic agent) | 0.2% |
| Deionized water | 50.1% |

Preparation of Pretreatment Liquid 11

The following components were mixed while agitating. Then triethanol amine was added to the mixture to control the pH of the mixture so as to be 7. Thus a pretreatment liquid 11 was prepared.

Formulation of Pretreatment Liquid 11

|  |  |
| --- | --- |
| Cationic polymer having formula (17) (having a counter ion of Cl⁻ and weight average molecular weight is 6,000) | 15% |
| Cationic emulsion (ACRYT UW319-SX) | 41% |
| Polyoxyethylene nonyl ether (nonionic surfactant) | 4% |
| Glycerin | 20% |
| 1,3-dimethylimidazolidinone | 20% |

The viscosity of the pretreatment liquid 11, which was measured with a type-B viscometer manufactured by Tokyo Keiki Co. Ltd., was 120 mPa·s at 25° C.

Application of the Pretreatment Liquid and Image Formation

The container 42 of the image recording apparatus illustrated in FIG. 1 was filled with thus prepared pretreatment liquid 11. When the pretreatment liquid 11 was applied on the copy paper and the bond paper while the recording papers were fed at a feeding speed of 45 mm/s, the coating weight of the pretreatment liquid 11 applied on the copy papers were from 2.5 to 2.8 g/m². After the pretreatment liquid was applied on the copy paper and bond paper, color images were recorded on the papers using a layered PZT recording head having four color recording heads each of which has 128 nozzles each having a diameter of 22 μm and discharges yellow recording ink 5, magenta recording ink 5, cyan recording ink 5 or black recording ink 5. Images were recorded under the following conditions:

Frequency: 25 kHz

Weight of ink drop: 10 ng

Dot density: 1200 dpi

The recorded images were evaluated with respect the image qualities mentioned above and cockling.

The results are shown in Table 1.

Comparative Example 15

The procedures for the image formation and evaluation of image qualities in Example 11 were repeated except that the pretreatment liquid 11 was not applied on the recording papers.

The results are shown in Table 1.

Comparative Example 16

Preparation of Comparative Pretreatment Liquid 4

The following components were mixed to prepare a comparative pretreatment liquid 4. The comparative pretreatment liquid 4 includes the same components as those included in the pretreatment liquid 11, however the concentration of the cationic polymer in the comparative pretreatment liquid 4, which depresses the solubility or dispersibility of the colorants included in the recording inks, was relatively low compared to that of the pretreatment liquid 11.

Formulation of Comparative Pretreatment Liquid 4

|  |  |
| --- | --- |
| Cationic polymer having formula (17) (having a counter ion of Cl⁻ and weight average molecular weight is 6,000) | 3% |
| Cationic emulsion (ACRYT UW319-SX) | 4% |
| Polyoxyethylene nonyl ether (nonionic surfactant) | 4% |
| Glycerin | 10% |
| 1,3-dimethylimidazolidinone | 10% |
| Deionized water | 69% |

The viscosity of the comparative pretreatment liquid 4, which was measured with a type-B viscometer, was 7.6 mPa·s at 25° C.

Application of the Pretreatment Liquid and Image Formation

The procedures for image formation and evaluation of image qualities in Example 11 were repeated except that the pretreatment liquid was changed to the comparative pretreatment liquid 4.

The results are shown in Table 1.

Comparative Example 17

The procedures for the image formation and evaluation of image qualities in Comparative Example 5 were repeated except that the pretreatment liquid was changed to the comparative pretreatment liquid 4.

The results are shown in Table 1.

Example 12

Preparation of Pretreatment Liquid 12

The following components were mixed while agitating. Then a 10% aqueous solution of sodium hydroxide was added to the mixture to control the pH of the mixture so as to be 7.0. Thus a pretreatment liquid 12 was prepared.

Formulation of Pretreatment Liquid 12

|  |  |
| --- | --- |
| Cationic polymer having formula (15) (having a counter ion is $NO_3^-$) | 16% |
| Cationic silica (CEP10AK97006 from Cabot Specialty Chemicals, Inc.) | 45% |

-continued

| | |
|---|---|
| Lithium polyoxyethylene alkylacetate (anionic surfactant) | 1% |
| Glycerin | 15% |
| 1,6-pentanediol | 10% |
| Triethylene glycol | 10% |
| 2-ethyl-1,3-hexanediol | 3% |

The viscosity of the pretreatment liquid 12 was 320 mPa·s at 25° C.

The procedures for the image formation and evaluation of image qualities in Example 11 were repeated except that the pretreatment liquid was changed to the pretreatment liquid 12.

Example 13

Preparation of Pretreatment Liquid 13

The following components were mixed while agitating. Then a 10% aqueous solution of lithium hydroxide was added to the mixture to control the pH of the mixture so as to be 7.0. Thus a pretreatment liquid 13 was prepared.

Formulation of Pretreatment Liquid 13

| | |
|---|---|
| Cationic polymer having formula (11) ($R_7$ and $R_8$ are a methyl group, the counter ion is Cl$^-$, and the weight average molecular weight is 9,600) | 12% |
| Cationic styrene-acrylic emulsion (ACRYT RKW-450SX from Taisei Kako Co., Ltd.) | 50% |
| Polyoxyethylene oleyl ether (nonionic surfactant) | 2% |
| Triethylene glycol | 19% |
| 2-pyrrolidone | 11% |
| 1,6-hexanediol | 5% |
| Potassium benzoate | 1% |

The viscosity of the pretreatment liquid 13 was 75 mPa·s at 25° C.

The procedures for the image formation and evaluation of image qualities in Example 11 were repeated except that the pretreatment liquid was changed to the pretreatment liquid 13.

Example 14

Preparation of Pretreatment Liquid 14

The following components were mixed while agitating. Then a 10% aqueous solution of lithium hydroxide was added to the mixture to control the pH of the mixture so as to be 7.0. Thus a pretreatment liquid 14 was prepared.

Formulation of Pretreatment Liquid 14

| | |
|---|---|
| Cationic polymer having formula (1) (R is a methyl group, the counter ion is Cl$^-$, and the weight average molecular weight is 12,000) | 12% |
| Cationic silica (SNOWTEX AK from Nissan Chemical Co., Ltd.) | 50% |
| Ethylene oxide-propylene oxide block copolymer (nonionic surfactant) | 5% |
| Polyethylene glycol 200 | 15% |
| 2-pyrrolidone | 10% |
| 1,6-hexanediol | 6% |
| Potassium benzoate | 2% |

The viscosity of the pretreatment liquid 14 was 260 mPa·s at 25° C.

The procedures for the image formation and evaluation of image qualities in Example 11 were repeated except that the pretreatment liquid was changed to the pretreatment liquid 14.

Example 15

Preparation of Pretreatment Liquid 15

The following components were mixed while agitating. Then a 10% aqueous solution of sodium hydroxide was added to the mixture to control the pH of the mixture so as to be 6.5. Thus a pretreatment liquid 15 was prepared.

Formulation of Pretreatment Liquid 15

| | |
|---|---|
| Cationic polymer having formula (14) (j and k are 2, and the weight average molecular weight is 5,000) | 46% |
| Cationic compound having formula (31) (counter ion of Cl$^-$) | 8% |
| Glycerin | 20% |
| 1,5-pentanediol | 20% |
| Nonionic surfactant (SOFTANOL 70 from Nippon Shokubai Co., Ltd.) | 1% |
| Sodium pentachlorophenol | 0.1% |
| Deionized water | 4.9% |

The viscosity of the pretreatment liquid 15 was 860 mPa·s at 25° C.

The procedures for the image formation and evaluation of image qualities in Example 11 was repeated except that the pretreatment liquid was changed to the pretreatment liquid 15.

The results are shown in Table 1.

Example 16

Preparation of Pretreatment Liquid 16

The following components were mixed while agitating. Then a 10% aqueous solution of sodium hydroxide was added to the mixture to control the pH of the mixture so as to be 6.5. Thus a pretreatment liquid 16 was prepared.

Formulation of Pretreatment Liquid 16

| | |
|---|---|
| Cationic polymer having formula (5) (weight average molecular weight of 4,000) | 27% |
| Cationic compound having formula 31 (counter ion of Cl$^-$) | 8% |
| Glycerin | 20% |
| 1,5-pentanediol | 20% |
| Sodium pentachlorophenol | 0.1% |
| Deionized water | 24.9% |

The viscosity of the pretreatment liquid 16 was 760 mPa·s at 25° C.

The procedure for the image formation and evaluation of image qualities in Example 11 was repeated except that the pretreatment liquid was changed to the pretreatment liquid 16.

Examples 17 to 25

The procedures for the image formation and evaluation of image qualities in Example 16 were repeated except that the recording material was changed to the following:

Example 17: Xerox Paper R from Xerox Corp.
  (sizing degree of 8 s and air permeability of 20 s)
Example 18: REFLEX from AUSTRALIAN PAPER Co.
  (sizing degree of 25 s and air permeability of 4 s)
Example 19: NBS COPY PAPER 90K from NBS Ricoh
  (sizing degree of 60 s and air permeability of 68 s)
Example 20: PB PAPER from Canon Inc.
  (sizing degree of 21 s and air permeability of 8 s)
Example 21: NBS COPY PAPER 45K from NBS Ricoh
  (sizing degree of 11 s and air permeability of 45 s)
Example 22: YAMAYURI from Oji Paper Co., Ltd. (Honshu Seishi K.K.)
  (sizing degree of 12 s and air permeability of 21 s)
Example 23: PPC PAPER SHIGEN TYPE S from Ricoh Co., Ltd.
  (sizing degree of 22 s and air permeability of 13 s)
Example 24: Xerox Paper P from Xerox Corp.
  (sizing degree of 24 s and air permeability of 19 s)
Example 25: MULTIACE from Xerox Corp.
  (sizing degree of 25 s and air permeability of 17 s)

The results are shown in Table 1.

Comparative Examples 18 to 28

The procedures for the image formation and evaluation of image qualities in Examples 17–25 were repeated except that the pretreatment was not performed on the recording material.

The results are shown in Table 1.

TABLE 1

| | Pretreatment liquid | | | Image Qualities | | | | |
|---|---|---|---|---|---|---|---|---|
| | Viscosity (mPa·s) | Applicator | Applicating weight (g/m²) | Image Density | Blurring | Feathering | Ink Penetration | Cockling |
| Ex. 1 | 1270 | Roller | 2.8–3.2 | ◎ | ○ | ○ | ○ | ○ |
| Comp. Ex. 1 | — | — | 0 | X | X | X | X | ○ |
| Comp. Ex. 2 | 5.6 | Roller | 2.6–3.0 | Δ | Δ | Δ | Δ | ○ |
| Comp. Ex. 3 | 5.6 | Inkjet head | 10.5 | ○ | ○ | Δ | Δ | X |
| Ref. Ex. 1 | 1270 | Roller | 10.3 | ◎ | ◎ | ○ | ◎ | X |
| Ex. 2 | 850 | Roller | 2.6–3.2 | ○ | ◎ | ○ | ○ | ○ |
| Comp. Ex. 1 | — | — | 0 | X | X | X | X | ○ |
| Comp. Ex. 4 | 7.9 | Roller | 2.9–3.0 | Δ | Δ | Δ | Δ | ○ |
| Comp. Ex. 5 | 7.9 | Inkjet head | 10.5 | ○ | Δ | ○ | Δ | X |
| Ex. 3 | 530 | Roller | 1.8–2.0 | ◎ | ◎ | ◎ | ◎ | ◎ |
| Comp. Ex. 6 | — | — | 0 | X | Δ | Δ | Δ | ◎ |
| Comp. Ex. 7 | 4.8 | Inkjet head | 5.2 | Δ | ○ | Δ | Δ | Δ |
| Comp. Ex. 9 | 4.8 | Inkjet head | 5.2 | Δ | ○ | Δ | Δ | Δ |
| Comp. Ex. 9 | 530 | Inkjet head | 0 | Pretreatment liquid could not be discharged from the head. | | | | |
| Ex. 4 | 250 | Roller | 1.5–1.8 | ◎ | ◎ | ○ | ○ | ◎ |
| Ex. 5 | 710 | Roller | 1.8–2.0 | ◎ | ◎ | ◎ | ◎ | ◎ |
| Ex. 6 | 1430 | Roller | 2.0–2.5 | ○ | ○ | ○ | ◎ | ◎ |
| Comp. Ex. 10 | — | — | 0 | X | Δ | Δ | Δ | ◎ |
| Ex. 7 | 640 | Roller | 4.8–4.9 | ◎ | ○ | ○ | ○ | ○ |
| Comp. Ex. 11 | — | — | 0 | X | Δ | X | X | ○ |
| Ex. 8 | 1850 | Roller | 1.8 | ◎ | ○ | ○ | ○ | ○ |
| Comp. Ex. 12 | — | — | 0 | X | X | X | X | ○ |
| Comp. Ex. 13 | 1850 | Roller | 1.8 (dried) | Δ | Δ | X | X | ○ |
| Comp. Ex. 14 | 1850 | Roller | 5.3 (dried) | Δ | Δ | X | Δ | ○ |
| Ex. 9 | 1360 | Roller | 6.5 | ◎ | ○ | ○ | ◎ | Δ |
| Ex. 10 | 86 | Roller | 9.3 | ○ | ◎ | ○ | ○ | Δ |
| Ex. 11 | 120 | Roller | 2.5–2.8 | ○ | ○ | ○ | ○ | ○ |
| Comp. Ex. 15 | — | — | 0 | X | Δ | X | Δ | ○ |
| Comp. Ex. 16 | 7.6 | Roller | 2.8–2.9 | X | Δ | X | Δ | ○ |
| Comp. Ex. 17 | 7.6 | Inkjet head | 10.3 | Δ | Δ | Δ | Δ | X |
| Ex. 12 | 320 | Roller | 5.6 | ○ | ○ | ○ | ○ | Δ |

TABLE 1-continued

|  | Pretreatment liquid | | Applicating weight (g/m²) | Image Qualities | | | | |
|---|---|---|---|---|---|---|---|---|
|  | Viscosity (mPa·s) | Applicator |  | Image Density | Blurring | Feathering | Ink Penetration | Cockling |
| Ex. 13 | 75 | Roller | 3.6–3.9 | ○ | ◎ | ○ | ○ | ○ |
| Ex. 14 | 260 | Roller | 3.8–4.0 | ○ | ○ | ○ | ◎ | ○ |
| Ex. 15 | 860 | Roller | 1.9–2.2 | ◎ | ◎ | ○ | ○ | ○ |
| Ex. 16 | 760 | Roller | 2.9 | ◎ | ◎ | ○ | ◎ | ○ |
| Ex. 17 | 760 | Roller | 3.0 | ◎ | ◎ | ○ | ◎ | ○ |
| Ex. 18 | 760 | Roller | 3.1 | ◎ | ◎ | ○ | ◎ | ○ |
| Ex. 19 | 760 | Roller | 2.9 | ◎ | ◎ | ○ | ◎ | ○ |
| Ex. 20 | 760 | Roller | 2.8 | ◎ | ◎ | ○ | ◎ | ○ |
| Ex. 21 | 760 | Roller | 2.9 | ◎ | ◎ | ○ | ○ | ○ |
| Ex. 22 | 760 | Roller | 3.2 | ◎ | ◎ | ○ | ◎ | ○ |
| Ex. 23 | 760 | Roller | 2.9 | ◎ | ○ | ○ | ◎ | ○ |
| Ex. 24 | 760 | Roller | 2.7 | ◎ | ◎ | ○ | ◎ | ○ |
| Ex. 25 | 760 | Roller | 2.9 | ◎ | ◎ | ○ | ◎ | ○ |
| Comp. Ex. 18 | — | — | 0 | X | △ | X | △ | ○ |
| Comp. Ex. 19 | — | — | 0 | X | X | X | △ | ○ |
| Comp. Ex. 20 | — | — | 0 | X | X | △ | △ | ○ |
| Comp. Ex. 21 | — | — | 0 | X | △ | X | △ | ○ |
| Comp. Ex. 22 | — | — | 0 | X | △ | △ | △ | ○ |
| Comp. Ex. 23 | — | — | 0 | X | △ | X | △ | ○ |
| Comp. Ex. 24 | — | — | 0 | △ | △ | X | △ | ○ |
| Comp. Ex. 25 | — | — | 0 | X | X | X | △ | ○ |
| Comp. Ex. 26 | — | — | 0 | X | △ | X | △ | ○ |
| Comp. Ex. 27 | — | — | 0 | X | △ | X | △ | ○ |
| Comp. Ex. 28 | — | — | 0 | X | X | X | △ | ○ |

Example 26

Preparation of Recording Inks

The following components were mixed while being agitated. Then a 10% aqueous solution of lithium hydroxide was added to the mixture to control the pH thereof so as to be 10.5. Then the mixture was filtered using a Membrane filter having openings of 0.1 μm in an average diameter. Thus yellow ink 6, magenta ink 6, cyan ink 6 and black ink 6 were prepared.

Formulation of Yellow Recording Ink 6

| C.I. Acid Yellow 23 | 1% |
|---|---|
| Project Fast Yellow 2 (manufactured by Avecia Co.) | 1% |
| Glycerin | 5% |
| Ethylene glycol | 20% |
| Sodium polyoxyethylene (3) tridecyl ether acetate (anionic surfactant) | 1% |
| 2,2,4-trimethyl-1,3-pentanediol | 1% |
| Sodium benzoate | 0.4% |
| Deionized water | 70.6% |

Formulation of Magenta Recording Ink 6

| C.I. Acid Red 52 | 1% |
|---|---|
| Project Fast Magenta 2 (manufactured by Avecia) | 1% |
| Glycerin | 5% |
| Ethylene glycol | 20% |
| Sodium polyoxyethylene (3) tridecyl ether acetate (anionic surfactant) | 1% |
| 2,2,4-trimethyl-1,3-pentanediol | 1% |
| Sodium benzoate | 0.4% |
| Deionized water | 70.6% |

Formulation of Cyan Recording Ink 6

| C.I. Acid Blue 9 | 1% |
|---|---|
| Project Fast Cyan 2 (manufactured by Avecia) | 1% |
| Glycerin | 5% |
| Ethylene glycol | 20% |
| Sodium polyoxyethylene (3) tridecyl ether acetate (anionic surfactant) | 1% |
| 2,2,4-trimethyl-1,3-pentanediol | 1% |
| Sodium benzoate | 0.4% |
| Deionized water | 70.6% |

Formulation of Black Recording Ink 6

| | |
|---|---|
| C.I. Direct Black 168 | 3% |
| Glycerin | 5% |
| Ethylene glycol | 20% |
| Sodium polyoxyethylene (3) tridecyl ether acetate (anionic surfactant) | 1% |
| 2,2,4-trimethyl-1,3-pentanediol | 1% |
| Sodium benzoate | 0.4% |
| Deionized water | 69.6% |

Preparation of Pretreatment Liquid 17

The following components were mixed while agitating. Then triethanol amine was added to the mixture to control the pH of the mixture so as to be 7. Thus a pretreatment liquid 17 was prepared.

Formulation of Pretreatment Liquid 17

| | |
|---|---|
| Cationic polymer having a repeating unit having formula (19) (polyethyleneimine resin having weight average molecular weight of 5,000) | 8% |
| Glycerin | 40% |
| Ethylene glycol | 40% |
| Quaternary ammonium type cationic surfactant (IONET D46 from Sanyo Chemical Industries Ltd.) | 1% |
| Sodium benzoate | 1% |
| Deionized water | 10% |

Example 27

Preparation of Recording Inks

The following components were mixed while agitating. Then a 10% aqueous solution of lithium hydroxide was added to the mixture to control the pH thereof so as to be 9. Then the mixture was filtered using a Membrane filter having openings of 0.8 μm in an average diameter. Thus yellow ink 7, magenta ink 7, cyan ink 7 and black ink 7 were prepared.

Formulation of Yellow Recording Ink 7

| | |
|---|---|
| Yellow pigment dispersion 3 | 33.3% |
| (yellow pigment | 5.0%) |
| Glycerin | 5% |
| Diethylene glycol | 15% |
| Sodium polyoxyethylene (3) tridecyl ether acetate (anionic surfactant) | 1% |
| 2-ethyl-1,3-hexanediol | 2% |
| Antimildew agent (SUNPACK AP from San-Ai Oil Co., Ltd.) | 0.4% |
| Deionized water | 43.3% |
| (Formulation of yellow pigment dispersion 3) | |
| C.I. Pigment Yellow 74 (average particle diameter of 96 nm) | 15% |
| Condensation product of naphthalene sulfonate with formalin | 3% |
| Deionized water | 82% |

Formulation of Magenta Recording Ink 7

| | |
|---|---|
| Magenta pigment dispersion 3 | 33.3% |
| (magenta pigment | 5.0%) |
| Glycerin | 5% |
| Diethylene glycol | 15% |
| Sodium polyoxyethylene (3) tridecyl ether acetate (anionic surfactant) | 1% |
| 2-ethyl-1,3-hexanediol | 2% |
| Antimildew agent (SUNPACK AP from San-Ai Oil Co., Ltd.) | 0.4% |
| Deionized water | 43.3% |

(Formulation of Magenta Pigment Dispersion 3)

| | |
|---|---|
| C.I. Pigment Red 122 (average particle diameter of 120 nm) | 15% |
| Copolymer of styrene-acrylate-diethanolamine salt of Methacrylic acid | 3% |
| Deionized water | 82% |

Formulation of Cyan Recording Ink 7

| | |
|---|---|
| Cyan pigment dispersion 3 | 33.3% |
| (cyan pigment | 5.0%) |
| Glycerin | 5% |
| Diethylene glycol | 15% |
| Sodium polyoxyethylene (3) tridecyl ether acetate (anionic surfactant) | 1% |
| 2-ethyl-1,3-hexanediol | 2% |
| Antimildew agent (SUNPACK AP from San-Ai Oil Co., Ltd.) | 0.4% |
| Deionized water | 43.3% |

(Formulation of Cyan Pigment Dispersion 3)

| | |
|---|---|
| C.I. Pigment Blue 15:3 (average particle diameter of 123 nm) | 15% |
| Copolymer of styrene-acrylate-diethanolamine salt of Methacrylic acid | 3% |
| Deionized water | 82% |

Formulation of Black Recording Ink 7

| | |
|---|---|
| Black pigment dispersion 3 | 33.3% |
| (black pigment | 5.0%) |
| Glycerin | 5% |
| Diethylene glycol | 15% |
| Sodium polyoxyethylene (3) tridecyl ether acetate (anionic surfactant) | 1% |
| 2-ethyl-1,3-hexanediol | 2% |
| Antimildew agent (SUNPACK AP from San-Ai Oil Co., Ltd.) | 0.4% |
| Deionized water | 43.3% |

(Formulation of Black Pigment Dispersion 3)

| | |
|---|---|
| Carbon black (average particle diameter of 99 nm) | 15% |
| Condensation product of naphthalene sulfonate with formalin | 3% |
| Deionized water | 82% |

Preparation of Pretreatment Liquid 18

The following components were mixed while agitating. Then triethanol amine was added to the mixture to control the pH of the mixture so as to be 7. Thus a pretreatment liquid 18 was prepared.

Formulation of Pretreatment Liquid 18

| | |
|---|---|
| Cationic polymer having a repeating unit having formula (19) (polyethyleneimine resin having weight average molecular weight of 5,000) | 70% |
| Glycerin | 10% |
| 1,5-pentanediol | 10% |
| Nonionic surfactant (SOFTANOL 70 from Nippon Shokubai Co., Ltd.) | 1% |
| Sodium pentachlorophenol | 0.1% |
| Deionized water | 8.9% |

Example 28

Preparation of Recording Inks

The following components were mixed while being agitated. Then a 10% aqueous solution of lithium hydroxide was added to the mixture to control the pH thereof so as to be 9. Then the mixture was filtered using a Membrane filter having openings of 0.1 µm (0.8 µm for the black ink) in an average diameter. Thus yellow ink 8, magenta ink 8, cyan ink 8 and black ink 8 were prepared.

Formulation of Yellow Recording Ink 8

| | |
|---|---|
| C.I. Acid Yellow 23 | 1% |
| C.I. Direct Yellow 142 | 1% |
| N-methyl-2-pyrrolidone | 7% |
| Diethylene glycol | 15% |
| A dialkylsulfosuccinate | 1% |
| 2-ethyl-1,3-hexanediol | 1% |
| Sodium pentachlorophenol | 0.4% |
| Deionized water | 73.6% |

Formulation of Magenta Recording Ink 8

| | |
|---|---|
| C.I. Acid Red 254 | 2% |
| N-methyl-2-pyrrolidone | 7% |
| Diethylene glycol | 15% |
| A dialkylsulfosuccinate | 1% |
| 2-ethyl-1,3-hexanediol | 1% |
| Sodium pentachlorophenol | 0.4% |
| Deionized water | 73.6% |

Formulation of Cyan Recording Ink 8

| | |
|---|---|
| C.I. Acid Blue 249 | 2% |
| C.I. Direct Blue 199 | 1% |
| N-methyl-2-pyrrolidone | 7% |
| Diethylene glycol | 15% |
| A dialkylsulfosuccinate | 1% |
| 2-ethyl-1,3-hexanediol | 1% |
| Sodium pentachlorophenol | 0.4% |
| Deionized water | 72.6% |

Formulation of Black Recording Ink 8

| | |
|---|---|
| Black pigment dispersion 4 (black pigment | 33.3% 5%) |
| N-methyl-2-pyrrolidone | 7% |
| Diethylene glycol | 15% |
| A dialkylsulfosuccinate | 1% |
| 2-ethyl-1,3-hexanediol | 1% |
| Sodium pentachlorophenol | 0.4% |
| Deionized water | 42.3% |

(Formulation of Black Pigment Dispersion 4)

| | |
|---|---|
| Carbon black (average particle diameter of 99 nm) | 15% |
| Copolymer of styrene-acrylate-diethanolamine methacrylate | 3% |
| Deionized water | 82% |

Preparation of Pretreatment Liquid 19

The following components were mixed while agitating. Then triethanol amine was added to the mixture to control the pH of the mixture so as to be 7. Thus a pretreatment liquid 19 was prepared.

Formulation of Pretreatment Liquid 19

| | |
|---|---|
| Cationic polymer having a repeating unit having formula (19) (polyethyleneimine resin having weight average molecular weight of 15,000) | 20% |
| Glycerin | 50% |
| 1,6-hexanediole | 1.5% |
| Nonionic surfactant (SOFTANOL 120 from Nippon Shokubai Co., Ltd.) | 1% |
| Sodium 2-pyridinethiol-1-oxide | 5% |
| Deionized water | 22.5% |

Example 29

Preparation of Recording Inks

The following components were mixed while being agitated. Then a 10% aqueous solution of lithium hydroxide was added to the mixture to control the pH thereof so as to be 9. Then the mixture was filtered using a Membrane filter having openings of 0.1 µm (0.8 µm for the black ink) in an average diameter. Thus yellow ink 9, magenta ink 9, cyan ink 9 and black ink 9 were prepared.

Formulation of Yellow Recording Ink 9

| | |
|---|---|
| C.I. Acid Yellow 23 | 1% |
| C.I. Direct Yellow 86 | 1% |
| Glycerin | 5% |
| Triethylene glycol | 15% |
| Nonionic surfactant (SOFTANOL 120 from Nippon Shokubai Co., Ltd.) | 1% |
| Diethylene glycol monobutyl ether | 3% |
| Sodium 2-pyridinethiol-1-oxide | 0.4% |
| Deionized water | 73.6% |

Formulation of Magenta Recording Ink 9

| | |
|---|---|
| C.I. Reactive Red 180 | 2% |
| C.I. Acid Red 52 | 1% |
| Glycerin | 5% |
| Triethylene glycol | 15% |
| Nonionic surfactant | 1% |
| (SOFTANOL 120 from Nippon Shokubai Co., Ltd.) | |
| Diethylene glycol monobutyl ether | 3% |
| Sodium 2-pyridinethiol-1-oxide | 0.4% |
| Deionized water | 72.6% |

Formulation of Cyan Recording Ink 9

| | |
|---|---|
| C.I. Acid Blue 249 | 2% |
| C.I. Reactive Blue 7 | 1% |
| Glycerin | 5% |
| Triethylene glycol | 15% |
| Nonionic surfactant | 1% |
| (SOFTANOL 120 from Nippon Shokubai Co., Ltd.) | |
| Diethylene glycol monobutyl ether | 3% |
| Sodium 2-pyridinethiol-1-oxide | 0.4% |
| Deionized water | 72.6% |

Formulation of Black Recording Ink 9

| | |
|---|---|
| Carbon black dispersion including an anionic surfactant (average particle diameter of 110 nm) | 5% |
| Glycerin | 5% |
| Triethylene glycol | 15% |
| Sodium polyoxyethylene (3) tridecyl ether acetate (anionic surfactant) | 1% |
| 2-ethyl-1,3-hexanediol | 2% |
| Sodium 2-pyridinethiol-1-oxide | 0.4% |
| Deionized water | 71.6% |

Preparation of Pretreatment Liquid 20

The following components were mixed while agitating. Then triethanol amine was added to the mixture to control the pH of the mixture so as to be 7. Thus a pretreatment liquid 20 was prepared.

Formulation of Pretreatment Liquid 20

| | |
|---|---|
| Cationic polymer having a repeating unit having formula (20) (polyethyleneimine resin having weight average molecular weight of 15,000) | 30% |
| Glycerin | 25% |
| Diethylene glycol | 25% |
| 2-pyrrolidone | 10% |
| Ethyleneoxide-propyleneoxide nonionic surfactant (ADEKA PLURONIC L31 from Asahi Denka Kogyo K.K.) | 1% |
| Sodium Sorbate | 1% |
| Deionized water | 8% |

Example 30

Preparation of Recording Inks

The following components were mixed while being agitated. Then a 10% aqueous solution of lithium hydroxide was added to the mixture to control the pH thereof so as to be 9. Then the mixture was filtered using a Membrane filter having openings of 0.1 μm (0.8 μm for the black ink) in an average diameter. Thus yellow ink 10, magenta ink 10, cyan ink 10 and black ink 10 were prepared.

Formulation of Yellow Recording Ink 10

| | |
|---|---|
| C.I. Acid Yellow 23 | 1% |
| Project Fast Yellow 2 | 1% |
| (manufactured by Avecia) | |
| Glycerin | 5% |
| Diethylene glycol | 15% |
| Sodium polyoxyethylene (3) tridecyl ether acetate (anionic surfactant) | 2% |
| Sodium sorbate | 0.4% |
| Deionized water | 75.6% |

Formulation of Magenta Recording Ink 10

| | |
|---|---|
| C.I. Acid Red 52 | 1% |
| Project Fast Magenta 2 | 1% |
| (manufactured by Avecia) | |
| Glycerin | 5% |
| Diethylene glycol | 15% |
| Sodium polyoxyethylene (3) tridecyl ether acetate (anionic surfactant) | 2% |
| Sodium sorbate | 0.4% |
| Deionized water | 75.6% |

Formulation of Cyan Recording Ink 10

| | |
|---|---|
| C.I. Acid Blue 9 | 1% |
| Project Fast Cyan 2 | 1% |
| (manufactured by Avecia) | |
| Glycerin | 5% |
| Diethylene glycol | 15% |
| Sodium polyoxyethylene (3) tridecyl ether acetate (anionic surfactant) | 2% |
| Sodium sorbate | 0.4% |
| Deionized water | 75.6% |

Formulation of Black Recording Ink 10

| | |
|---|---|
| Dispersion of carbon black with which a sulfonate group is connected (average particle diameter of 122 nm) | 5% |
| Glycerin | 5% |
| Diethyleneglycol | 15% |
| Sodium polyoxyethylene (3) tridecyl ether acetate (anionic surfactant) | 2% |
| Sodium sorbate | 0.4% |
| Deionized water | 72.6% |

Preparation of Pretreatment Liquid 21

The following components were mixed while agitating. Then triethanol amine was added to the mixture to control the pH of the mixture so as to be 7. Thus a pretreatment liquid 21 was prepared.

Formulation of Pretreatment Liquid 21

| | |
|---|---|
| Cationic polymer having a repeating unit having formula (20) | 50% |

-continued

| | |
|---|---|
| (polyethyleneimine resin having weight average molecular weight of 15,000) | |
| Glycerin | 20% |
| Triethylene glycol | 10% |
| 2-pyrrolidone | 10% |
| Sodium dehydroacetate | 0.4% |
| Deionized water | 9.6% |

Example 31

Preparation of Recording Inks

The following components were mixed while agitating. Then a 10% aqueous solution of lithium hydroxide was added to the mixture to control the pH thereof so as to be 9. Then the mixture was filtered using a Membrane filter having openings of 0.1 μm (0.8 μm for the black ink) in an average diameter. Thus yellow ink 11, magenta ink 11, cyan ink 11 and black ink 11 were prepared.

Formulation of Yellow Recording Ink 11

| | |
|---|---|
| C.I. Acid Yellow 23 | 1% |
| C.I. Direct Yellow 142 | 1% |
| Glycerin | 5% |
| Diethylene glycol | 15% |
| Sodium polyoxyethylene (3) tridecyl ether acetate (anionic surfactant) | 1% |
| 2-ethyl-1,3-hexanediol | 1% |
| Antimildew agent (SUNPACK AP from San-Ai Oil Co., Ltd.) | 0.4% |
| Deionized water | 75.6% |

Formulation of Magenta Recording Ink 11

| | |
|---|---|
| C.I. Acid Red 254 | 2% |
| Glycerin | 5% |
| Diethylene glycol | 15% |
| Sodium polyoxyethylene (3) tridecyl ether acetate (anionic surfactant) | 1% |
| 2-ethyl-1,3-hexanediol | 1% |
| Antimildew agent (SUNPACK AP from San-Ai Oil Co., Ltd.) | 0.4% |
| Deionized water | 75.6% |

Formulation of Cyan Recording Ink 11

| | |
|---|---|
| C.I. Acid Blue 249 | 2% |
| C.I. Direct Blue 199 | 1% |
| Glycerin | 5% |
| Diethylene glycol | 15% |
| Sodium polyoxyethylene (3) tridecyl ether acetate (anionic surfactant) | 1% |
| 2-ethyl-1,3-hexanediol | 1% |
| Antimildew agent (SUNPACK AP from San-Ai Oil Co., Ltd.) | 0.4% |
| Deionized water | 74.6% |

Formulation of Black Recording Ink 11

| | |
|---|---|
| Dispersion of carbon black with which a carboxyl group is connected (average particle diameter of 128 nm) | 5% |
| Glycerin | 5% |
| Diethylene glycol | 15% |
| Sodium polyoxyethylene (3) tridecyl ether acetate (anionic surfactant) | 1% |
| 2-ethyl-1,3-hexanediol | 2% |
| Antimildew agent (SUNPACK AP from San-Ai Oil Co., Ltd.) | 0.4% |
| Deionized water | 71.6% |

Preparation of Pretreatment Liquid 22

The following components were mixed while agitating. Then triethanol amine was added to the mixture to control the pH of the mixture so as to be 7. Thus a pretreatment liquid 22 was prepared.

Formulation of Pretreatment Liquid 22

| | |
|---|---|
| Cationic polymer having a repeating unit having formula (20) (polyethyleneimine resin having weight average molecular weight of 10,000) | 30% |
| Glycerin | 10% |
| Antimildew agent (SUNPACK AP from San-Ai Oil Co., Ltd.) | 0.4% |
| Alkyldimethylbenzyl ammonium chloride (cationic surfactant, CATION G-50 from Sanyo Chemical Industries, Ltd.) | 1% |
| Deionized water | 58.6% |

Example 32

Preparation of Recording Inks

The following components were mixed while agitating. Then a 10% aqueous solution of lithium hydroxide was added to the mixture to control the pH thereof so as to be 9. Then the mixture was filtered using a Membrane filter having openings of 0.1 μm (0.8 μm for the black ink) in an average diameter. Thus yellow ink 12, magenta ink 12, cyan ink 12 and black ink 12 were prepared.

Formulation of Yellow Recording Ink 12

| | |
|---|---|
| C.I. Acid Yellow 23 | 1% |
| C.I. Direct Yellow 86 | 1% |
| Glycerin | 10% |
| Sodium polyoxyethylene (3) tridecyl ether acetate (anionic surfactant) | 1% |
| 2-ethyl-1,3-hexanediol | 1% |
| 2-pyrrolidone | 2% |
| Antimildew agent (SUNPACK AP from San-Ai Oil Co., Ltd.) | 0.4% |
| Deionized water | 83.6% |

Formulation of Magenta Recording Ink 12

| | |
|---|---|
| C.I. Reactive Red 180 | 2% |
| C.I. Acid Red 52 | 1% |
| Glycerin | 10% |
| Sodium polyoxyethylene (3) tridecyl ether acetate | 1% |

-continued

| | |
|---|---|
| (anionic surfactant) | |
| 2-ethyl-1,3-hexanediol | 1% |
| 2-pyrrolidone | 2% |
| Antimildew agent | 0.4% |
| (SUNPACK AP from San-Ai Oil Co., Ltd.) | |
| Deionized water | 82.6% |

Formulation of Cyan Recording Ink 12

| | |
|---|---|
| C.I. Acid Blue 249 | 2% |
| C.I. Reactive Blue 7 | 1% |
| Glycerin | 10% |
| Sodium polyoxyethylene (3) tridecyl ether acetate | 1% |
| (anionic surfactant) | |
| 2-ethyl-1,3-hexanediol | 1% |
| 2-pyrrolidone | 2% |
| Antimildew agent | 0.4% |
| (SUNPACK AP from San-Ai Oil Co., Ltd.) | |
| Deionized water | 82.6% |

Formulation of Black Recording Ink 12

| | |
|---|---|
| Dispersion of carbon black dispersed by a polymer dispersant | 5% |
| (average particle diameter of 118 nm, manufactured by Dainichiseika Colour & Chemicals Mfg. Co., Ltd.) | |
| Glycerin | 10% |
| Sodium polyoxyethylene (3) tridecyl ether acetate | 1% |
| (anionic surfactant) | |
| 2-ethyl-1,3-hexanediol | 1% |
| 2-pyrrolidone | 2% |
| Antimildew agent | 0.4% |
| (SUNPACK AP from San-Ai Oil Co., Ltd.) | |
| Deionized water | 80.6% |

Preparation of Pretreatment Liquid 23

The following components were mixed while agitating. Then triethanol amine was added to the mixture to control the pH of the mixture so as to be 7. Thus a pretreatment liquid 23 was prepared.

Formulation of Pretreatment Liquid 23

| | |
|---|---|
| Cationic polymer having a repeating unit having formula (20) | 50% |
| (polyethyleneimine resin having weight average molecular weight of 10,000) | |
| Glycerin | 5% |
| Diethylene glycol | 15% |
| Alkyldimethylbenzyl ammonium chloride | 1% |
| (cationic surfactant, CATION G-50 from Sanyo Chemical Industries, Ltd.) | |
| Sodium dehydroacetate | 0.4% |
| 2-pyrrolidone | 28.6% |

Example 33

Preparation of Recording Inks

The following components were mixed while agitating. Then a 10% aqueous solution of lithium hydroxide was added to the mixture to control the pH thereof so as to be 9. Then the mixture was filtered using a Membrane filter having openings of 0.1 μm (0.8 μm for the black ink) in an average diameter. Thus yellow ink 13, magenta ink 13, cyan ink 13 and black ink 13 were prepared.

Formulation of Yellow Recording Ink 13

| | |
|---|---|
| C.I. Acid Yellow 23 | 1% |
| C.I. Direct Yellow 86 | 1% |
| Glycerin | 5% |
| 1,5-pentanediol | 15% |
| Sodium polyoxyethylene (3) tridecyl ether acetate | 1% |
| (anionic surfactant) | |
| Sodium dehydroacetate | 0.4% |
| Deionized water | 76.6% |

Formulation of Magenta Recording Ink 13

| | |
|---|---|
| C.I. Reactive Red 180 | 2% |
| C.I. Acid Red 52 | 1% |
| Glycerin | 5% |
| 1,5-pentanediol | 15% |
| Sodium polyoxyethylene (3) tridecyl ether acetate | 1% |
| (anionic surfactant) | |
| Sodium dehydroacetate | 0.4% |
| Deionized water | 75.6% |

Formulation of Cyan Recording Ink 13

| | |
|---|---|
| C.I. Acid Blue 249 | 2% |
| C.I. Reactive Blue 7 | 1% |
| Glycerin | 5% |
| 1,5-pentanediol | 15% |
| Sodium polyoxyethylene (3) tridecyl ether acetate | 1% |
| (anionic surfactant) | |
| Sodium dehydroacetate | 0.4% |
| Deionized water | 75.6% |

Formulation of Black Recording Ink 13

| | |
|---|---|
| Anionic microencapsulated carbon black | 5% |
| (from Dainippon Ink & Chemicals, Inc., average particle diameter of 125 nm) | |
| Glycerin | 5% |
| 1,5-pentanediol | 15% |
| Sodium polyoxyethylene (3) tridecyl ether acetate | 1% |
| (anionic surfactant) | |
| Sodium dehydroacetate | 0.4% |
| Deionized water | 73.6% |

Preparation of Pretreatment Liquid 24

The following components were mixed while agitating. Then triethanol amine was added to the mixture to control the pH of the mixture so as to be 7. Thus a pretreatment liquid 24 was prepared.

Formulation of Pretreatment Liquid 24

| | |
|---|---|
| Cationic polymer having a repeating unit having formula (20) | 20% |
| (polyethyleneimine resin having weight average molecular weight of 30,000) | |
| Glycerin | 10% |

-continued

| | |
|---|---|
| Antimildew agent (SUNPACK AP from San-Ai Oil Co., Ltd.) | 0.4% |
| Alkyldimethylbenzyl ammonium chloride (cationic surfactant, CATION G-50 from Sanyo Chemical Industries, Ltd.) | 2% |
| Deionized water | 67.6% |

Images were recorded on a copy paper, MYPAPER manufactured by NBS Ricoh, using the thus prepared recording inks and pretreatment liquids of Examples 26 to 33. The recording conditions were as follows:
Printer: the image recording apparatus as shown in FIG. 1
Recording head: 1. Head using a PZT piezoelectric device as an ink discharging source
2. Head using a heater as an ink discharging source
3. Head utilizing electrostatic force as an ink discharging source
Coating weight of pretreatment liquid: described in Table 2
The recorded images were evaluated as follows:

1) Black Image Density
A black solid image was formed using a black recording ink. After the image dried, the image density thereof was measured with a reflection type spectrophotometric densitometer manufactured by X-Rite. The quality of the images with respect to black image density was graded as follows:
◎: Image density is not less than 1.45. (good)
○: Image density is from 1.20 to 1.44.
X: Image density is less than 1.20. (poor)

2) Blurring at Image Boundary Portions (Image Blurring)
Color line images of magenta, cyan and black each having a width of 0.5 mm formed on a yellow solid image formed on the recording materials were observed to determine whether feathering occurred. Similarly, color line images of yellow, magenta and black formed on a cyan solid image, and color line images of yellow, cyan and black images formed on a magenta solid image, were also evaluated. The quality of the images with respect to blurring was graded as follows:
◎: Blurring is hardly observed by naked eye at the image boundary portions, and the images can be practically used without problems. (good)
Δ: Slight blurring is observed by naked eye at the image boundary portions, and a problem may occur if small character images are recorded.
X: Blurring is clearly observed by naked eye at the image boundary portions, and the image is on such a level that a problem may occur.

3) Feathering
Color line images of magenta, cyan, yellow and black each having a width of 0.5 mm recorded on the copy paper were observed to determine whether feathering occurred (i.e., blurring of ink along pulp fibers occurred). The quality of the images with respect to feathering was graded as follows:
◎: Feathering is hardly observed even when the image is observed using a magnifying glass of 10 power magnification.
○: Feathering is hardly observed by naked eye but is observed when the image is observed using a magnifying glass of 10 power magnification. However, the image is still acceptable.
X: Feathering is clearly observed by naked eye, and the image is on such a level that a problem may occur.

4) Color Tone
Color images of red, green, blue, yellow, magenta and cyan were recorded. After the images dried, the color tones of the color images were visually evaluated by ten persons. The quality of the images with respect to color tone was graded as follows:
◎: The color of the image is brilliant. (good)
○: The color quality is fair and the image is on such a level as to be practically used.
X: The color of the image is not brilliant. (poor)

5) Ink Penetration
Yellow, magenta and cyan color solid images each having an image density of 1.0 were formed on the copy paper. The solid images were visually observed from the backside of the copy paper. The quality of the images with respect to ink penetration was graded as follows:
◎: The boundary between the solid image and the background is unclear and images recorded both sides of the recording papers can be read without problems. (good)
○: The boundary between the solid image and the background is almost unclear and images recorded both sides of the recording papers can be read almost without problems.
Δ: The boundary between the solid image and the background is clear although the ink does not reach the backside of the recording paper. A problem may occur if images are recorded on both sides of the receiving paper.
X: the colorant in the image penetrates the recording paper and reaches the backside of the recording paper. Therefore the images cannot be recorded on both sides of the recording paper.

6) Curling and Cockling
A black solid image was formed on the recording paper, and the image was observed to determine whether curling and cockling occurred. The quality of curling and cockling was graded as follows:
◎: Curling and cockling are hardly observed.
○: The copy is slightly curled and cockled but the image is on such a level that a problem may not occur.
X: The copy is curled and cockled and the image is on such a level that a problem may occur.

7) Resistance of Image to Water
Color solid images recorded on the copy paper using each recording ink was dipped in deionized water at 30° C. for 60 seconds. Then the copy paper was pulled out of water and a filter paper was put on the images upon application of pressure of 0.1 kg/cm to observe whether the colorant was transferred on the filter paper and the recorded image was blurred. The quality of the images with respect to resistance to water was graded as follows:
◎: The colorant is not transferred and the image is not blurred. (good)
○: The colorant is slightly transferred but the image is not blurred.
X: The colorant is transferred and the image is blurred. (poor)

In addition, the preservation property of the pretreatment liquids 17–24 was evaluated by the following method:

8) Preservation Property of Pretreatment Liquid
Each of the pretreatment liquids 17–24 was preserved at 60° C. for 30 days while being set in the container 42 of the image recording apparatus as shown in FIG. 1. The preservation property is graded as follows: .
○: The pretreatment liquid could be used without problems even after the preservation test. (good)

X: Problems occurred when the pretreatment liquid was used after the preservation test. (poor)
The results are shown in Table 2.

Comparative Example 29

The procedures for the image formation and evaluation of image qualities in Example 26 were repeated except that the pretreatment was not performed on the recording paper. The recorded images were evaluated with respect to the items 1) to 5) and 7) mentioned above.

Comparative Example 30

The procedures for the image formation and evaluation of image qualities in Example 27 were repeated except that the pretreatment was not performed on the recording paper. The recorded images were evaluated with respect to the items 1) to 5) and 7) mentioned above.

Comparative Example 31

The procedures for the image formation and evaluation of image qualities in Example 28 were repeated except that the pretreatment was not performed on the recording paper. The recorded images were evaluated with respect to the items 1) to 5) and 7) mentioned above.

Comparative Example 32

The procedures for the image formation and evaluation of image qualities in Example 29 were repeated except that the pretreatment was not performed on the recording paper. The recorded images were evaluated with respect to the items 1) to 5) and 7) mentioned above.

Comparative Example 33

The procedures for the image formation and evaluation of image qualities in Example 30 were repeated except that the pretreatment was not performed on the recording paper. The recorded images were evaluated with respect to the items 1) to 5) and 7) mentioned above.

Comparative Example 34

The procedures for the image formation and evaluation of image qualities in Example 31 were repeated except that the pretreatment was not performed on the recording paper. The recorded images were evaluated with respect to the items 1) to 5) and 7) mentioned above.

Comparative Example 35

The procedures for the image formation and evaluation of image qualities in Example 32 were repeated except that the pretreatment was not performed on the recording paper. The recorded images were evaluated with respect to the items 1) to 5) and 7) mentioned above.

Comparative Example 36

The procedures for the image formation and evaluation of image qualities in Example 33 were repeated except that the pretreatment was not performed on the recording paper. The recorded images were evaluated with respect to the items 1) to 5) and 7) mentioned above.

Comparative Example 37

The pretreatment liquid 22 prepared in Example 31 was contained in a recording head using a PZT piezoelectric device as an ink discharging source. After the pretreatment liquid 22 was sprayed on image forming areas of the copy paper, color images were formed on the copy paper using the yellow, magenta, cyan and black recording inks 11 prepared in Example 31 using a head using a PZT piezoelectric device as an ink discharging source. The images and pretreatment liquid were evaluated with respect to the items 1) to 8) mentioned above. As a result, the pretreatment liquid was not discharged from the nozzles of the recording head.

Comparative Example 38

The procedures for the image formation and evaluation of image qualities in Comparative Example 37 were repeated except that the pretreatment liquid 22 was replaced with the following pretreatment liquid 25.

Formulation of Pretreatment Liquid 25

| | |
|---|---|
| Cationic resin | 2% |
| (weight average molecular weight of 10,000) | |
| Glycerin | 10% |
| Antimildew agent | 0.4% |
| (SUNPACK AP from San-Ai Oil Co., Ltd.) | |
| Alkyldimethylbenzyl ammonium chloride | 1% |
| type surfactant | |
| (CATION G-50 from Sanyo Chemical Industries, Ltd.) | |
| Deionized water | 86.6% |

The viscosity of the pretreatment liquid 25 is described in Table 2.
As a result, the pretreatment liquid was not discharged from the nozzles of the recording head.

Examples 34 to 43

The procedures for the image formation and evaluation of image qualities in Example 31 were repeated except that the recording paper was changed to the following:
Example 34: Xerox Paper R from Xerox Corp.
  (sizing degree of 8 s and air permeability of 20 s)
Example 35: REFLEX from AUSTRALIAN PAPER Co.
  (sizing degree of 25 s and air permeability of 4 s)
Example 36: NBS COPY PAPER 90K from NBS Ricoh
  (sizing degree of 60 s and air permeability of 68 s)
Example 37: PB PAPER from Canon Inc.
  (sizing degree of 21 s and air permeability of 8 s)
Example 38: NBS COPY PAPER 45K from NBS Ricoh
  (sizing degree of 11 s and air permeability of 45 s)
Example 39: YAMAYURI from Oji Paper Co., Ltd. (Honshu Seishi K.K.)
  (sizing degree of 12 s and air permeability of 21 s)
Example 40: PPC PAPER SHIGEN TYPE S from Ricoh Co., Ltd.
  (sizing degree of 22 s and air permeability of 13 s)
Example 41: Xerox Paper P from Xerox Corp.
  (sizing degree of 24 s and air permeability of 19 s)
Example 42: MULTIACE from Xerox Corp.
  (sizing degree of 25 s and air permeability of 17 s)
Example 43: Xerox 4024 from Xerox Corp.
  (sizing degree of 32 s and air permeability of 21 s)

TABLE 2

| | Pretreatment liquid | | Image qualities | | | | | | | Pretreatment liquid |
|---|---|---|---|---|---|---|---|---|---|---|
| | Viscosity (mPas · s) | Coating Weight (g/m²) | Image density | Blurring | Feathing | Color tone | Penetration | Curling, Cockling | Water resistance | Preservability |
| Ex.26 | 300 | 9 | ○ | ○ | ○ | ○ | ○ | ○ | ○ | ○ |
| Ex.27 | 100 | 3 | ◎ | ◎ | ◎ | ○ | ◎ | ○ | ◎ | ○ |
| Ex.28 | 600 | 6 | ◎ | ◎ | ◎ | ◎ | ◎ | ○ | ◎ | ○ |
| Ex.29 | 400 | 4 | ◎ | ◎ | ◎ | ◎ | ◎ | ◎ | ○ | ○ |
| Ex.30 | 200 | 3 | ◎ | ◎ | ◎ | ◎ | ◎ | ◎ | ◎ | ○ |
| Ex.31 | 80 | 4 | ◎ | ◎ | ◎ | ◎ | ◎ | ○ | ◎ | ○ |
| Ex.32 | 80 | 3 | ◎ | ◎ | ◎ | ◎ | ◎ | ◎ | ◎ | ○ |
| Ex.33 | 40 | 5 | ◎ | ◎ | ◎ | ◎ | ○ | ○ | ◎ | ○ |
| Comp. Ex.29 | — | — | X | X | X | ○ | X | — | X | — |
| Comp. Ex.30 | — | — | ○ | △ | ○ | X | △ | — | ○ | — |
| Comp. Ex.31 | — | — | ○ | △ | X | ○ | △ | — | X | — |
| Comp. Ex.32 | — | — | ○ | △ | X | ○ | X | — | X | — |
| Comp. Ex.33 | — | — | ○ | △ | X | ○ | X | — | X | — |
| Comp. Ex.34 | — | — | ○ | △ | X | ○ | X | — | X | — |
| Comp. Ex.35 | — | — | ○ | △ | X | ○ | X | — | X | — |
| Comp. Ex. 36 | — | — | ○ | △ | X | ○ | X | — | X | — |
| Comp. Ex.37 | 200 | | The pretreatment liquid was not discharged. | | | | | | | |
| Comp. Ex.38 | 10 | | The pretreatment liquid was not discharged. | | | | | | | |
| Comp. Ex. 39 | 5 | 15 | ○ | △ | X | ○ | X | X | ○ | ○ |
| Ex.34 | 80 | 4 | ◎ | ◎ | ◎ | ◎ | ◎ | ○ | ◎ | ○ |
| Ex.35 | 80 | 4 | ◎ | ◎ | ◎ | ◎ | ◎ | ○ | ◎ | ○ |
| Ex.36 | 80 | 4 | ◎ | ◎ | ◎ | ◎ | ◎ | ○ | ◎ | ○ |
| Ex.37 | 80 | 4 | ◎ | ◎ | ◎ | ◎ | ◎ | ○ | ◎ | ○ |
| Ex.38 | 80 | 4 | ◎ | ◎ | ◎ | ◎ | ◎ | ○ | ◎ | ○ |
| Ex.39 | 80 | 4 | ◎ | ◎ | ◎ | ◎ | ◎ | ○ | ◎ | ○ |
| Ex.40 | 80 | 4 | ◎ | ◎ | ◎ | ◎ | ◎ | ○ | ◎ | ○ |
| Ex.41 | 80 | 4 | ◎ | ◎ | ◎ | ◎ | ◎ | ○ | ◎ | ○ |
| Ex.42 | 80 | 4 | ◎ | ◎ | ◎ | ◎ | ◎ | ○ | ◎ | ○ |
| Ex.43 | 80 | 4 | ◎ | ◎ | ◎ | ◎ | ◎ | ○ | ◎ | ○ |

Example 44

The procedures for the image formation and evaluation of image qualities in Example 26 were repeated except that the pretreatment liquid was changed to the following pretreatment liquid 27.

Formulation of Pretreatment Liquid 27

| | |
|---|---|
| Dicyandiamide resin (CELLOPOL YM-500 from Sanyo Chemical Industries, Ltd.) | 8% |
| Glycerin | 40% |
| Ethylene glycol | 40% |
| Surfactant having formula (24) | 1% |
| Sodium benzoate (antimildew agent) | 1% |
| Deionized water | 10% |

Example 45

The procedures for the image formation and evaluation of image qualities in Example 27 were repeated except that the pretreatment liquid was changed to the following pretreatment liquid 28.

Formulation of pretreatment liquid 28

| | |
|---|---|
| Dicyandiamide resin (CELLOPOL YM-500 from Sanyo Chemical Industries, Ltd.) | 70% |
| Glycerin | 10% |
| 1,5-pentanediol | 10% |
| Surfactant having formula (24) | 1% |
| Sodium pentachlorophenol (antimildew agent) | 0.1% |
| Deionized water | 8.9% |

Example 46

The procedures for the image formation and evaluation of image qualities in Example 28 were repeated except that the pretreatment liquid was changed to the following pretreatment liquid 29.

Formulation of Pretreatment Liquid 29

| | |
|---|---|
| Dicyandiamide resin | 20% |
| (SUNFIX 70 from Sanyo Chemical Industries, Ltd.) | |
| Glycerin | 50% |
| 1,6-hexanediol | 1.5% |
| Surfactant having formula (24) | 1% |
| Sodium 2-pyridinethiol-1-oxide (antimildew agent) | 5% |
| Deionized water | 22.5% |

Example 47

The procedures for the image formation and evaluation of image qualities in Example 29 were repeated except that the pretreatment liquid was changed to the following pretreatment liquid 30.

Formulation of Pretreatment Liquid 30

| | |
|---|---|
| Dicyandiamide resin | 30% |
| (Q105-H from HYMO Co., Ltd.) | |
| Glycerin | 25% |
| Diethyleneglycol | 25% |
| 2-pyrrolidone | 10% |
| Surfactant having formula (25) | 1% |
| Sodium sorbate (antimildew agent) | 1% |
| Deionized water | 8% |

Example 48

The procedures for the image formation and evaluation of image qualities in Example 30 were repeated except that the pretreatment liquid was changed to the following pretreatment liquid 31.

Formulation of Pretreatment Liquid 31

| | |
|---|---|
| Dicyandiamide resin | 50% |
| (CELLOPOL YM-500 from Sanyo Chemical Industries, Ltd.) | |
| Glycerin | 20% |
| Triethylene glycol | 10% |
| 2-pyrrolidone | 10% |
| Surfactant having formula (26) | 1% |
| Sodium dehydroacetate (antimildew agent) | 0.4% |
| Deionized water | 8.6% |

Example 49

The procedures for the image formation and evaluation of image qualities in Example 31 were repeated except that the pretreatment liquid was changed to the following pretreatment liquid 32.

Formulation of Pretreatment Liquid 32

| | |
|---|---|
| Dicyandiamide resin | 30% |
| (CELLOPOL YM-600 from Sanyo Chemical Industries, Ltd.) | |
| Glycerin | 10% |
| Antimildew agent | 0.4% |
| (SUNPACK AP from San-Ai Oil Co., Ltd.) | |
| Surfactant having formula (27) | 1% |
| Deionized water | 58.6% |

Example 50

The procedures for the image formation and evaluation of image qualities in Example 32 were repeated except that the pretreatment liquid was changed to the following pretreatment liquid 33.

Formulation of Pretreatment Liquid 33

| | |
|---|---|
| Dicyandiamide resin | 50% |
| (SUNFIX 70 from Sanyo Chemical Industries, Ltd.) | |
| Glycerin | 5% |
| Diethylene glycol | 15% |
| Surfactant having formula (28) | 1% |
| Sodium dehydroacetate (antimildew agent) | 0.4% |
| 2-pyrrolidone | 28.6% |

Example 51

The procedures for the image formation and evaluation of image qualities in Example 33 were repeated except that the pretreatment liquid was changed to the following the pretreatment liquid 34.

Formulation of Pretreatment Liquid 34

| | |
|---|---|
| Dicyandiamide resin | 20% |
| (Q105-H from HYMO Co., Ltd.) | |
| Glycerin | 10% |
| Antimildew agent | 0.4% |
| (SUNPACK AP from San-Ai Oil Co., Ltd.) | |
| Surfactant having formula (29) | 2% |
| Deionized water | 67.6% |

Comparative Example 40

The procedures for the image formation and evaluation of image qualities in Example 44 were repeated except that the pretreatment was not performed on the recording paper. The recorded images were evaluated with respect to the items 1) to 5) and 7) mentioned above.

Comparative Example 41

The procedures for the image formation and evaluation of image qualities in Example 45 were repeated except that the pretreatment was not performed on the recording paper. The recorded images were evaluated with respect to the items 1) to 5) and 7) mentioned above.

Comparative Example 42

The procedures for the image formation and evaluation of image qualities in Example 46 were repeated except that the

77 pretreatment was not performed on the recording paper. The recorded images were evaluated with respect to the items 1) to 5) and 7) mentioned above.

Comparative Example 43

The procedures for the image formation and evaluation of image qualities in Example 47 were repeated except that the pretreatment was not performed on the recording paper. The recorded images were evaluated with respect to the items 1) to 5) and 7) mentioned above.

Comparative Example 44

The procedures for the image formation and evaluation of image qualities in Example 48 were repeated except that the pretreatment was not performed on the recording paper. The recorded images were evaluated with respect to the items 1) to 5) and 7) mentioned above.

Comparative Example 45

The procedures for the image formation and evaluation of image qualities in Example 49 were repeated except that the pretreatment was not performed on the recording paper. The recorded images were evaluated with respect to the items 1) to 5) and 7) mentioned above.

Comparative Example 46

The procedures for the image formation and evaluation of image qualities in Example 50 were repeated except that the pretreatment was not performed on the recording paper. The recorded images were evaluated with respect to the items 1) to 5) and 7) mentioned above.

Comparative Example 47

The procedures for the image formation and evaluation of image qualities in Example 51 were repeated except that the pretreatment was not performed on the recording paper. The recorded images were evaluated with respect to the items 1) to 5) and 7) mentioned above.

Comparative Example 48

The pretreatment liquid 32 prepared in Example 49 was contained in a recording head using a PZT piezoelectric device as an ink discharging source. After the pretreatment liquid 32 was sprayed on image forming areas of the copy paper, color images were formed on the copy paper using the yellow, magenta, cyan and black recording inks 11 prepared in Example 31 using a head using a PZT piezoelectric device as an ink discharging source. The images and pretreatment liquid were evaluated with respect to the items 1) to 8) mentioned above. As a result, the pretreatment liquid was not discharged from the nozzles of the recording head.

Comparative Example 49

The procedures for the image formation and evaluation of image qualities in Comparative Example 48 were repeated except that the pretreatment liquid 32 was changed to the following pretreatment liquid 35.

78

Formulation of Pretreatment Liquid 35

| | |
|---|---|
| Dicyandiamide resin (CELLOPOL YM-500 from Sanyo Chemical Industries, Ltd.) | 2% |
| Glycerin | 10% |
| Antimildew agent (SUNPACK AP from San-Ai Oil Co., Ltd.) | 0.4% |
| Surfactant having formula (24) | 1% |
| Deionized water | 86.6% |

The viscosity of the pretreatment liquid 35 is described in Table 3.

As a result, the pretreatment liquid was not discharged from the nozzles of the recording head.

Comparative Example 50

The procedures for the image formation and evaluation of image qualities in Comparative Example 48 were repeated except that the pretreatment liquid 32 was replaced with the following pretreatment liquid 36.

Formulation of Pretreatment Liquid 36

| | |
|---|---|
| Dicyandiamide resin (SUNFIX 70 from Sanyo Chemical Industries, Ltd.) | 1% |
| Glycerin | 10% |
| Antimildew agent (SUNPACK AP from San-Ai Oil Co., Ltd.) | 0.4% |
| Surfactant having formula (25) | 1% |
| Deionized water | 87.6% |

The viscosity of the pretreatment liquid 36 is described in Table 3.

Examples 52 to 61

The procedures for the image formation and evaluation of image qualities in Example 49 were repeated except that the recording paper was changed to the following:

Example 52: Xerox Paper R from Xerox Corp.
  (sizing degree of 8 s and air permeability of 20 s)
Example 53: REFLEX from AUSTRALIAN PAPER Co.
  sizing degree of 25 s and air permeability of 4 s)
Example 54: NBS COPY PAPER 90K from NBS Ricoh
  sizing degree of 60 s and air permeability of 68 s)
Example 55: PB PAPER from Canon Inc.
  sizing degree of 21 s and air permeability of 8 s)
Example 56: NBS COPY PAPER 45K from NBS Ricoh
  sizing degree of 11 s and air permeability of 45 s)
Example 57: YAMAYURI from Oji Paper Co., Ltd. (Honshu Seishi K.K.)
  sizing degree of 12 s and air permeability of 21 s)
Example 58: PPC PAPER SHIGEN TYPE S from Ricoh Co., Ltd.
  sizing degree of 22 s and air permeability of 13 s)
Example 59: Xerox Paper P from Xerox Corp.
  (sizing degree of 24 s and air permeability of 19 s)
Example 60: MULTIACE from Xerox Corp.
  sizing degree of 25 s and air permeability of 17 s)
Example 61: Xerox 4024 from Xerox Corp.
  sizing degree of 32 s and air permeability of 21 s)

TABLE 3

| | Pretreatment liquid | | Image qualities | | | | | | | Pretreatment |
|---|---|---|---|---|---|---|---|---|---|---|
| | Viscosity (mPas · s) | Coating Weight (g/m²) | Image density | Blurring | Feathing | Color tone | Penetration | Curling, Cockling | Water resistance | liquid Preservability |
| Ex. 44 | 500 | 8 | ○ | ○ | ○ | ○ | ○ | ○ | ○ | ○ |
| Ex. 45 | 300 | 2 | ◎ | ◎ | ◎ | ○ | ◎ | ○ | ◎ | ○ |
| Ex. 46 | 800 | 5 | ◎ | ◎ | ◎ | ◎ | ◎ | ○ | ◎ | ○ |
| Ex. 47 | 600 | 3 | ◎ | ◎ | ◎ | ◎ | ◎ | ◎ | ○ | ○ |
| Ex. 48 | 400 | 2 | ◎ | ◎ | ◎ | ◎ | ◎ | ◎ | ◎ | ○ |
| Ex. 49 | 200 | 3 | ◎ | ◎ | ◎ | ◎ | ◎ | ○ | ◎ | ○ |
| Ex. 50 | 200 | 2 | ◎ | ◎ | ◎ | ◎ | ◎ | ◎ | ◎ | ○ |
| Ex. 51 | 100 | 4 | ◎ | ◎ | ◎ | ◎ | ○ | ○ | ◎ | ○ |
| Comp. Ex. 40 | — | — | X | X | X | ○ | X | — | X | — |
| Comp. Ex. 41 | — | — | ○ | Δ | ○ | X | Δ | — | ○ | — |
| Comp. Ex. 42 | — | — | ○ | Δ | X | ○ | Δ | — | X | — |
| Comp. Ex. 43 | — | — | ○ | Δ | X | ○ | X | — | X | — |
| Comp. Ex. 44 | — | — | ○ | Δ | X | ○ | X | — | X | — |
| Comp. Ex. 45 | — | — | ○ | Δ | X | ○ | X | — | X | — |
| Comp. Ex. 46 | — | — | ○ | Δ | X | ○ | X | — | X | — |
| Comp. Ex. 47 | — | — | ○ | Δ | X | ○ | X | — | X | — |
| Comp. Ex. 48 | 200 | | The pretreatment liquid was not discharged. | | | | | | | |
| Comp. Ex. 49 | 10 | | The pretreatment liquid was not discharged. | | | | | | | |
| Comp. Ex. 50 | 5 | 15 | ○ | Δ | X | ○ | X | X | ○ | ○ |
| Ex. 52 | 200 | 3 | ◎ | ◎ | ◎ | ◎ | ◎ | ○ | ◎ | ○ |
| Ex. 53 | 200 | 3 | ◎ | ◎ | ◎ | ◎ | ◎ | ○ | ◎ | ○ |
| Ex. 54 | 200 | 3 | ◎ | ◎ | ◎ | ◎ | ◎ | ○ | ◎ | ○ |
| Ex. 55 | 200 | 3 | ◎ | ◎ | ◎ | ◎ | ◎ | ○ | ◎ | ○ |
| Ex. 56 | 200 | 3 | ◎ | ◎ | ◎ | ◎ | ◎ | ○ | ◎ | ○ |
| Ex. 57 | 200 | 3 | ◎ | ◎ | ◎ | ◎ | ◎ | ○ | ◎ | ○ |
| Ex. 58 | 200 | 3 | ◎ | ◎ | ◎ | ◎ | ◎ | ○ | ◎ | ○ |
| Ex. 59 | 200 | 3 | ◎ | ◎ | ◎ | ◎ | ◎ | ○ | ◎ | ○ |
| Ex. 60 | 200 | 3 | ◎ | ◎ | ◎ | ◎ | ◎ | ○ | ◎ | ○ |
| Ex. 61 | 200 | 3 | ◎ | ◎ | ◎ | ◎ | ◎ | ○ | ◎ | ○ |

Effects of the Present Invention

The pretreatment liquid of the present invention includes a compound, which can depress the solubility or dispersibility of a component included in the recording ink used for recording images, at a high concentration. In addition, the pretreatment liquid has a relatively high viscosity compared to the viscosity of conventional pretreatment liquids, which are applied to recording materials by an inkjet recording method. Therefore, by applying the pretreatment liquid on a recording material, the image density and color tone of recorded images can be improved without causing problems such as the blurring, feathing and ink penetration problems.

In particular, since the pretreatment liquid of the present invention has a relatively high viscosity, the pretreatment liquid-does not penetrate into the bowels of recording materials (i.e., the pretreatment liquid remains in the surface portions of recording materials). Therefore, the above-mentioned image quality improving effects can be exerted even when the coating weight is a relatively low compared to the coating weight in the conventional pretreatment method in which a pretreatment liquid is discharged by an inkjet recording method.

In addition, since the coating weight can be decreased, problems such as curling and cockling of recording materials hardly occur. Further, by using the pretreatment liquid including a cationic compound and recording inks including an anionic compound, the ink penetration problem can be prevented and the image qualities can be further enhanced.

Thus, by using the image recording method and the pretreatment liquid of the present invention, it becomes possible to perform double-faced recording on a plain paper.

In addition, the pretreatment liquid can be applied with a simple applicator such as rollers, the image recording apparatus can be manufactured at a low cost. Further, since the coating weight of the pretreatment liquid is low, the running cost can be reduced.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2001-084048, filed on Mar. 23, 2001, the entire contents of which are herein incorporated by reference.

What is claimed as new and desired to be secured by Letters Patent of the United States is:

1. A pretreatment liquid, comprising:

a cationic polymer in an amount of 10 to 80% by weight based on total weight that depresses at least one of the dispersibility and solubility of a component in a recording ink, wherein the pretreatment liquid has a viscosity of from 100 to 10,000 mPa·s at 25° C.;

wherein the cationic polymer has or includes a formula selected from the group consisting of the following formulae (1), (2), (5) to (16) and (18):

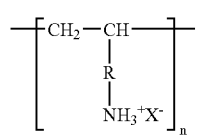
(1)

wherein $X^-$ represents a halogen ion, a nitrate ion, a nitrite ion or an acetate ion; R represents an alkylene group having from 1 to 3 carbon atoms; and n is an integer;

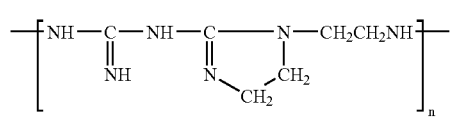
(2)

wherein n is an integer;

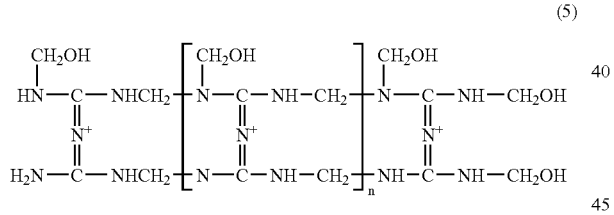
(5)

wherein n is an integer of from 5 to 30;

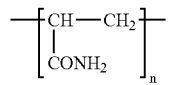
(6)

wherein n is an integer;

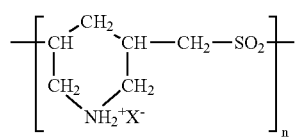
(7)

wherein $X^-$ represents a halogen ion, a nitrate ion, a nitrite ion or an acetate ion; and n is an integer;

(8)

wherein n is an integer;

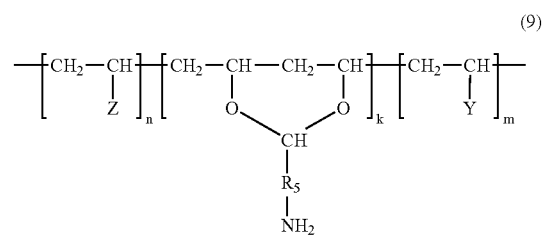
(9)

wherein Z and Y independently represent —OCOCH$_3$ or —OH; $R_5$ represents an alkylene group having from 1 to 4 carbon atoms; and n, k and m independently are integers;

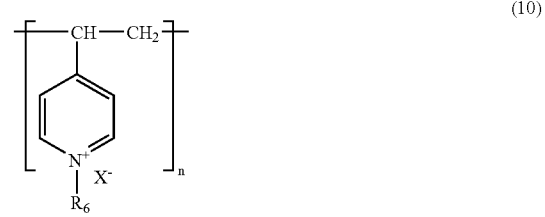
(10)

wherein $R_6$ represents an alkyl group; $X^-$ represents a halogen ion, a nitrate ion, a nitrite ion or an acetate ion; and n is an integer;

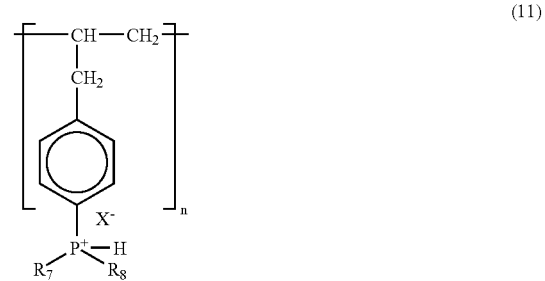
(11)

wherein $R_7$ and $R_8$ independently represent a hydrogen atom or an alkyl group; $X^-$ represents a halogen ion, a nitrate ion, a nitrite ion or an acetate ion; and n is an integer;

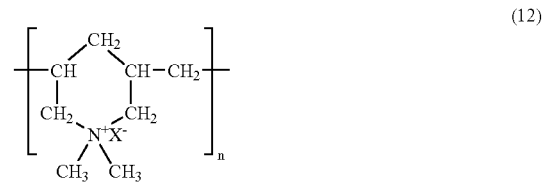
(12)

wherein $X^-$ represents a halogen ion, a nitrate ion, a nitrite ion or an acetate ion; and n is an integer;

(13)

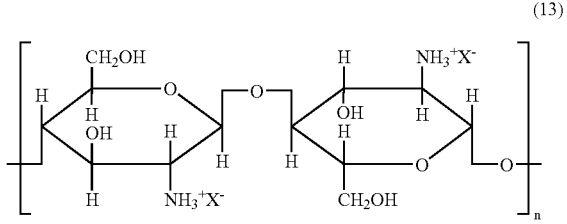

wherein X⁻ represents a halogen ion, a nitrate ion, a nitrate ion or an acetate ion; and n is an integer;

(14)

wherein j and k are independently an integer of from 2 to 6; and n is an integer;

(15)

wherein X⁻ represents a halogen ion, a nitrate ion, a nitrate ion or an acetate ion; and n is an integer;

(16)

wherein X⁻ represents a halogen ion, a nitrate ion, a nitrite ion or an acetate ion; Q represents another repeating unit; and n and m are independently an integer; and (18)

wherein X⁻ represents a halogen ion, a nitrate ion, a nitrite ion or an acetate ion; and n is an integer.

2. The pretreatment liquid according to claim 1, wherein the component in the recording ink is a colorant.

3. The pretreatment liquid according to claim 1, wherein the viscosity of the pretreatment liquid is from 100 to 3000 mPa·s at 25° C.

4. The pretreatment liquid according to claim 1, further comprising water in an amount of from 5% to 80% by weight based on total weight of the pretreatment liquid.

5. The pretreatment liquid according to claim 1, further comprising water and a water-soluble liquid compound, wherein water and the water-soluble liquid compound are included in an amount of from 20% to 80% by weight based on total weight of the pretreatment liquid.

6. The pretreatment liquid according to claim 5, wherein water is included in the pretreatment liquid in an amount not greater than 40% by weight based on total weight of the pretreatment liquid.

7. The pretreatment liquid according to claim 6, wherein the content of water is not greater than an equilibrium water content of the water-soluble liquid compound at 60%RH.

8. The pretreatment liquid according to claim 1, further comprising a water-soluble organic solvent in an amount of from 5 to 70% by weight based on total weight of the pretreatment liquid.

9. The pretreatment liquid according to claim 1, wherein the cationic polymer has a cationic degree not less than 3.0 meq/g.

10. The pretreatment liquid according to claim 1, wherein the cationic polymer is dispersed in the pretreatment liquid.

11. The pretreatment liquid according to claim 10, wherein the cationic compound is emulsified in the pretreatment liquid.

12. The pretreatment liquid according to claim 1, further comprising at least one of a surfactant and a wetting accelerator, wherein the pretreatment liquid has a surface tension not greater than 40 mN/m.

13. The pretreatment liquid according to claim 12, wherein the surfactant has a formula selected from the group consisting of the following formulae (24) to (29);

(24)

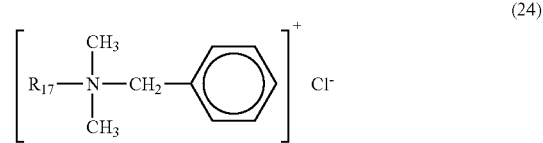

wherein $R_{17}$ represents a lauryl group, a stearyl group or a myristyl group;

(25)

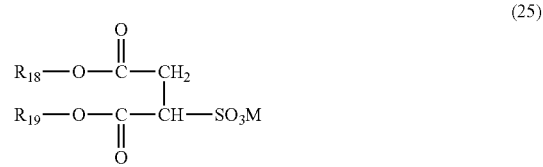

wherein $R_{18}$ and $R_{19}$ independently represent an alkyl group having not less than 3 carbon atoms which may be branched; M represents an alkali metal, an ammonium group, an alkanol amine group, a quatemary ammonium group or a quaternary phosphonium group;

(26)

wherein $R_{20}$ and $R_{21}$ independently represent an alkyl group having from 5 to 7 carbon atoms; and m is an integer of from 5 to 20;

(27)

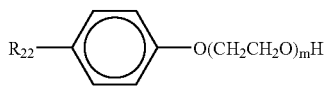

wherein $R_{22}$ represents a carbon chain having from 6 to 14 carbon atoms which may be branched; and n is an integer of from 5 to 20;

(28)

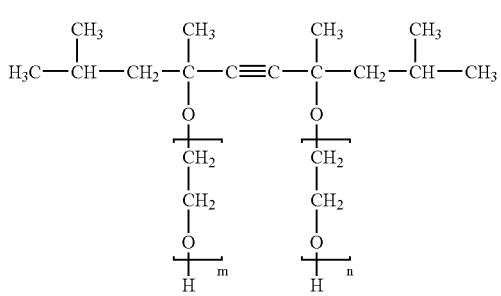

wherein m and n are independently 0 or an integer of from 1 to 20; and (29)

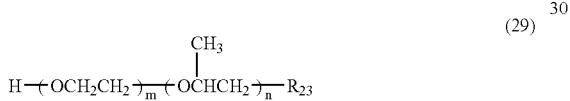

wherein $R_{23}$ represents a carbon chain having from 6 to 14 carbon atoms which may be branched; and m and n are independently 0 or an integer of from 1 to 20.

14. The pretreatment liquid according to claim 12, including a surfactant, wherein the surfactant is included in the pretreatment liquid in an amount of from 0.1 to 10% by weight.

15. The pretreatment liquid according to claim 1, further comprises at least one of an antiseptic agent or antimildew agent in an amount of from 0.1 to 5% by weight based on total weight of the pretreatment liquid.

16. A pretreatment liquid, comprising:
a cationic polymer in an amount of 10 to 80% by weight based on total weight that depresses at least one of the dispersibility and solubility of a component in a recording ink, wherein the pretreatment liquid has a viscosity of from 100 to 10,000 mPa·s at 25° C.;
wherein the cationic polymer is a cationic polymer comprising at least one of repeating units having the following formulae (19) and (20);

(19)

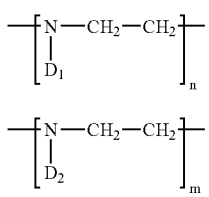

(20)

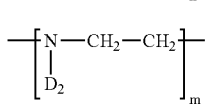

wherein $D_1$ represents a substituent having one of the following formulae (21) and (22); $D_2$ represents a hydrogen atom or a substituent having one of the following formulae (21) and (22); n and m are independently an integer, $$—CR_9R_{10}—PO_3R_{11}R_{12} \quad (21)$$

$$—CR_9R_{10}—SO_3R_{11} \quad (22)$$

wherein $R_9$ and $R_{10}$ independently represent a hydrogen atom, an alkyl group having from 1 to 12 carbon atoms or an allyl group;
$R_{11}$ and $R_{12}$ independently represent a hydrogen atom, an alkali metal or a substituent having the following formula (23);

$$—NR_{13}R_{14}R_{15}R_{16} \quad (23)$$

wherein $R_{13}$ to $R_{16}$ independently represent a hydrogen atom, an alkyl group, an allyl group, a hydroxyalkyl group or a benzyl group.

17. A recording material, comprising:
on a surface said recording material a dried pretreatment liquid,
wherein the pretreatment liquid comprises a cationic polymer depressing at least one of the dispersibility and solubility of the component in the recording ink in an amount of 10 to 80% by weight based on total weight, and
wherein the pretreatment liquid has a viscosity of from 100 to 10,000 mPa·s at 25° C.;
wherein the cationic polymer has or includes a formula selected from the group consisting of the following formulae (1), (2), (5) to (16) and (18);

(1)

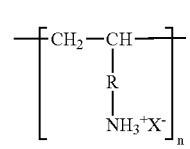

wherein $X^-$ represents a halogen ion, a nitrate ion, a nitrite ion or an acetate ion; R represents an alkylene group having from 1 to 3 carbon atoms; and n is an integer;

(2)

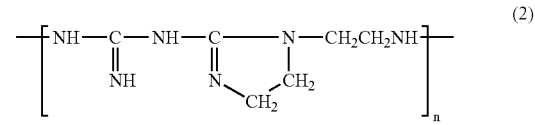

wherein n is an integer;

(5)

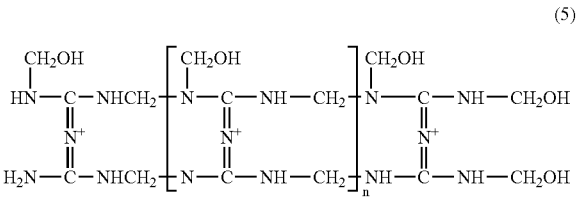

wherein n is an integer of from 5 to 30;

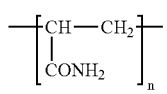
(6)

wherein n is an integer;

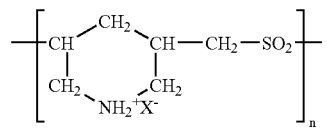
(7)

wherein X⁻ represents a halogen ion, a nitrate ion, a nitrite ion or an acetate ion; and n is an integer;

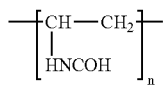
(8)

wherein n is an integer;

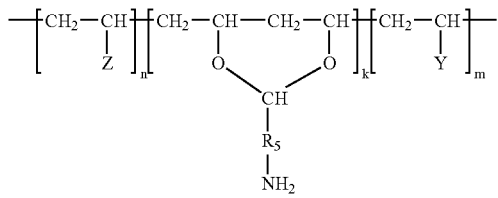
(9)

wherein Z and Y independently represent —OCOCH$_3$ or —OH; R$_5$ represents an alkylene group having from 1 to 4 carbon atoms; and n, k and m independently are integers;

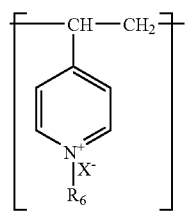
(10)

wherein R$_6$ represents an alkyl group; X⁻ represents a halogen ion, a nitrate ion, a nitrite ion or an acetate ion; and n is an integer;

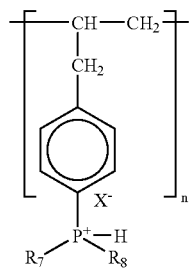
(11)

wherein R$_7$ and R$_8$ independently represent a hydrogen atom or an alkyl group; X⁻ represents a halogen ion, a nitrate ion, a nitrite ion or an acetate ion; and n is an integer;

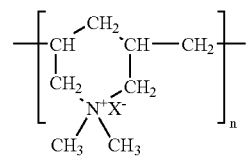
(12)

wherein X⁻ represents a halogen ion, a nitrate ion, a nitrite ion or an acetate ion; and n is an integer;

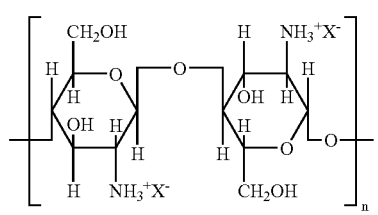
(13)

wherein X⁻ represents a halogen ion, a nitrate ion, a nitrate ion or an acetate ion; and n is an integer;

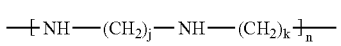
(14)

wherein j and k are independently an integer of from 2 to 6; and n is an integer;

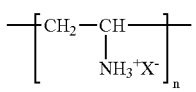
(15)

wherein X⁻ represents a halogen ion, a nitrate ion, a nitrate ion or an acetate ion;

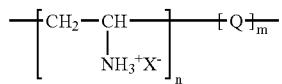 (16)
wherein X⁻ represents a halogen ion, a nitrate ion, a nitrite ion or an acetate ion; Q represents another repeating unit; and n and m are independently an integer; and
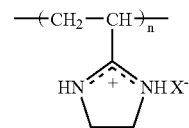 (18)
wherein X⁻ represents a halogen ion, a nitrate ion, a nitrite ion or an acetate ion; and n is an integer.
* * * * *